(12) United States Patent
Shimizu et al.

(10) Patent No.: US 6,243,237 B1
(45) Date of Patent: Jun. 5, 2001

(54) DISK DRIVE APPARATUS

(75) Inventors: Hirohiko Shimizu; Hideaki Kumagai, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/377,781

(22) Filed: Aug. 20, 1999

(30) Foreign Application Priority Data

Aug. 21, 1998 (JP) .................................................. 10-236170

(51) Int. Cl.[7] .............................. G11B 21/02; G11B 5/54
(52) U.S. Cl. ..................................... 360/246.8; 360/254.1; 360/266.2
(58) Field of Search .............................. 360/266.2, 267.9, 360/265.9, 291.4, 265.7, 266.5, 294.7, 281.3, 254, 254.1, 246.8, 255.1

(56) References Cited

U.S. PATENT DOCUMENTS 4,630,155 * 12/1986 Hasegawa ........................... 360/254.1
4,710,833 * 12/1987 Hasegawa ........................... 360/246.3
4,887,176 * 12/1989 Dussinger et al. ................. 360/246.8
4,972,281 * 11/1990 Fujioka .............................. 360/246.8
5,051,854 *  9/1991 Iwanaga ............................. 360/246.8
5,396,385 *  3/1995 Tangi et al. ........................ 360/254.1
5,828,520 * 10/1998 Nakagawa et al. ............... 360/246.3

FOREIGN PATENT DOCUMENTS

355038682A * 3/1980 (JP) .

* cited by examiner

Primary Examiner—David L. Ometz
Assistant Examiner—Franklin D. Altman, III
(74) Attorney, Agent, or Firm—Jay H. Maioli

(57) ABSTRACT

A disk drive wherein a head raising and lowering arm is rotated around a pivot shaft of a slide plate by a cam action due to a cam groove of the head raising and lowering arm and a fixed guide shaft when the head raising and lowering arm is inserted in a head suspension by the slide plate, so that the head performs a soft landing from a head unloading position to a head loading position on a floppy disk.

8 Claims, 73 Drawing Sheets

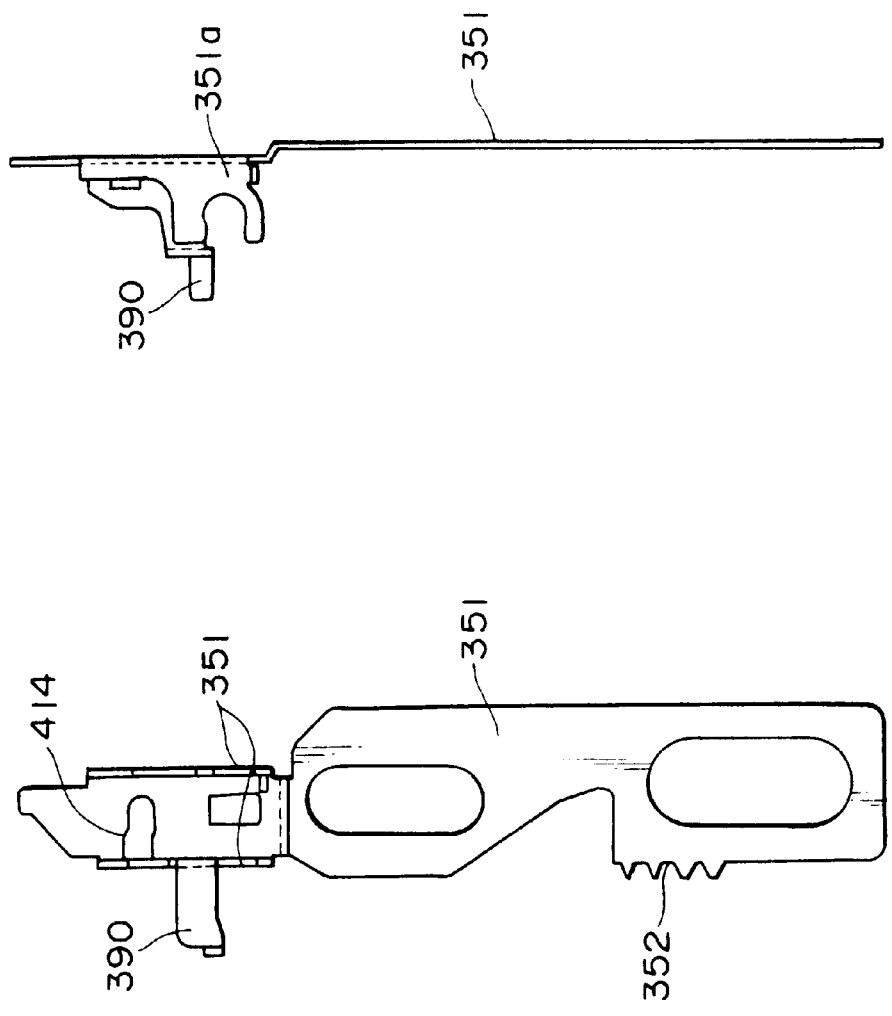

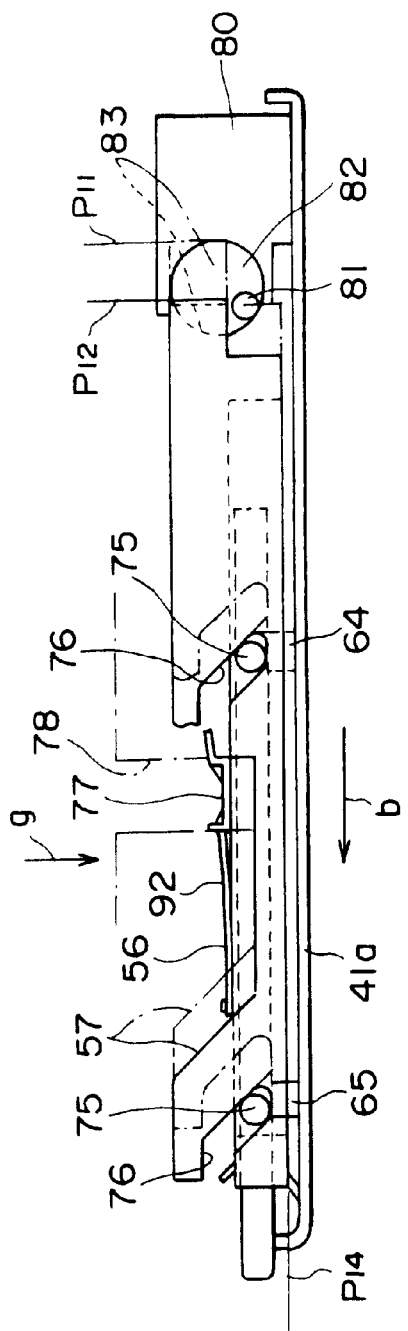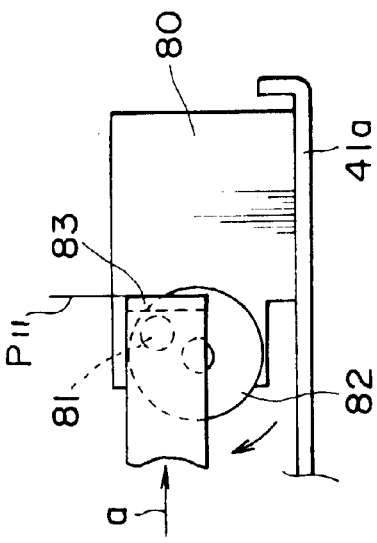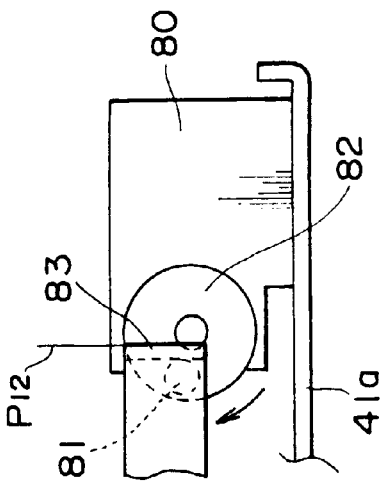

DISK DRIVE APPARATUS

BACKGROUND OF THE INVENTION

1. Field of the Invention

This invention relates to a disk drive apparatus suitable for recording and playing back a disk-shaped recording medium such as, for example, a floppy disk, and in particular to soft landing of a head on said disk-shaped recording medium.

2. Description of Related Art

Conventionally, in a small capacity floppy disk drive FDD of recording capacity 1–2 MB, a low capacity floppy disk cartridge FDC of the type shown in FIGS. 76–80 is used as shown in FIG. 81. When the low capacity floppy disk cartridge FDC is loaded, the center core of a floppy disk 1 is chucked on a disk table 23 inserted in a center core hole 6 of a cartridge 5, and the floppy disk 1 is rotated at a low speed of 200–250 rpm by a spindle 21. A pair of upper and lower magnetic heads 28, 29 are inserted in a pair of head insertion holes 7 in the disk cartridge which are released during loading so that they are in contact with the upper and lower surfaces of the floppy disk 1, and data is recorded and/or played back on the floppy disk 1 while seek and tracking are performed in directions shown by the arrows a, b along scanning centers, which are radial lines extending from the center of the floppy disk 1, by the pair of magnetic heads 28, 29 due to a head transport device.

The Applicant has already developed a high capacity floppy disk cartridge HFDC of the type shown in FIGS. 73–75 wherein the recording capacity is increased to 100 MB or more. In this high capacity floppy disk cartridge HFDC, a pair of magnetic heads, which are flying heads, are floated at distances of the order of microns from the upper and lower surfaces of the floppy disk 1 on an air film (i.e., the heads are "flying") while the floppy disk 1 is rotated at a high speed of 3600 rpm or more, and data is recorded and/or played back at high density.

Regarding the floppy disk 1 used in this high capacity floppy disk cartridge HFDC, the data trackwidth can be reduced by high rotation speeds and high density recording, but it is necessary to improve head surface roughness and make the magnetic layer on the floppy disk 1 thinner to improve contact with the head. For this reason, the size of the magnetic powder must be of the order of 0.1 $\mu$m and the coating layer must be of the order of 0.2 $\mu$m.

In a prior art low capacity floppy disk drive FDD, the low capacity floppy disk cartridge FDC was inserted in a cartridge holder, and when a lock on the cartridge holder was released by a trigger lever, the low capacity floppy disk cartridge FDC was loaded at high speed by the cartridge holder from an unloading position which is a raised position to a loading position which is a lowered position, the floppy disk 1 was chucked on a disk table 23, and an upper and lower pair of magnetic heads 28, 29 were landed with a shock on the upper and lower surfaces of the floppy disk 1. As the coating thickness of the magnetic layer on the floppy disk 1 of the low capacity floppy disk cartridge FDC is very large, there was no need for concern that the magnetic layer would suffer serious damage even if the pair of upper and lower magnetic heads 28, 29 landed on the upper and lower surfaces of the floppy disk 1 with a shock, and no particular problem with regard to safety.

However, the floppy disk 1 used with the high capacity floppy disk cartridge HFDC having a storage capacity of 100 MB or more has a very thin magnetic coating layer, and if a shock occurs when the pair of upper and lower magnetic heads 27, 28 lands on the upper and lower surfaces of the floppy disk 1 during loading, the magnetic layer which is coated thinly on the disk will suffer serious damage leading to problems of quality and durability.

SUMMARY OF THE INVENTION

The disk drive apparatus according to the present invention comprising a head raising and lowering mechanism for raising and lowering a head supported via a suspension in a carriage between a head loading position in which data recording and playback on a disk-shaped recording medium are possible, and a head unloading position in which data recording and playback are not possible, comprises: a head raising and lowering arm disposed essentially at right angles to the length direction of the suspension; a slide plate to which one end of the head raising and lowering arm is attached free to rotate via a pivot axis; and a fixed guide shaft disposed essentially parallel to the length direction of the suspension, with which a cam groove formed at the other end of the head raising and lowering arm is engaged, wherein the head raising and lowering arm is inserted into the suspension from a direction intersecting with the length direction of the suspension and ejected from same by sliding the cam groove relative to the guide shaft by a sliding action of the slide plate, and the head is raised and lowered between the head loading position and head unloading position by the head raising and lowering arm, by rotating the head raising and lowering arm around the pivot axis as center by the cam groove.

A disk drive apparatus comprising head raising and lowering mechanisms for raising and lowering first and second heads supported via first and second suspensions in carriages between a head loading position in which data recording and playback on a disk-shaped recording medium are possible, and a head unloading position in which data recording and playback are not possible, comprises carrying means for carrying the carriages in the radius direction of the disk; first and second head raising and lowering arms disposed essentially at right angles to the length direction of the first and second suspensions; slide plates to which one ends of the first and second head raising and lowering arms is attached free to rotate via a pivot axis; and fixed guide shafts disposed essentially parallel to the length direction of the suspensions, with which first and second cam grooves formed at the other ends of the first and second head raising and lowering arms are engaged, wherein the head raising and lowering arms are inserted into between the suspensions from a direction intersecting with the length direction of the suspensions and ejected from same by sliding the first and second cam grooves relative to the guide shafts by sliding actions of the slide plates, and the first and second heads are raised and lowered between the head loading position and head unloading position by the first and second head raising and lowering arms, by rotating the first and second head raising and lowering arms around the pivot axis as center by the first and second cam grooves.

A disk drive apparatus comprising head raising and lowering mechanisms for raising and lowering first and second heads supported via first and second suspensions in carriages between a head loading position in which data recording and playback on a disk-shaped recording medium are possible, and a head unloading position in which data recording and playback are not possible, comprises: first and second head raising and lowering arms disposed in between the first and second suspensions essentially at right angles to the length direction of the first and second suspensions; a pivot axis for which the first and second head raising and lowering arms are installed rotatably; and axis members disposed essentially parallel to the length direction of the suspensions, with which first and second cam grooves formed respectively at the other ends of the first and second head raising and lowering arms are engaged, wherein the first and second head raising and lowering arms and the axis members move relatively toward a direction essentially intersecting with the length direction of the suspensions, thereby the axis members displace the first and second cam grooves to rotate the first and second head raising and lowering arms around the pivot axis and thus to raise and lower the first and second heads between the head loading position and the head unloading position.

The disk drive apparatus of this invention having the aforesaid construction has the following advantages.

A cam groove of a head raising and lowering arm is slid relative to a fixed guide shaft disposed essentially parallel to a head suspension by inserting and ejecting the head raising and lowering arm disposed essentially at right angles to the suspension, the head raising and lowering arm is rotated around a pivot shaft of a slide plate by this cam groove, and a head is raised and lowered between a head loading position and a head unloading position due to this head raising and lowering arm, hence head raising and lowering can be freely controlled by a cam operation, and the head can easily be made to make a soft landing in the head loading position.

Hence, even when the invention is applied to a high capacity floppy disk drive having a storage capacity of 100 MB or higher which permits recording and/or playback on a floppy disk wherein the film thickness of the magnetic layer is very thin, the risk of damage to a magnetic layer on the floppy disk and a flying head is avoided, and a high quality, high durability floppy disk drive apparatus can be produced.

The fixed guide shaft with which the cam groove of the head raising and lowering arm is engaged, is a guide mainshaft of a carriage, so lower costs can be achieved due to the reduction in the number of parts and the number of assembly steps.

The head raising and lowering arm is inserted and ejected on a slant relative to the length direction of the suspension so that when the head raising and lowering arm is inserted in the suspension, the head raising and lowering arm approaches the head, and when the head raising and lowering arm is ejected from the suspension, the head raising and lowering arm is moved away from the head. Hence, the head raising and lowering arm is easily inserted in the suspension while synchronization with the carriage is maintained.

BRIEF DESCRIPTION OF THE DRAWINGS

FIGS. 21A and 21B are a plan view and lateral view of a third slide plate of this head raising and lowering mechanism.

FIGS. 54A to 54C are lateral views showing a loading state in the cartridge loading mechanism of this drive.

DETAILED DESCRIPTION OF THE PREFERRED EMBODIMENTS

Figure 1A:
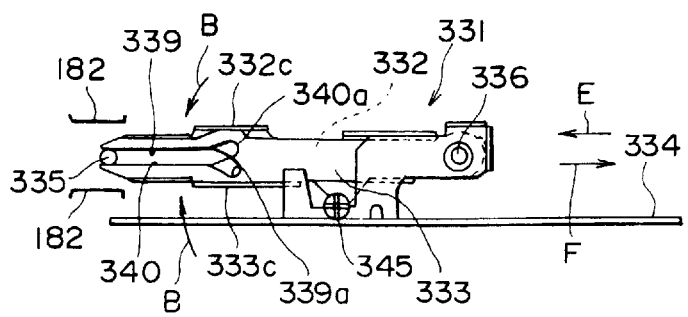
FIGS. 1A to 1D are front views describing the action of a head raising and lowering mechanism in one embodiment of a high capacity floppy disk drive.

The following is a description of an embodiment implementing a high capacity floppy disk cartridge and a high capacity floppy disk drive by comparison with a floppy disk drive for driving a floppy disk with a present low capacity floppy disk cartridge and low capacity floppy disk drive, in the following order:

(1) Description of a low capacity floppy disk cartridge and low capacity floppy disk drive
(2) Description of a high capacity floppy disk cartridge
(3) Introductory description of a high capacity floppy disk drive
(4) Description of a linear actuator
(5) Description of members for installing a guide mainshaft
(6) Description of a head assembly
(7) Description of a tracking servo
(8) Description of a head raising and lowering mechanism
(9) Description of a latch mechanism
(10) Description of a slide mechanism
(11) Description of an operating mode
(12) Description of a trigger lever The description begins with an explanation with reference to FIGS. 76 to 80. In a low capacity floppy disk FDC using a low capacity floppy disk having a structure wherein a floppy disk 1 comprising a magnetic sheet of diameter 3.5" is stuck on the outer circumference of a stainless steel circular center core 2, the recording capacity of the floppy disk is 1–2 MB (megabytes).

The low capacity floppy disk cartridge FDC has a flat structure sandwiched by upper and lower shells 3 and 4 each made of synthetic resin. The structure constitutes a cartridge 5 which has an essentially rectangular shape, and the floppy disk 1 is accommodated in the cartridge 5 in such a way that the floppy disk 1 is freely rotatable.

The center core 2 of the floppy disk 1 is loosely engaged with a center core hole 6 formed at the center of the lower cell 4. A pair of oblong upper and lower head insertion holes 7 are formed along a cartridge center P1 on the upper and lower shells 3 and 4 between a front edge surface 5a of the cartridge 5 and the center core hole 6. The front edge surface 5a is the surface of the edge of the cartridge 5 on the insertion side of a low capacity floppy disk drive, described later, in a direction indicated by an arrow a in FIG. 78. A shutter 8 has a front edge vertical plate 8c and a pair of upper and lower horizontal plates 8a and 8b for opening and closing the upper and lower head insertion holes 7 respectively. A shutter sliding dent 18 essentiallyhas alU-shapeand is formed on the outer sides of upper and lower surfaces 5e, 5f and the front edge surface 5a of the cartridge 5. The shutter 8, which has a U-shaped cross-section, is installed on the shutter sliding dent 18 such that the shutter 8 is freely slidable along the front edge surface 5a in directions indicated by arrows c and d, that is, directions perpendicular to the direction of insertion indicated by the arrow a in FIG. 78. The shutter 8 is naturally slid in the direction indicated by the arrow c up to a position of a closed cover state by a shutter spring 8d embedded in the shutter 8. A pair of left and right positioning reference holes 9 are formed respectively at locations closer to the front edge surface 5a than the rear edge surface 5d of the cartridge 5 through the lower shell 4 of the cartridge 5. One of the positioning reference holes 9 has a perfectly round shape while the other has an elliptical shape. On the left and right surfaces 5b and 5c of the cartridge 5, respectively, a pair of left and right dents 10 each having a semicircular shape are formed at locations in close proximity to the front edge surface 5a of the lower shell 4. At a corner 11a between the front edge surface 5a and the right surface 5b of the cartridge 5, a slanting surface 12 for preventing incorrect insertion is formed. The slanting surface 12 is a so-called C surface cutting the entire upper and lower shells 3 and 4 at an angle of 45 degrees. At a corner 11b between the rear edge surface 5d and the left surface 5c of the cartridge 5, a write protector 13 is provided for preventing inadvertent erasure of data recorded on the low storage capacity floppy disk 1. At a corner 11c between the rear edge surface 5d and the right surface 5b of the cartridge 5, a storage capacity identifying hole 14 is formed.

A pair of upper and lower cleaning sheets 15 are laid by using a sticking substance such as adhesive on the inner wall surfaces 3b and 4b of the upper and lower shells 3 and 4, respectively. The upper and lower cleaning sheets 15 each comprise a sheet of cloth cut into a shape resembling a horseshoe. A lifter 16 is attached by adhesive or the like to either (or both) of inner wall surfaces 3a and 4a. The lifter 16 is used for bringing the upper and lower cleaning sheets 15 into elastic contact with the upper and lower surfaces of the floppy disk 1 from positions above and below the floppy disk 1 respectively. Thus, sandwiched by the upper and lower cleaning sheets 15, the floppy disk 1 is driven into rotation at a disk surface position at a height of about H1/2 from the bottom surface 5f of the cartridge 5. A pair of upper and lower shutter holes 8e are formed at locations facing the head insertion holes 7 in the upper and lower shells 3 and 4 respectively in the upper and lower horizontal plates 8a and 8b of the shutter 8. A label sticking dent 17 with a shape detouring the rear edge surface 5d of the cartridge 5 is provided on the upper and lower surfaces 5e and 5f of the cartridge 5 on the upper and lower shells 3 and 4, respectively.

Figure 81:
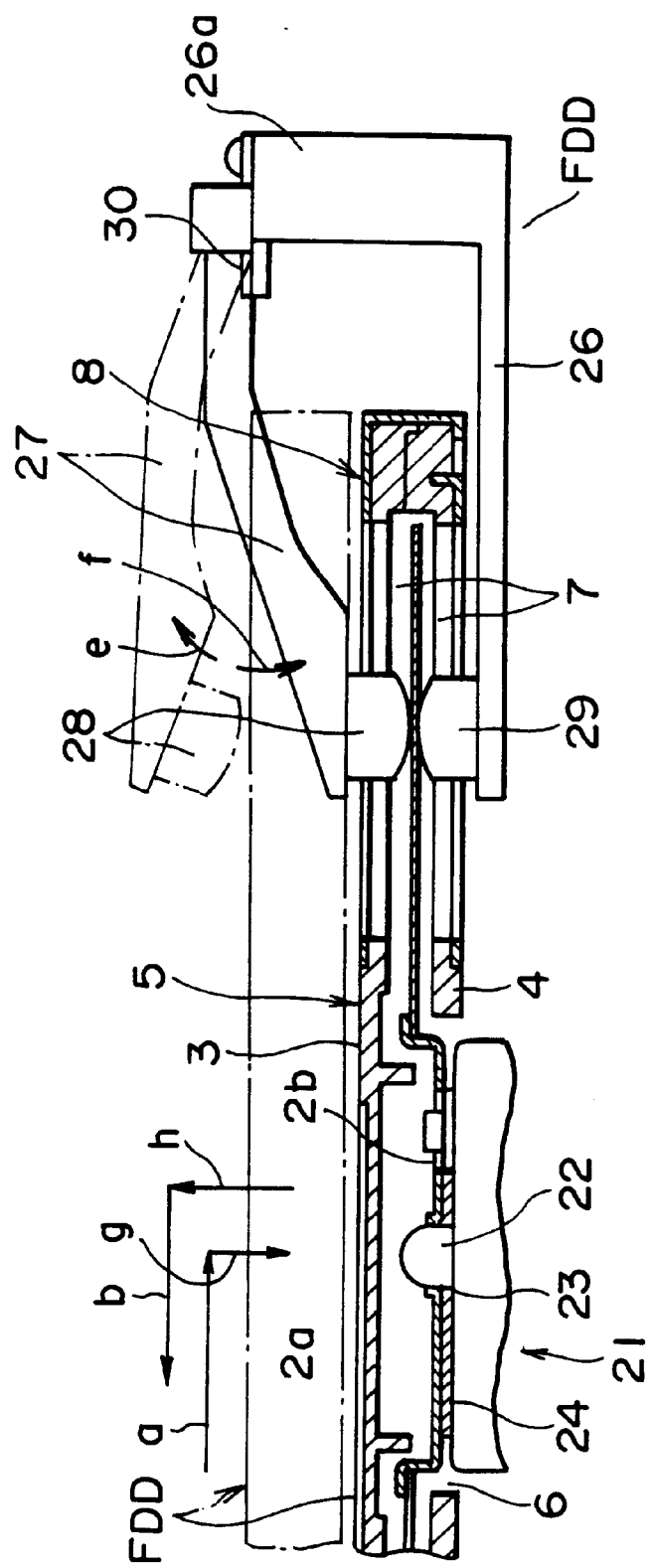
FIG. 81 is a sectional view describing a low capacity floppy disk cartridge according to the prior art.

In addition, as shown in FIG. 81, inside the floppy disk low storage capacity floppy disk drive FDD, that is, a low capacity floppy disk drive for recording and/or playing back data on and/or from a floppy disk cartridge FDC of low capacity, there are accommodated components such as a disk table 23 driven into rotation by a spindle 22 of a spindle motor 21, and a pair of upper and lower magnetic heads 28 and 29 respectively attached to upper and lower facing surfaces of a head arm 27 and a carriage 26 by gimbal plates, not shown. Also, components including a magnetic sheet 24 for chucking, and a rotation driving pin 25 of the low capacity floppy disk FD, are attached to the upper surface of the disk table 23. The head arm 27 is installed on the top of a head arm mounting 26a of the carriage 26 via a plate spring 30 in such a way that the head arm 27 can be freely rotated in the upward and downward directions indicated by arrows e and f, respectively. The head arm 27 is naturally rotated in the downward direction indicated by the arrow in FIG. 81 by ahead attachment spring, not shown. In this configuration, the carriage 26 is horizontally driven by a linear actuator in the directions indicated by the arrows a and b in FIG. 81 so that the upper and lower magnetic heads 28 and 29 are horizontally moved in the same direction simultaneously as a single body.

In this configuration, the lower magnetic head 29 is disposed at a height reference position relative to a mechanical base, not shown. The upper magnetic head 28 can be raised or moved down in the directions shown by the arrows e and f respectively by an upper magnetic head raising and lowering mechanism, not shown, between two head positions. One of these positions is a head unloading position which is at a predetermined height above the lower magnetic head 29 as shown by a single dot dashed line. The other position is a head loading position at which the floppy disk 1 is pressed against the lower magnetic head 29 as shown by a solid line in FIG. 81.

Before starting to load the low capacity floppy disk cartridge FDC into the low capacity floppy disk drive FDD, the upper magnetic head 28 is raised in the direction indicated by the arrow e in FIG. 81 to the head unloading position shown by the single dot dashed line in FIG. 81. The low storage capacity floppy disk cartridge FDC is horizontally inserted into a cartridge loading mechanism, not shown, to a cartridge unloading position higher than the lower magnetic head 29 but lower than the upper magnetic head 28 as shown by a single dot dashed line in a direction indicated by the arrow a. The low capacity floppy disk cartridge FDC is then moved down vertically by the cartridge loading mechanism in a parallel movement to a cartridge loading position shown by a solid line. As a result, the low capacity floppy disk cartridge FDC brought to the cartridge loading position is horizontally mounted on four cartridge positioning pins, not shown, inside the low capacity floppy disk drive FDD. Thus, the low storage capacity floppy disk cartridge FDC can be loaded without any interference by the lower and upper magnetic heads 28 and 29.

Figure 78:
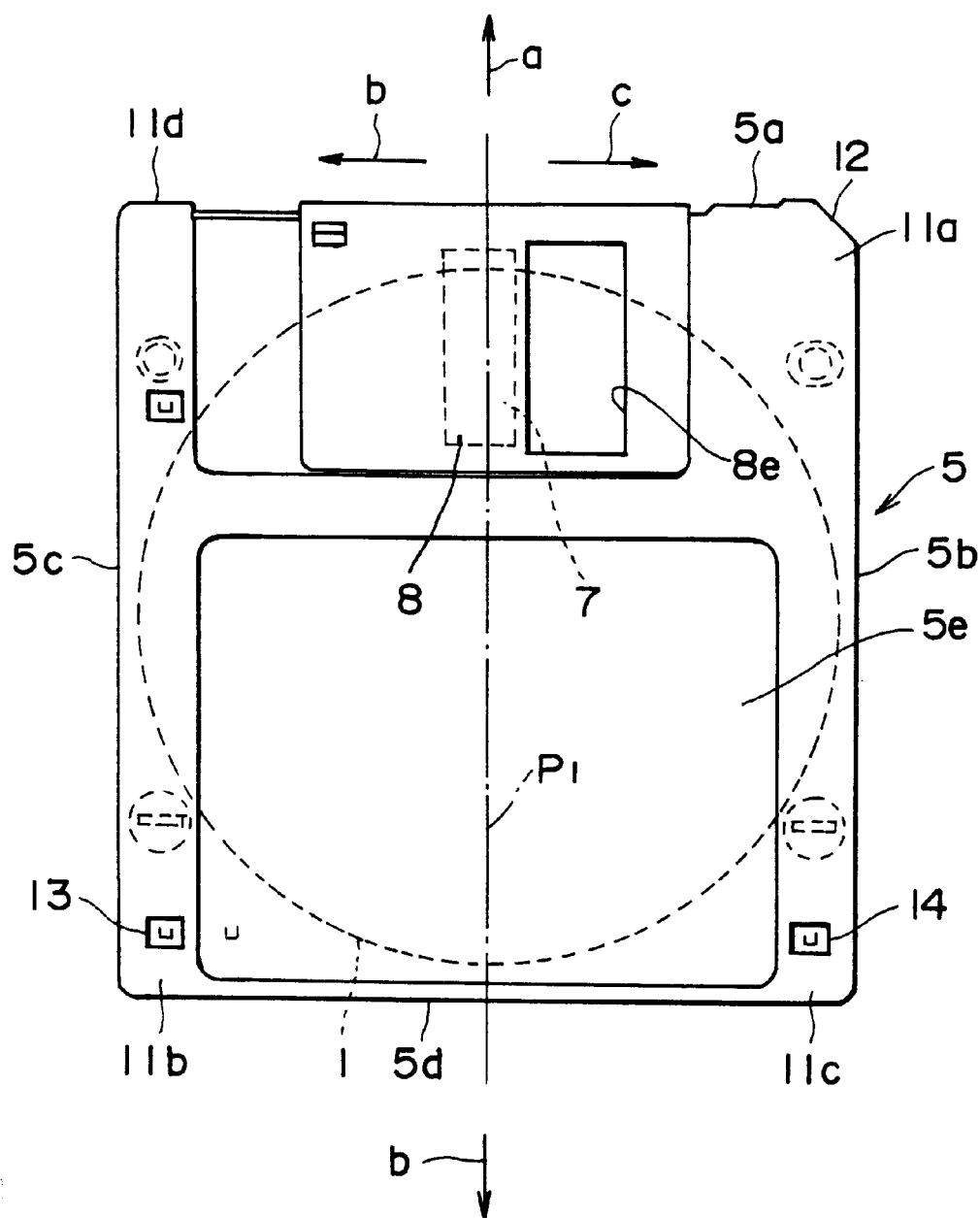
FIG. 78 is a plan view of FIG. 76.
Figure 79:
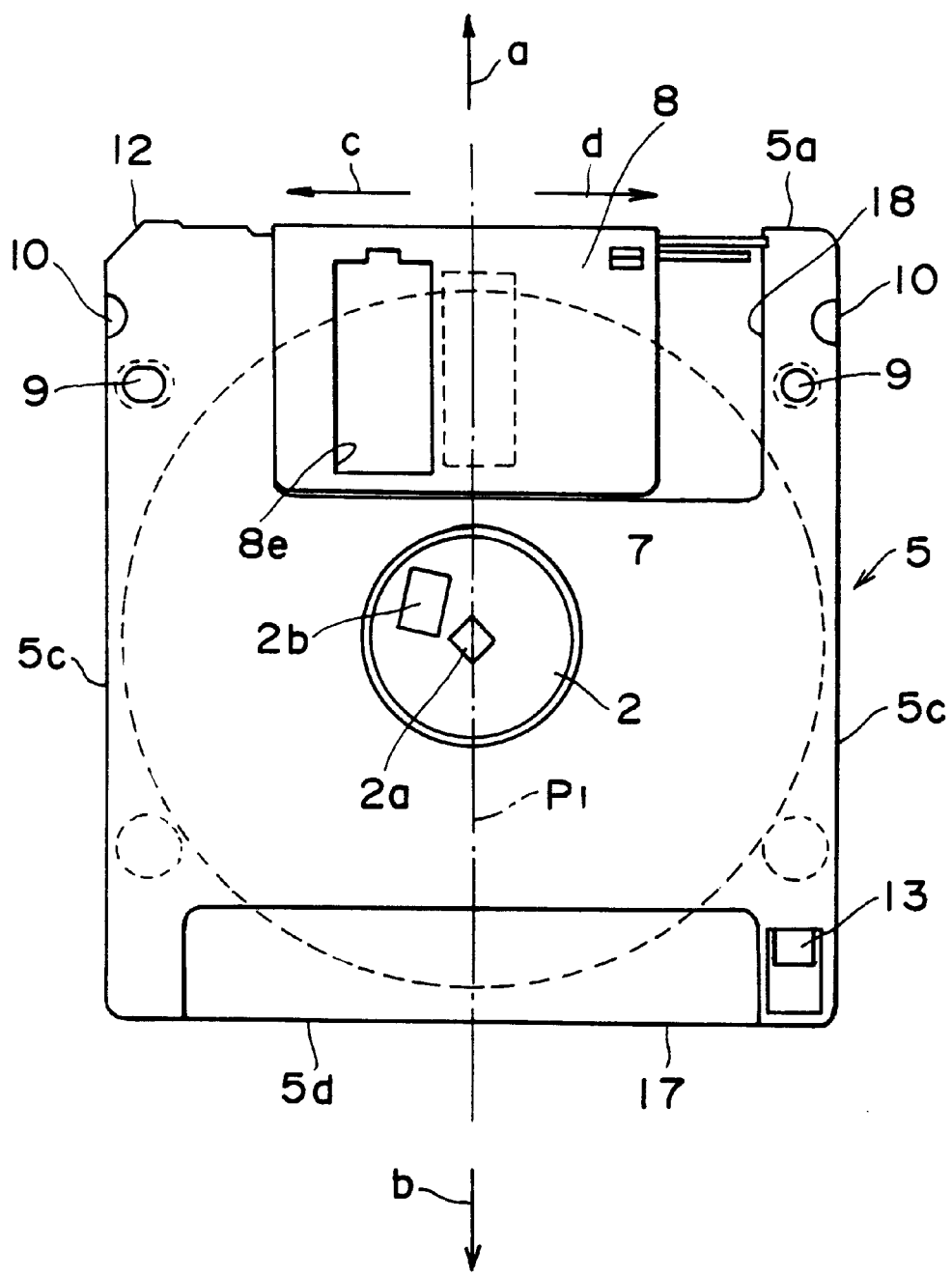
FIG. 79 is an undersurface view of FIG. 76.
Figure 80:
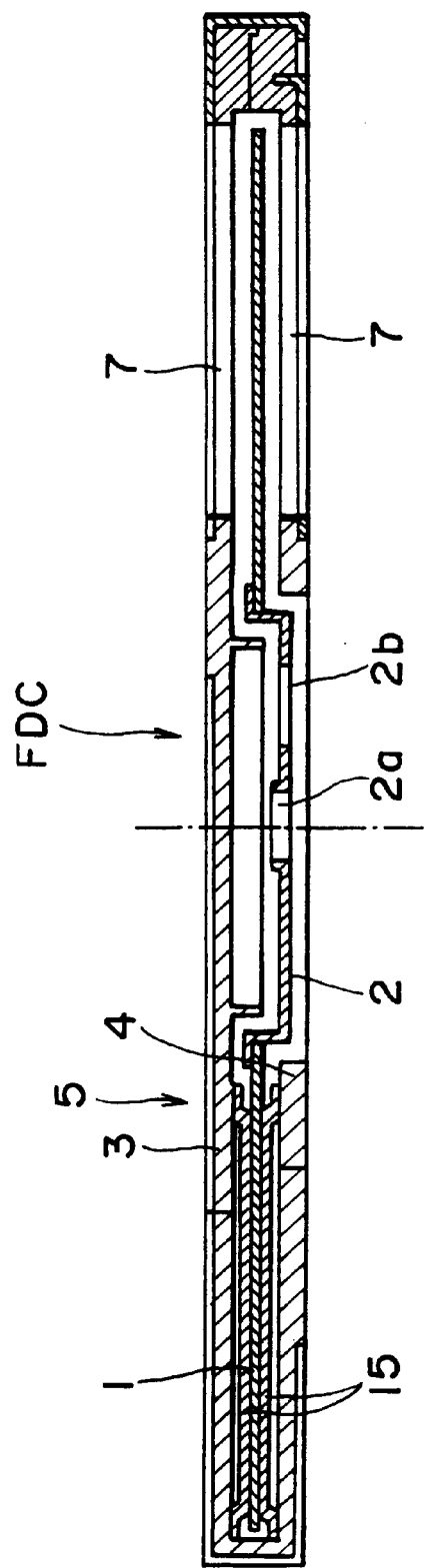
FIG. 80 is a sectional view of FIG. 76.

As the low storage capacity floppy disk cartridge FDC is being horizontally inserted into the loading position in the direction indicated by the arrow a, the shutter 8 of the low storage capacity floppy disk cartridge FDC is slid in a direction indicated by the arrow d by a shutter opening/closing mechanism installed inside the low capacity floppy disk drive FDD from a closed cover position shown in FIGS. 78 and 79 to an open cover position shown in FIG. 80, resisting a force generated by the shutter spring 8d. Then, the upper and lower shutter holes 8e are vertically superimposed on the upper and lower head insertion holes 7 of the cartridge 5, the upper and lower head insertion holes 7 are uncovered, and the upper and lower shutter holes 8e and head insertion holes 7 are inserted between the upper and lower magnetic heads 28, 29. The shutter opening/closing mechanism itself is not shown in the figure.

When the low capacity floppy disk cartridge FDC is moved down vertically from the cartridge unloading position to the cartridge loading position in a direction indicated by an arrow g as shown by the solid line in FIG. 81, the center core 2 of the low capacity floppy disk FD is chucked onto the magnetic sheet 24 of the disk table 23 and the spindle 22 is mutually engaged with a center hole 2a of the center core 2 from a position beneath the center hole 2a. At the same time, the rotation driving pin 25 on the disk table 23 is mutually engaged with a rotation driving pin engagement hole 2b formed at an eccentric position of the center core 2 from underneath. In addition, when the low storage capacity floppy disk cartridge FDC is moved down vertically from the unloading position to the loading position in the direction indicated by the arrow g, the head arm 27 is rotated down in a direction indicated by the arrow f in FIG. 81 by a head pressing spring from the head unloading position to the head loading position and, at the same time, the upper magnetic head 28 is thus moved down from the head unloading position to the head loading position in the direction indicated by the arrow f. As a result, the upper and lower heads 28 and 29 are relatively inserted into the upper and lower shutter holes 8e and the upper and lower head insertion holes 7 in the directions indicated by the arrows e and f. In addition, the upper and lower heads 28 and 29 are respectively brought into pressure contact with the upper and lower surfaces of the floppy disk 1 in the cartridge 5.

When the upper and lower heads 28 and 29 are in this state, the operation to load the low capacity floppy disk cartridge FDC into the low capacity floppy disk drive FDD is completed. In this state, the disk table 23 is driven into rotation by the spindle motor 21 and the center core 2 is driven into rotation by the rotation driving pin 25. As a result, the floppy disk 1 is driven into rotation in the cartridge 5 at a low rotational speed typically in the range 200 to 250 rpm. In this state, the floppy disk 1 is driven into rotation with the upper and lower surfaces thereof remaining in contact with the upper and lower cleaning sheets 15 respectively so that the upper and lower surfaces of the floppy disk 1 are automatically cleaned by the upper and lower cleaning sheets 15. In addition, the carriage 26 and the head arm 27 are driven horizontally by the linear actuator in the directions indicated by the arrows a and b in FIG. 81 as a single body, letting the upper and lower magnetic heads 28 and 29 scan the capacity floppy disk 1 in the directions indicated by the arrows a and b in the so-called seek and tracking operations in order to record and/or play back data onto and/or from the floppy disk 1. It should be noted that the linear actuator itself is not shown in the figure.

It may be noted that an operation to unload the low capacity floppy disk cartridge FDC to the outside of the low capacity floppy disk drive FDD after the recording or playback operation performed on the floppy disk 1, is an inverse operation to the loading process described above. Specifically, when the low capacity floppy disk cartridge FDC is vertically raised by the cartridge loading mechanism in the direction indicated by the arrow h in a parallel movement from the cartridge loading position shown by the solid line in FIG. 81 to the cartridge unloading position shown by the single dot dashed line in the same figure, the center core 2 departs from the disk table 23 in the upward direction and the head arm 27 is rotated in the direction indicated by the arrow e from the head loading position to the head unloading position, resisting a force generated by a head pressing spring. The upper magnetic head 28 is thereby raised in the direction indicated by the arrow e from the loading position shown by the solid line in FIG. 81 to the unloading position, and the upper and lower magnetic head 28 and 29 depart from the cartridge 5 in the upward and downward directions respectively. Then, when the low capacity floppy disk cartridge FDC is expelled horizontally from the unloading position in the direction indicated by the arrow b to the outside of the low capacity floppy disk drive FDD, the shutter 8 is slid in the direction indicated by the arrow c by the shutter spring 8d from the open cover position shown in FIG. 80 to the closed cover position shown in FIGS. 78 and 79. As a result, the upper and lower head insertion holes 7 of the cartridge 5 are covered by the upper and lower horizontal plates 8a and 8b of the shutter 8.

(2) Description of a High Capacity Floppy Disk Cartridge

Figure 73:
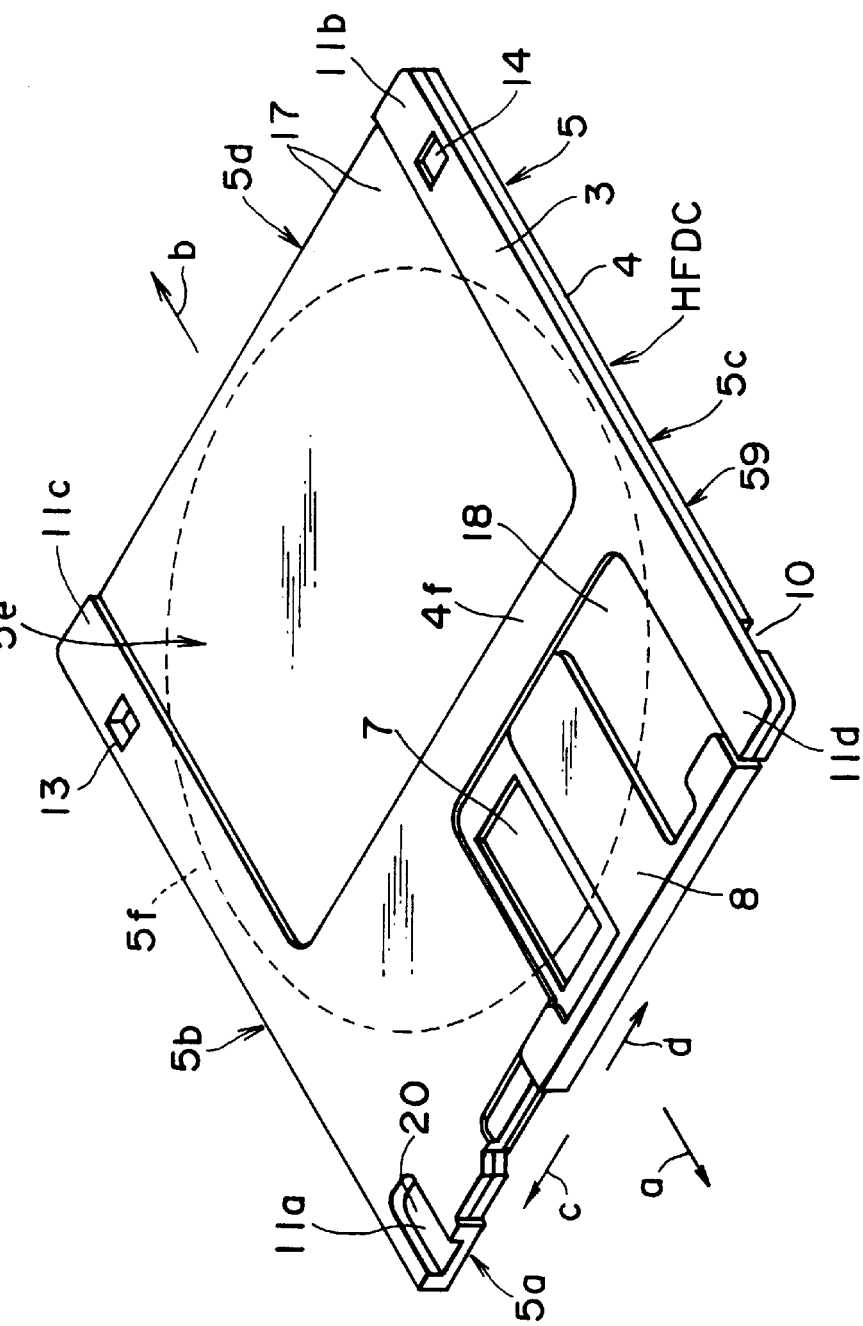
FIG. 73 is a perspective view of a high capacity floppy disk cartridge.
Figure 74:
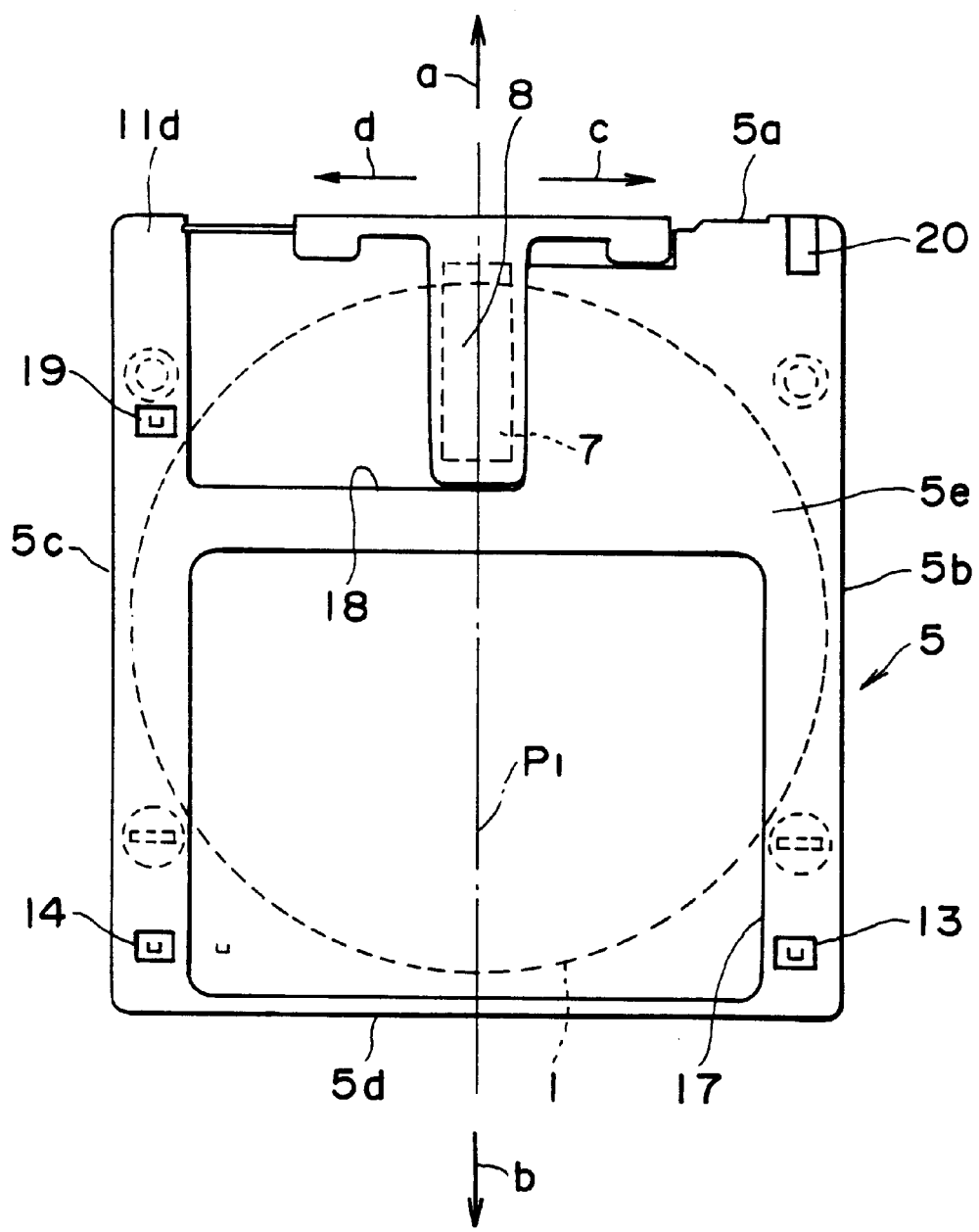
FIG. 74 is a plan view of FIG. 73.
Figure 75:
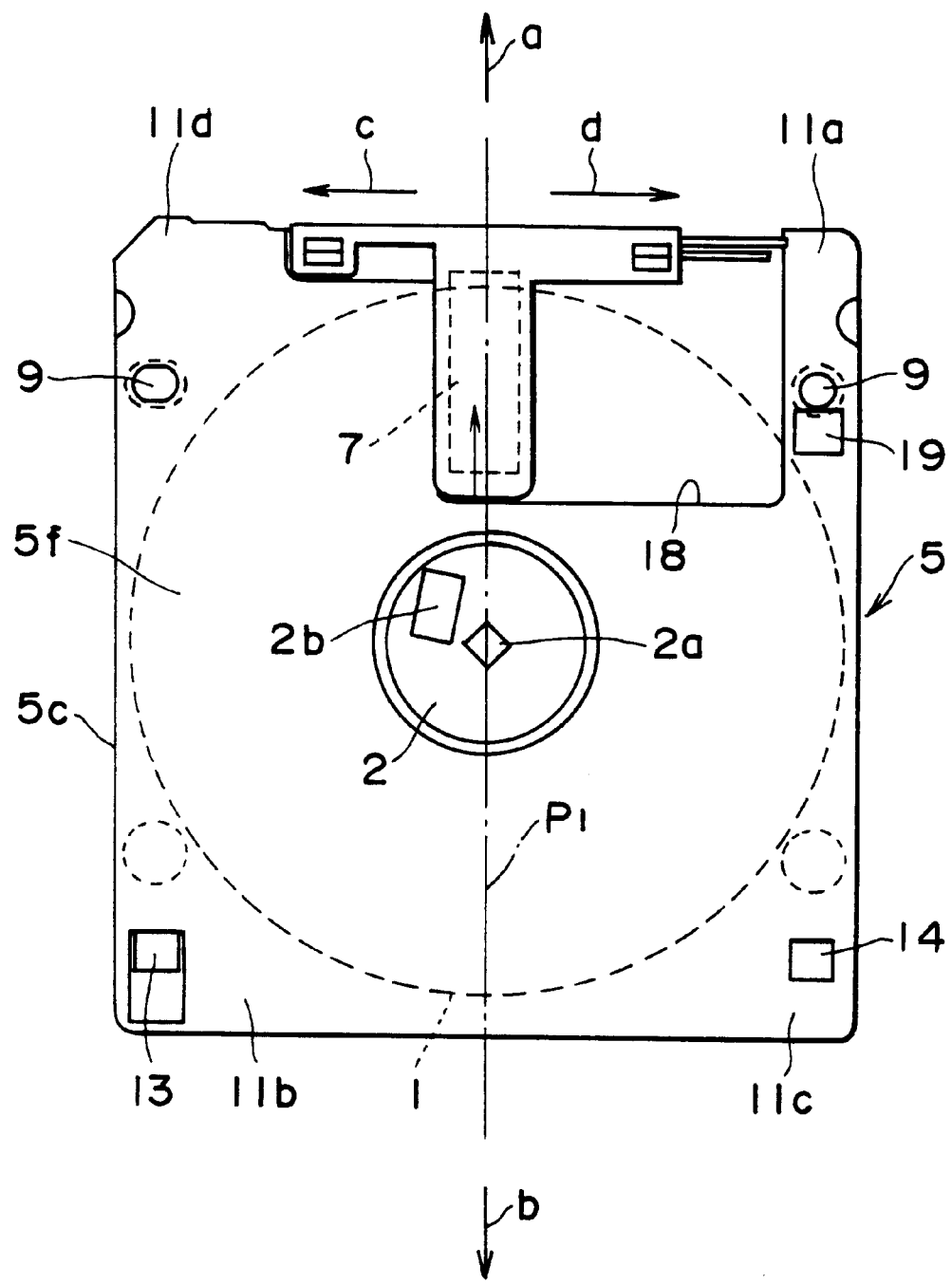
FIG. 75 is a plan view of FIG. 74.
Figure 76:
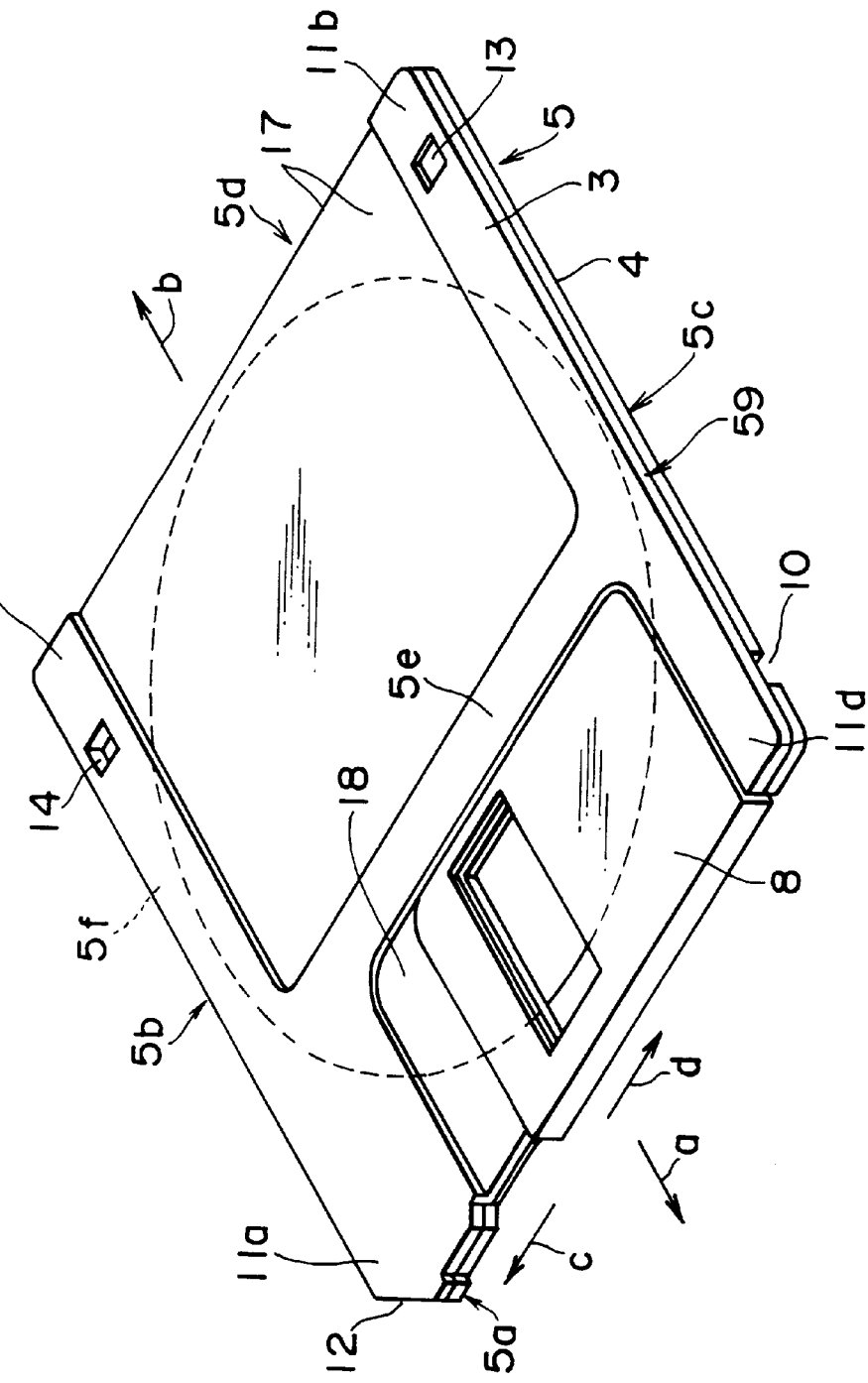
FIG. 76 is a perspective view of a low capacity floppy disk cartridge according to the prior art.
Figure 77:
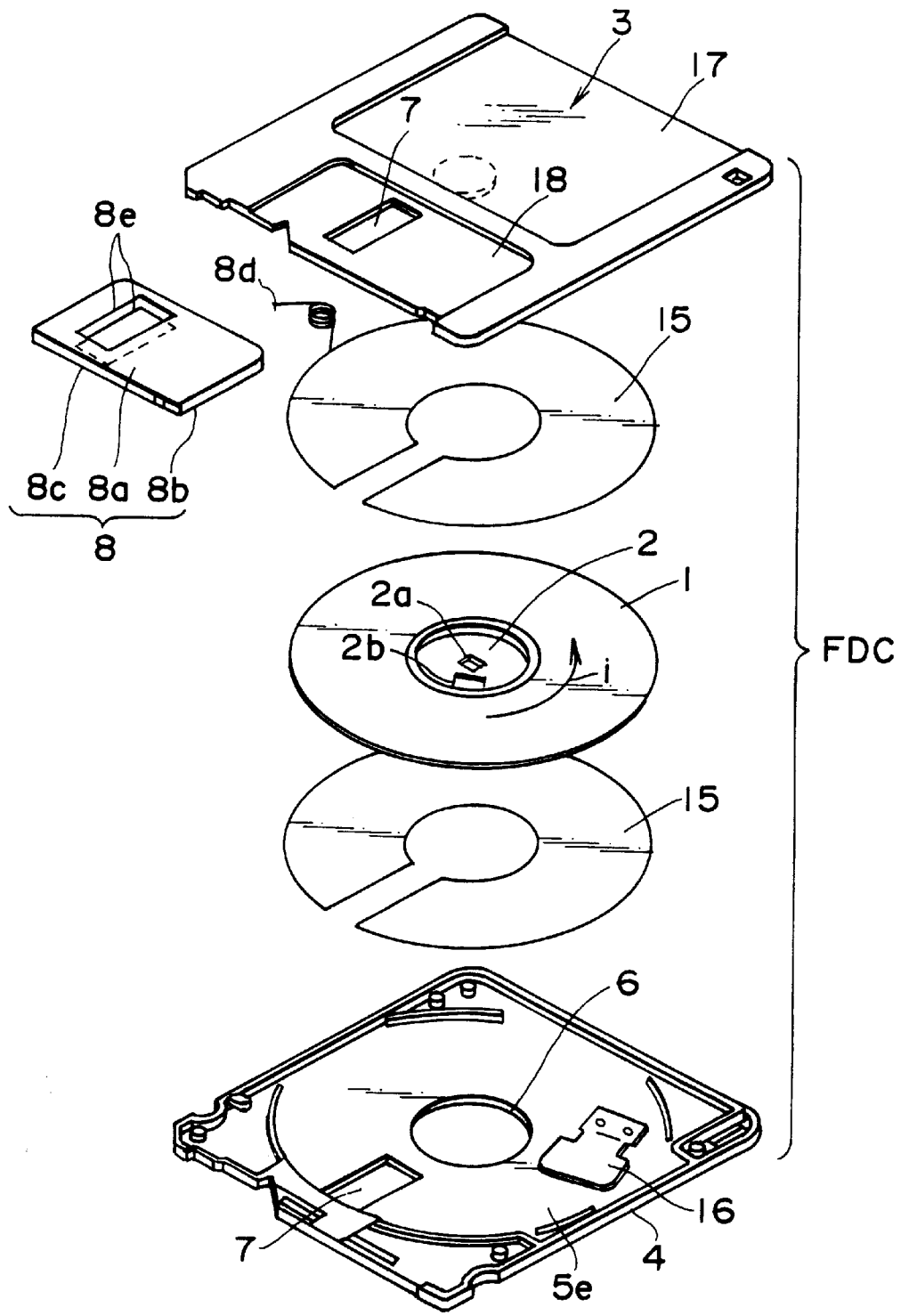
FIG. 77 is a perspective view of the components of FIG. 76.

A high capacity floppy disk cartridge HFDC for recording and/or playback driven by a high capacity floppy disk drive HFDD to be described later, will now be described by referring to FIGS. 73–75. Much like the low capacity floppy disk cartridge FDC, a high capacity floppy disk HFD has a structure comprising a center core 2 and a floppy disk 1 stuck on the circumference of the center core 2, surrounding the center core 2. The floppy disk 1 is made of a magnetic sheet with a diameter of 3.5 inches, whereas the center core 2 is a stainless disk-like plate. The high capacity floppy disk HFD is housed in the cartridge 5 comprising upper and lower shells 3 and 4 made of synthetic resin such that it is freely rotatable. In order to increase the storage capacity of the high storage capacity floppy disk HFD to above 100 MB, preferably a desired value in the range 300 to 700 MB, the thickness of magnetic films of the upper and lower surfaces of the high capacity floppy disk HFD is of the order of sub-microns, and the rotational speed of the high capacity floppy disk HFD will be set to a value of 3,600 rpm or more.

To make the high capacity floppy disk cartridge HFDC, described later, compatible with the low capacity floppy disk cartridge FDC having a storage capacity in the range 1 to 2 MB, the external dimensions and thickness of the cartridge 5 of the high capacity floppy disk cartridge HFDC are made essentially identical to the external dimensions and thickness of the cartridge of the floppy disk cartridge FDC having a low storage capacity. Also, to distinguish a high capacity floppy disk cartridge HFDC and a low capacity floppy disk cartridge FDC from each other in the high capacity floppy disk drive HFDD described later, the locations of the write protector 13 and the storage capacity identifying hole 14 on the high capacity floppy disk cartridge HFDC are swapped with each other, and a high storage capacity identifying hole 19 is newly formed on the high capacity floppy disk cartridge HFDC at a location in close proximity to one of the positioning reference holes 9 having a perfectly round shape. It may be noted that, in the case of the high capacity floppy disk cartridge HFDC, the plane shape of the shutter 8 has a T-like shape for, among other purposes, increasing the internal effective area of the cartridge 5, and a groove 20 for preventing incorrect cartridge insertion is formed at a corner 11a at one end of the front edge surface 5a on the upper surface 5e of the cartridge 5. The groove 20 corresponds to the slanting surface 12 for preventing incorrect cartridge insertion provided on the low capacity floppy disk cartridge FDC. It may further be noted that the rotation driving pin engagement hole 2b formed on the center core 2 of the floppy disk 1 of the high capacity floppy disk cartridge HFDC is sufficiently larger than the rotation driving pin engagement hole 2b formed on the center core 2a of the floppy disk 1 of the low capacity floppy disk cartridge FDC.

(3) Introductory Description of a High Capacity Floppy Disk Drive

Next, a high capacity floppy disk drive HFDD will now be described referring to FIGS. 47–54. The HFDD provided by the present invention is a typical disk drive apparatus having a chassis 41 made of a thick sheet metal. Upper and lower covers 42 and 43 each made of a sheet metal with a small thickness are placed respectively on and beneath the chassis 41 such that they can be freely mounted on or removed from the chassis 41. On the front side of these components, a front panel 44 made of a molded material (plastic) is provided such that the front panel 44 can be freely mounted on or removed from the chassis 41. The whole forms a drive main body 45 having a flat cubic shape. A cartridge insertion window 46 having an oblong shape is provided on the upper edge of the front panel 44, and an opening/closing cover 47 is provided on the inner side of the cartridge insertion window 46. The opening/closing cover 47 opens in the inward direction. An eject button 48 and a light emitting display unit 49 are provided to the left and right on the lower part of the front panel 44. The light emitting display unit 49 indicates the operating state of the drive.

[0022]

The spindle motor 51 is provided above the chassis 41 at a position on the side of the front panel 44 inside the drive main body 45. The disk table 53 is formed above the spindle motor 51 on the upper surface of a rotor of the spindle 52. Components such as a magnetic sheet 54 for chucking and the rotation driving pin 55 are provided on the upper surface of the disk table 53. A cartridge loading mechanism 58, comprising a cartridge holder 56 and a slide plate 57, is provided above the chassis 41 on the side of the front panel 44. The slide plate 57 is used for driving the cartridge holder 56 up and down in directions indicated by arrow g in FIG. 54 and arrow h in FIG. 53 in a parallel movement between an unloading position and a loading position. A linear actuator 103 is provided above the chassis 41 on the rear edge side, that is, on the opposite side to the front panel 44. As will be described later, the linear actuator 103 is used for transporting a pair of upper and lower magnetic heads 101, 102 constituting a flying head assembly. It may be noted that the spindle motor 51 and the upper and lower magnetic heads 101, 102 are placed above a scanning center $P_2$ which is a scanning position (seek and tracking positions) for recording and/or playing back data on and/or from the floppy disk 1. A plurality of circuit boards such as a motor board 59, main board 60 and switchboard 61, are secured by screws in a horizontal posture beneath the chassis 41. An interface board 63 comprising an external interface unit 62 is secured by screws in a horizontal posture on the rear edge of the chassis 41. A pair of left and right positioning reference pins 64 and a pair of height reference pins 65 are provided in a vertical posture above the chassis 41 in lower positions at the four corners of the cartridge holder 56. The positioning reference pins 64 are used also as height reference pins. Push switches mounted on the switch board 61, comprising a cartridge insertion detection switch 66, inadvertent erasure prevention detecting switch 67, low capacity detection switch 68 and high capacity detection switch 69 penetrate the chassis 41 and the slide plate 57, protruding to a space below the cartridge holder 56. Also, an eject switch 70 which is switched ON by the eject button 48 is mounted on the lower surface of the front edge (the edge on the side of the front panel 44) of the switch board 61.

The chassis 41 comprises a horizontal base plate 41a, and left and right side plates 41b extending upward in a vertical posture on the left and right sides of the base plate 41a respectively. The spindle motor 51 is secured by screws via three spacers on the motor board 59 below the base plate 41a of the chassis 41. The disk table 53 mounted above the spindle motor 51 protrudes into a space above the base plate 41a through an opening 72 formed in the base plate 41a. The cartridge holder 56 comprises a horizontal ceiling plate 56a, left and right plates 56b extending downward in a vertical posture on the left and right sides of the ceiling plate 56a, and a pair of base plates 56c formed by bending the lower ends of the left and right plates 56b inwards horizontally, thus forming a flat U-like shape. The high capacity floppy disk cartridge HFDC or the low capacity floppy disk cartridge FDC is inserted into and pulled out horizontally from the cartridge holder 56 in directions indicated by arrows a and b in FIG. 49. A head insertion opening 73 is formed by cutting out an area of the ceiling plate 56a of the cartridge holder 56 at the center on the rear endside, that is, the side opposite to the front panel 44. As in the case of the chassis 41, the slide plate 57 has a horizontal base plate 57a and left and right plates 57b extending upward in a vertical posture on the left and right sides of the base plate 57a. The slide plate 57 is engaged with four pins, namely, the positioning reference pins 64 and the height reference pins 65, in such a way that the slide plate 57 can slide freely along four guide grooves 74 formed on the base plate 57b. The slide plate 57 is so designed that it slides freely over the base plate 41a of the chassis 41 between an unloading position $P_{11}$ and a loading position $P_{12}$ shown in FIG. 50 in the directions indicated by the arrows a and b.

The cartridge loading mechanism 58 comprises four guide pins 75, four slanting guide grooves 76, a pair of left and right guide protrusions 77 and a pair of left and right vertical guide grooves 78. The four guide pins 75 are formed for example by a drawing process on the front and rear edges of the left and right plates 56b of the cartridge holder 56. The four slanting guide grooves 76 are formed on the left and right plates 57b of the slide plate 57, the four guide pins 75 being engaged with the four slanting guide grooves 76 such that the four guides 75 can slide freely along the four grooves 76. The left and right guide protrusions 77 are formed in one piece approximately in the center in the longitudinal direction of the left and right plates 56b of the cartridge holder 56. The left and right vertical guide grooves 78 are formed respectively on the left and right plates 41b of the chassis 41, the left and right guide protrusions 77 being engaged with the left and right vertical guide grooves 78 such that the left and right guide protrusions 77 can slide freely along the left and right vertical guide grooves 78 in the directions of the arrows g and h in FIGS. 54 and 53, i.e., in the up/down direction. The slide plate 57 is slid naturally by a pull coil spring 79 installed between the slide plate 57 and the chassis 41 in a forward direction, that is, the direction indicated by the arrow b. An eject motor 80, which is a geared motor, is installed on one part of the rear edge side, that is, the side opposite the front panel 44, on the base plate 41a of the chassis 41. An eject cam 82 is attached to the eject motor 80, and an eject driving pin 81 is provided in an eccentric position of the eject cam 82. In this configuration, the eject driving pin 81 drives an eject arm 83 which protrudes backward from the rear end of one of the side plates 57b of the slide plate 57. A trigger lever 84, used also as a shutter opening/closing lever, is installed in a front side position (that is, a position on the side of the front panel 44) of the eject motor 80 on the base plate 41a of the chassis 41 such that the lever 84 can rotate freely in directions indicated by arrows i and j around a support pin 85 between a lock position shown by a solid line in FIG. 50 and a lock-release position shown by a single dot dashed line in the same figure. The trigger lever 84 is rotated in the direction indicated by the arrow i to the lock position by a rotation forcing means, not shown. The trigger lever 84 is designed so that it locks a locked unit 86 formed on the slide plate 57 and releases the locked unit 86 from a locked state.

Figure 49:
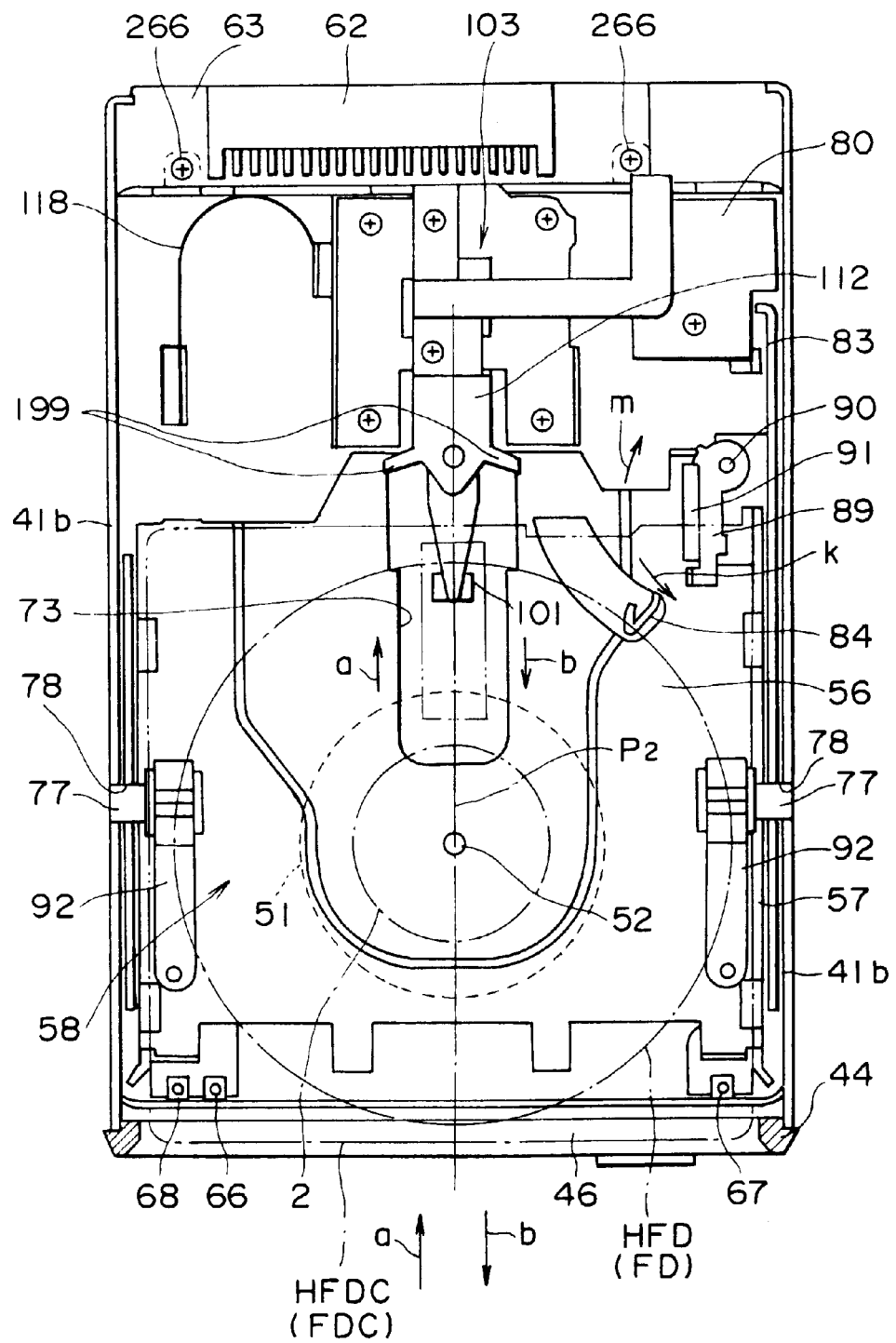
FIG. 49 is a partial cut-away view of a state wherein the upper and lower cover of this drive have been removed.
Figure 50:
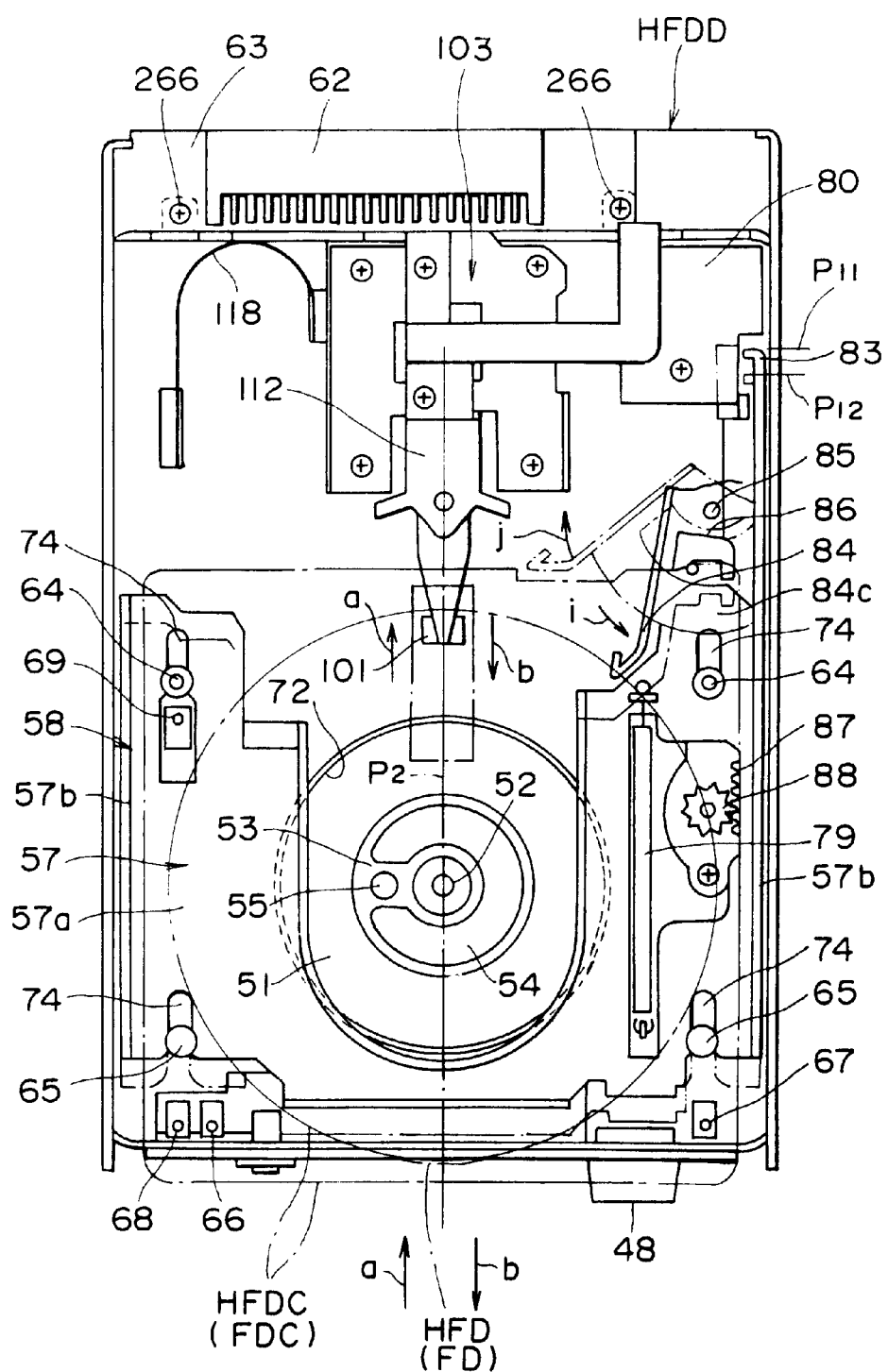
FIG. 50 is a plan view of a state wherein a cartridge holder of this drive has been removed.
Figure 51:
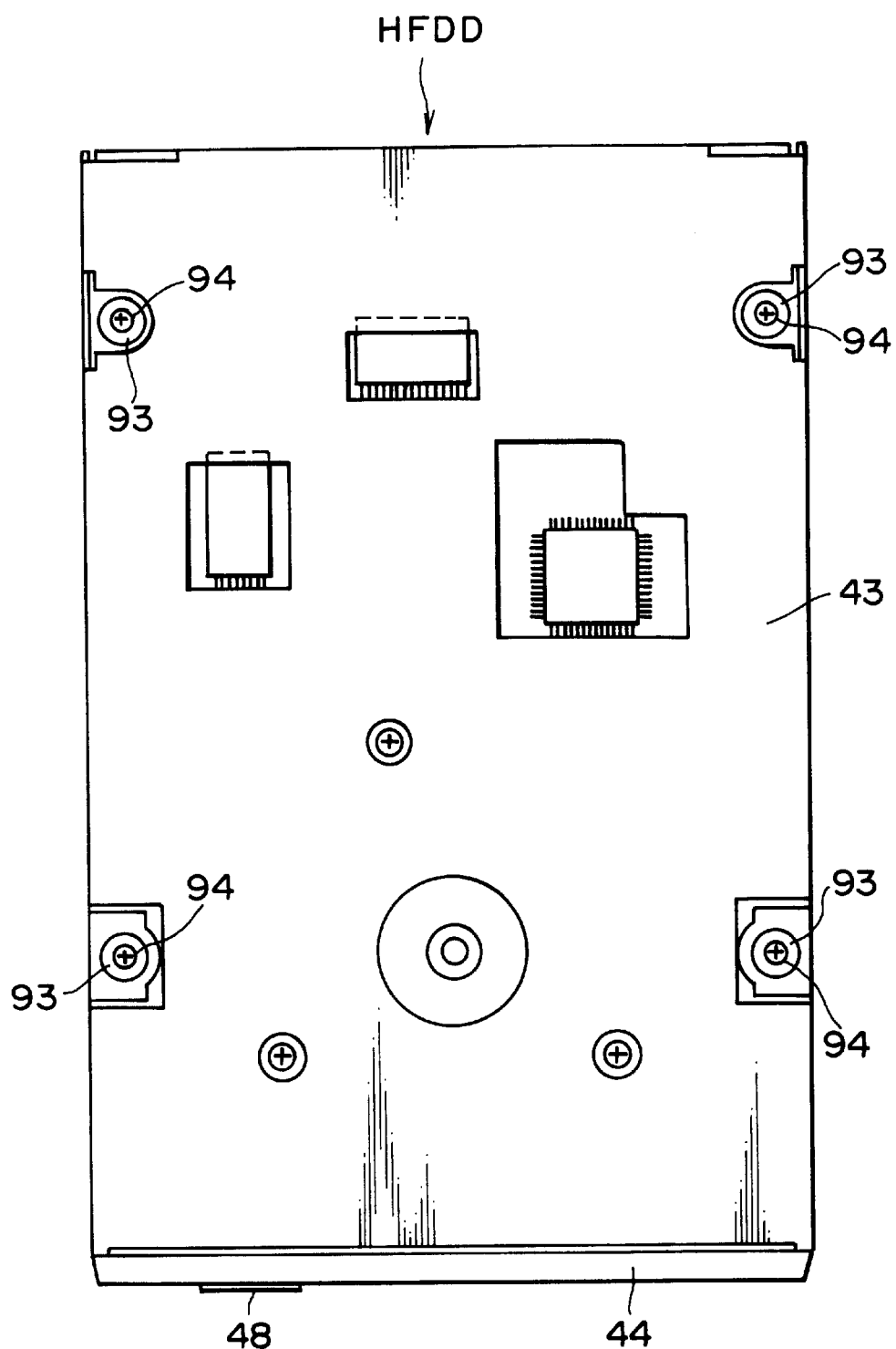
FIG. 51 is a plan view of this drive.
Figure 52:
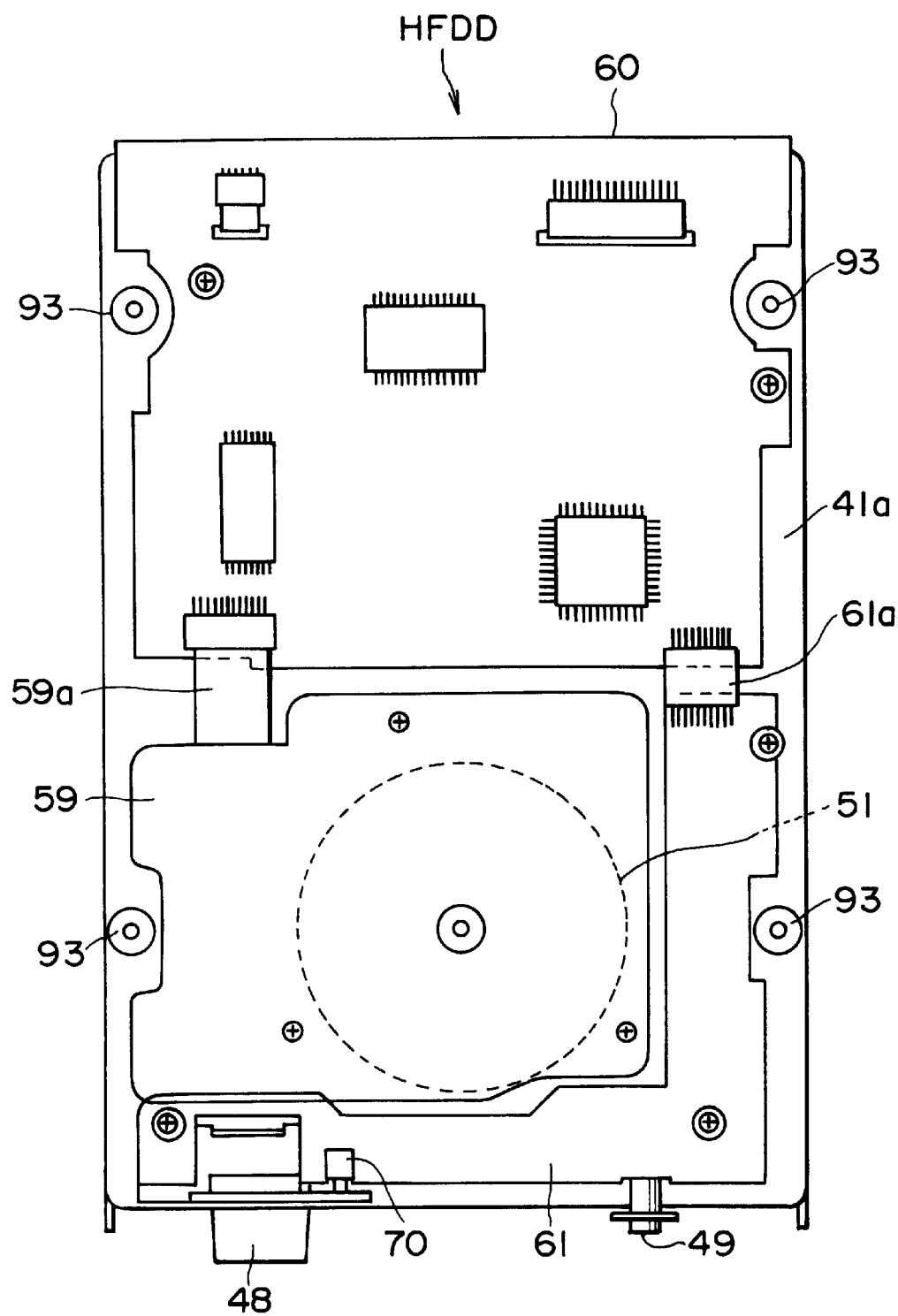
FIG. 52 is a lower plan view of a state wherein the lower cover of this drive has been removed.
Figure 53:
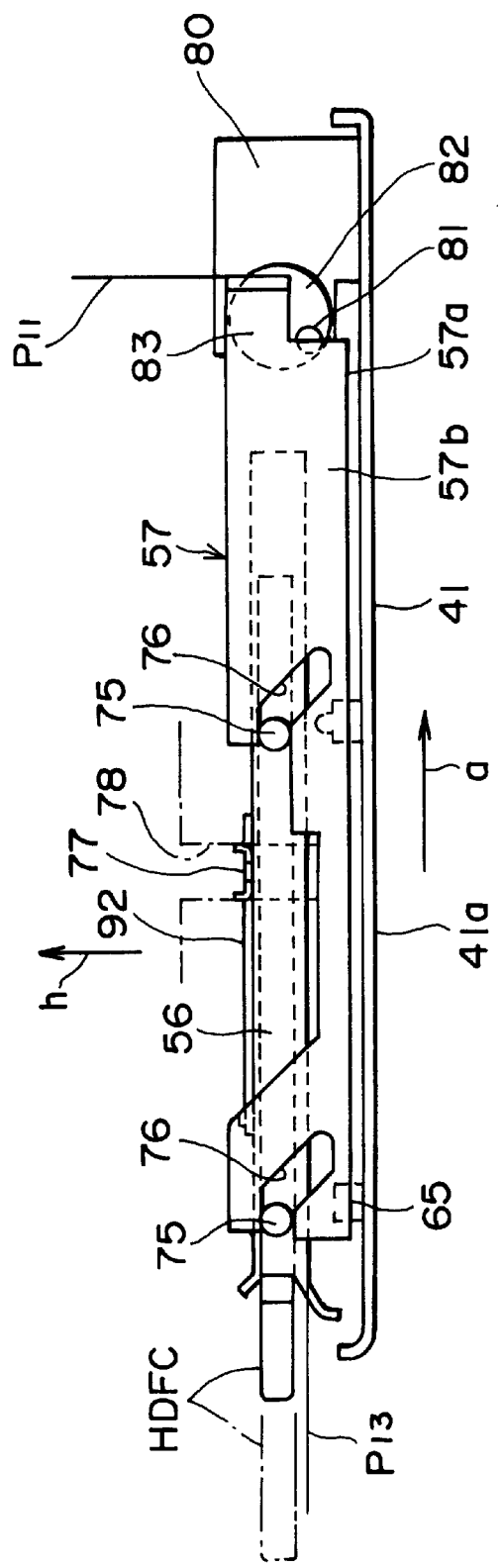
FIG. 53 is a lateral view showing an unloading state in a cartridge loading mechanism of this drive.

According to the cartridge loading mechanism 58, when the slide plate 57 is slid backward in the direction indicated by the arrow a to an unloading position $P_{11}$, resisting a force generated by the pull coil spring 79, the slide plate 57 is locked by the trigger lever 84 which is engaged with the locked unit 86 of the slide plate 57, as shown in FIGS. 50 and 53. In this state, the four guide pins 75 of the cartridge holder 56 are pushed upward in the direction indicated by the arrow h by the four slanting guide grooves 76 of the slide plate 57, and while the left and right guide protrusions 77 are guided by the left and right vertical guide grooves 78 respectively, the cartridge holder 56 is driven to move upward in a parallel movement to an unloading position $P_{13}$ which is a raised position at the same height as the cartridge insertion window 46. Then, when the trigger lever 84 is rotated in the direction indicated by the arrow j from the lock position shown by the solid line in FIG. 50 to the lock-release position shown by the single dot dashed line in the same figure, the slide plate 57 is released from the locked state imposed by the trigger lever 84, and the slide plate 57 is slid by the pull coil spring 79 in the direction indicated by the arrow b from the unloading position $P_{11}$ shown in FIG. 53 to a loading position P12 in the front. The four guide pins 75 of the cartridge holder 56 are pushed downward in the direction indicated by the arrow g by the four slanting guide grooves 76 of the slide plate 57. In addition, while the left and right guide protrusions 77 are guided by the left and right vertical guide grooves 78 respectively, the cartridge holder 56 is driven to move downward in a parallel movement in the direction of the arrow g to a loading position $P_{14}$ shown by a solid line in FIG. 54(A) which is a lowered position set beneath the unloading position $P_{13}$. It should be noted that, at that time, the slide plate 57 is slid in the direction indicated by the arrow b at a low speed due to a damping effect of a damper 88 which is engaged with a rack 87 formed on the slide plate 57 installed on the base plate 41a of the chassis 41, as shown in FIG. 50. Hence, the cartridge holder 56 is driven to move downward quietly from the unloading position to the loading position. Then, as the eject cam 82 is driven by the eject motor 80 to make one rotation from a position shown in FIG. 54(A), the eject driving pin 81 is caught by the eject arm 83 of the slide plate 57 as shown in FIGS. 54(B) and 54(C), driving the slide plate 57 to slide from the unloading position P12 to the loading position $P_{11}$ behind the unloading position P12 in the direction indicated by the arrow a, resisting a force generated by the pull coil spring 79. The cartridge holder 56 is driven to move upward in a parallel movement in the direction indicated by the arrow h from a loading position $P_{14}$ shown in FIG. 54(A) to the unloading position $P_{13}$ shown in FIG. 53, and the slide plate 57 is again automatically locked at the unloading position $P_{13}$ by the trigger lever 84 which is automatically returned in the direction indicated by the arrow i from the lock release position shown by the single dot dashed lined in FIG. 50 to the lock position shown by the solid line. Additionally, as shown in FIG. 49, a cartridge inadvertent insertion preventing lever 89 is installed at one end on the rear edge side of the ceiling plate 56a of the cartridge holder 56 such that the lever 89 can rotate freely around a support pin 90 in directions indicated by arrows k and m. The cartridge inadvertent insertion preventing lever 89 is rotated in the direction k by a pull coil spring 91 which is installed between the cartridge inadvertent insertion preventing lever 89 and the ceiling plate 56a. In addition, a pair of left and right cartridge pressing springs 92 each implemented by a plate spring are provided respectively in left and right positions of the ceiling plate 56a of the cartridge holder 56. The floppy disk drive HFDD for driving a high capacity floppy disk cartridge having the configuration described above is accommodated in an internal chassis of equipment such as a computer and veiled by a lower cover 43. The whole chassis 41 is elastically supported by four insulators 93 on the lower cover 43 to make the floppy disk drive HFDD for driving a high capacity floppy disk cartridge resilient to disturbances such as external vibration.

In the configuration of the high capacity floppy disk drive HFDD described above, the high capacity floppy disk cartridge HFDC or the low capacity floppy disk cartridge FDC can be inserted selectively through the cartridge insertion window 46, and recording and/or playback on/from the high capacity floppy disk HFD and low capacity floppy disk FD can be performed selectively.

Specifically, when the floppy disk cartridge HFDC having a high storage capacity or the floppy disk cartridge FDC having a low storage capacity is inserted horizontally through the cartridge insertion window 46 in the direction indicated by the arrow a into the inside of the cartridge holder 56 raised to the unloading position $P_{13}$ as shown by the single dot dashed lines in FIGS. 49, 50 and 53, the trigger lever 84 is rotated in the direction indicated by the arrow j from the lock position to the lock release position over the front edge surface 5a of the cartridge 5. During the rotation, the shutter is moved by the trigger lever 84 to an open cover position, resisting a force generated by the shutter spring.

At the instant when the trigger lever 84 has rotated in the direction of the arrow j to reach the lock release position, the high capacity floppy disk cartridge HFDC or the low capacity floppy disk cartridge FDC is driven by the cartridge holder 56 to move downward in the direction indicated by the arrow g from the unloading position $P_{13}$ to the loading position $P_{14}$ shown in FIG. 54. At the loading position $P_{14}$, the high capacity floppy disk cartridge HFDC or the low capacity floppy disk cartridge FDC is loaded horizontally.

It may be noted that, if the high capacity floppy disk cartridge HFDC or the low capacity floppy disk cartridge FDC is inserted correctly through the cartridge insertion window 46, the incorrect cartridge insertion preventing lever 89 inserts into the incorrect insertion preventing groove 20 or is rotated in the direction of the arrow m by the slanting surface 12 so as to permit the insertion of the high capacity floppy disk cartridge HFDC or the low capacity floppy disk cartridge FDC. If the high capacity floppy disk cartridge HFDC or the low capacity floppy disk cartridge HFDC is inserted incorrectly through the cartridge insertion window 46, on the other hand, the incorrect cartridge insertion preventing lever 89 prohibits the insertion of the high capacity floppy disk HFDC or the low capacity floppy disk cartridge FDC. The floppy disk cartridge HFDC having a high storage capacity or the low capacity floppy disk cartridge FDC is said to be inserted incorrectly when it is inserted upside down or when the rear side thereof is inserted first.

Then, the high capacity floppy disk cartridge HFDC or the low capacity floppy disk cartridge FDC loaded at the loading position $P_{14}$ is pressed and positioned in a horizontal posture by the left and right cartridge pressing springs 92 on the four positioning reference pins 64 and height reference pins 65, the cartridge insertion detecting switch 66 detects the loading completion state, the existence of a data erasure prevention of the high capacity floppy disk cartridge HFDC or the low capacity floppy disk cartridge FDC is detected by the inadvertent erasure prevention detecting switch 67, and the recording capacity of the floppy disk 1 is detected by the high capacity detecting switch 69 or the low capacity detecting switch 68. Then, the center core 2 of the high capacity floppy disk HFD or the low capacity floppy disk FD is chucked on the disk table 53, which is inserted from below into a center core hole 6 of the cartridge 5, by the magnetic sheet 24, and the center hole 2a of the center core 2 is engaged with the spindle 52. At the same time, the rotation driving pin engagement hole 2b is engaged with the rotation driving pin 25. Then, the high capacity floppy disk HFD or low capacity floppy disk FD is driven into rotation by the spindle motor 51 at a predetermined rotational speed for the floppy disk cartridge HFDC or the floppy disk cartridge FDC, and an operation to record and/or play back data on and/or from the high capacity HFD or the low capacity floppy disk FD is performed while the upper and lower magnetic heads 101 and 102 are transported by the linear actuator 103 in the direction indicated by the arrows a and b along the scanning center $P_2$.

In the case of the low capacity floppy disk FD of the low capacity floppy disk cartridge FDC, a position on the circumference on the low capacity floppy disk FD relative to the upper and lower magnetic heads 101 and 102 is determined by a positioning function using the engagement relation of the rotation driving pin 55 to the rotation driving pin engagement hole 2b of the center core 2 (centering), and the low capacity floppy disk FD is driven into rotation by the spindle motor 51 at a low rotational speed in the range 200 to 250 rpm. The upper and lower magnetic heads 101 and 102 are then brought into contact with the upper and lower surfaces of the low capacity floppy disk FD respectively to record and/or play back data. In the case of the high capacity floppy disk HFD of the high capacity floppy disk cartridge HFDC, on the other hand, the rotation driving pin engagement hole 2b of the center core 2 is formed larger, so the rotation driving pin 55 is loosely engaged with the rotation driving pin engagement hole 2b. Thus, a position on the circumference on the high capacity floppy disk HFD of the high capacity floppy disk cartridge HFDC is not determined by using the rotation driving pin 25 as is the case with the low capacity floppy disk cartridge FDC. Instead, while tracking is performed for positioning on the circumference (centering) by a tracking servo system described later, the floppy disk HFD is driven into rotation by the spindle motor 51 at a high rotational speed of at least 3,600 rpm. The upper and lower magnetic heads 101, 102 do not come in contact with the upper and lower surfaces of the high capacity floppy disk HFD, being floated above the surfaces at distances of sub-micron order by air films generated on the surfaces in a so-called flying phenomenon to record and/or play back data with a storage capacity of at least 100 MB (high density).

Figure 12:
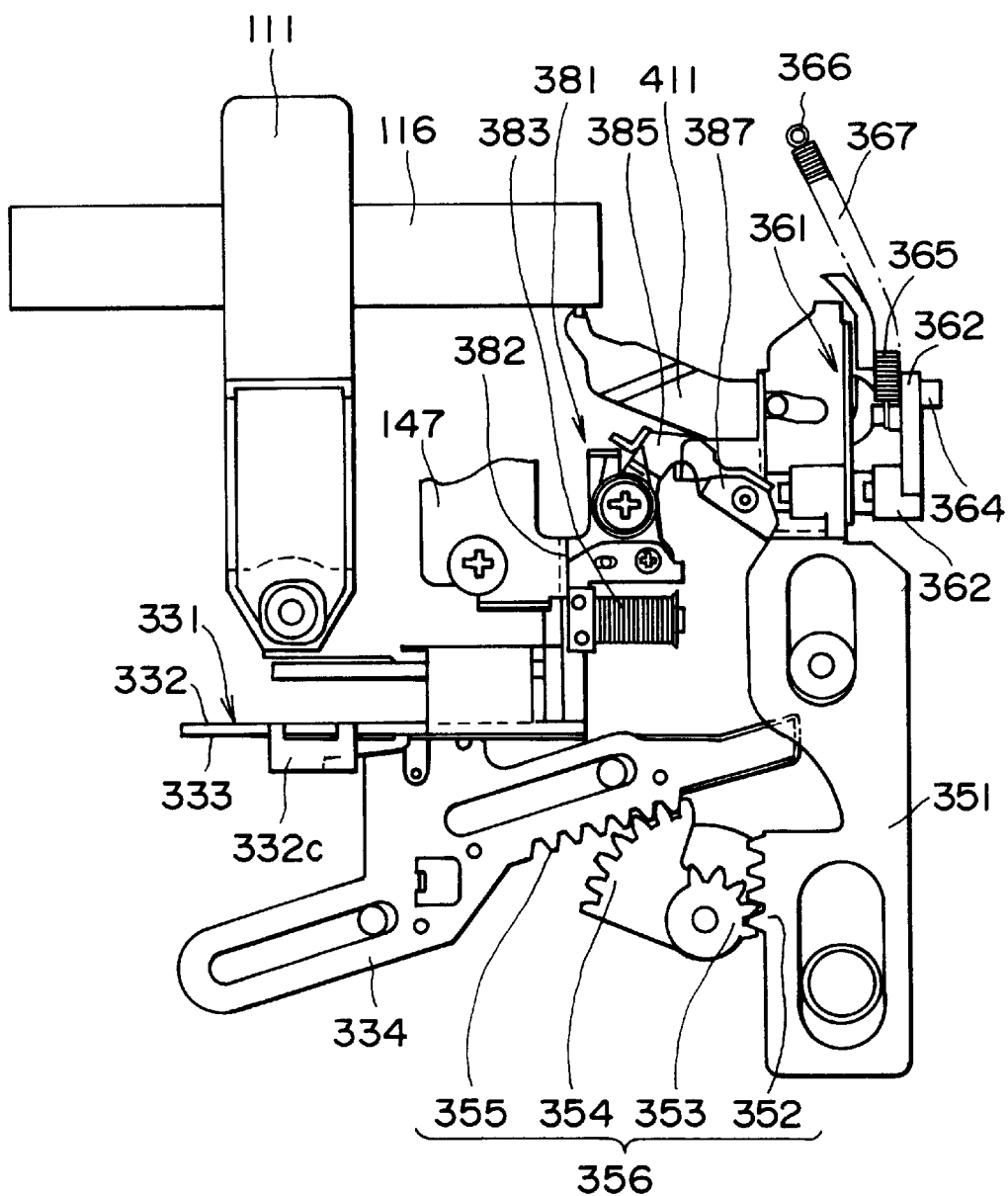
FIG. 12 is a plan view of a state with an eject motor removed.
Figure 13:
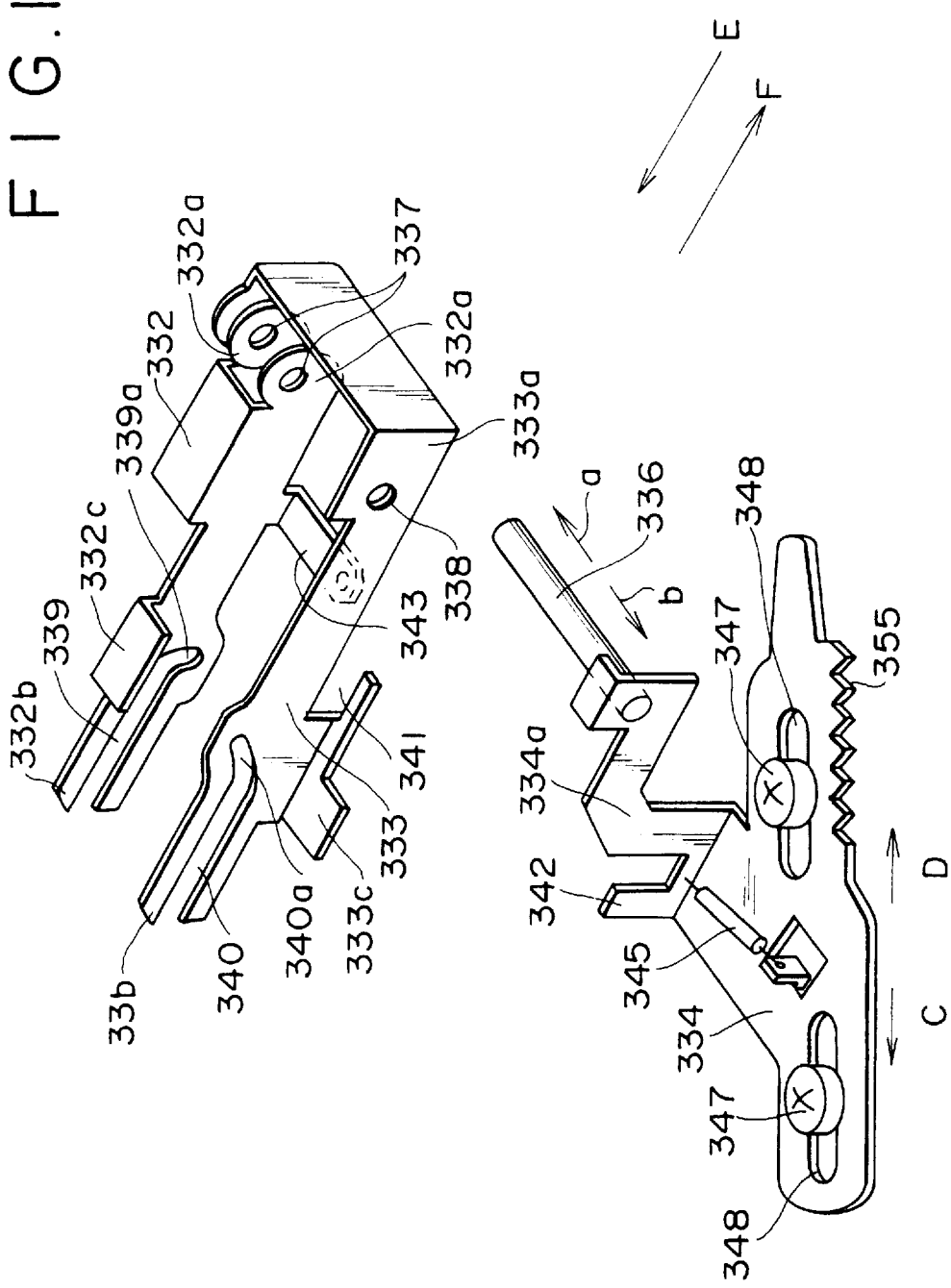
FIG. 13 is a perspective view of the components of essential parts of this head raising and lowering mechanism.

When the eject button 48 is pressed after the operation to record and/or play back data on and/or from the high capacity floppy disk HFD or low capacity floppy disk FD is completed as described above, the eject switch 70 is switched ON, causing the eject motor 80 to drive the eject cam 82 to make one rotation. As a result, the high capacity floppy disk cartridge HFDC or the low capacity floppy disk cartridge FDC is driven by the cartridge holder 56 to move upward in the direction indicated by the arrow h from the loading position $P_{14}$ shown in FIG. 12A to the unloading position $P_{13}$ shown in FIG. 53. The floppy disk cartridge HFDC having a high storage capacity or the low capacity floppy disk cartridge FDC is then expelled in the direction indicated by the arrow b as shown by the single dot dashed line in FIG. 53 from the cartridge insertion window 46 by the trigger lever 84, which is rotated in the direction indicated by the arrow i from the lock release position shown by the single dot dashed line in FIG. 50 to the lock position shown by the solid line in the same figure. At the same time, the shutter is moved by the shutter spring to the closed cover position.

(4) Description of a Linear Actuator

Figure 55:
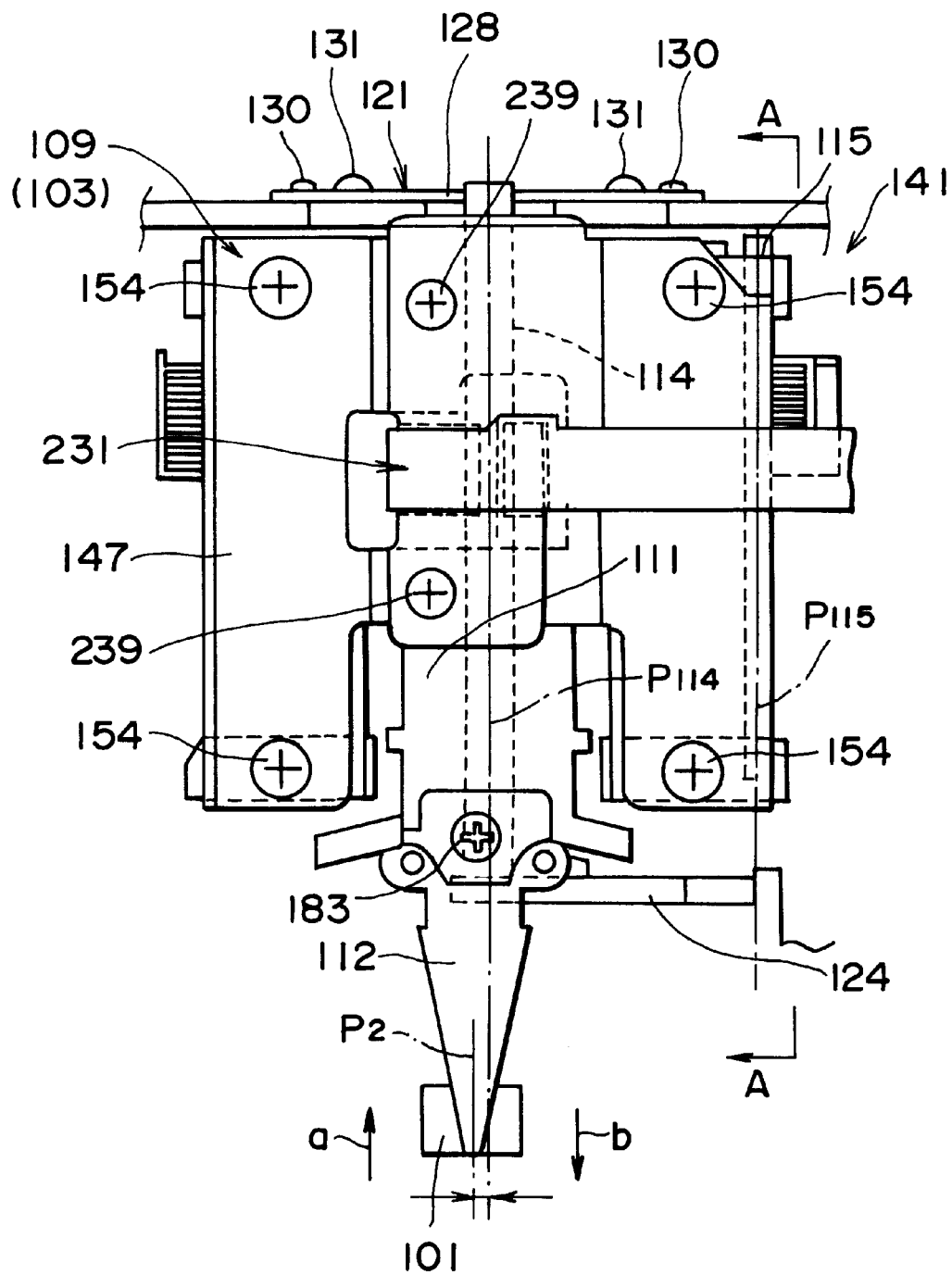
FIG. 55 is a plan view describing a linear actuator of this drive.
Figure 56:
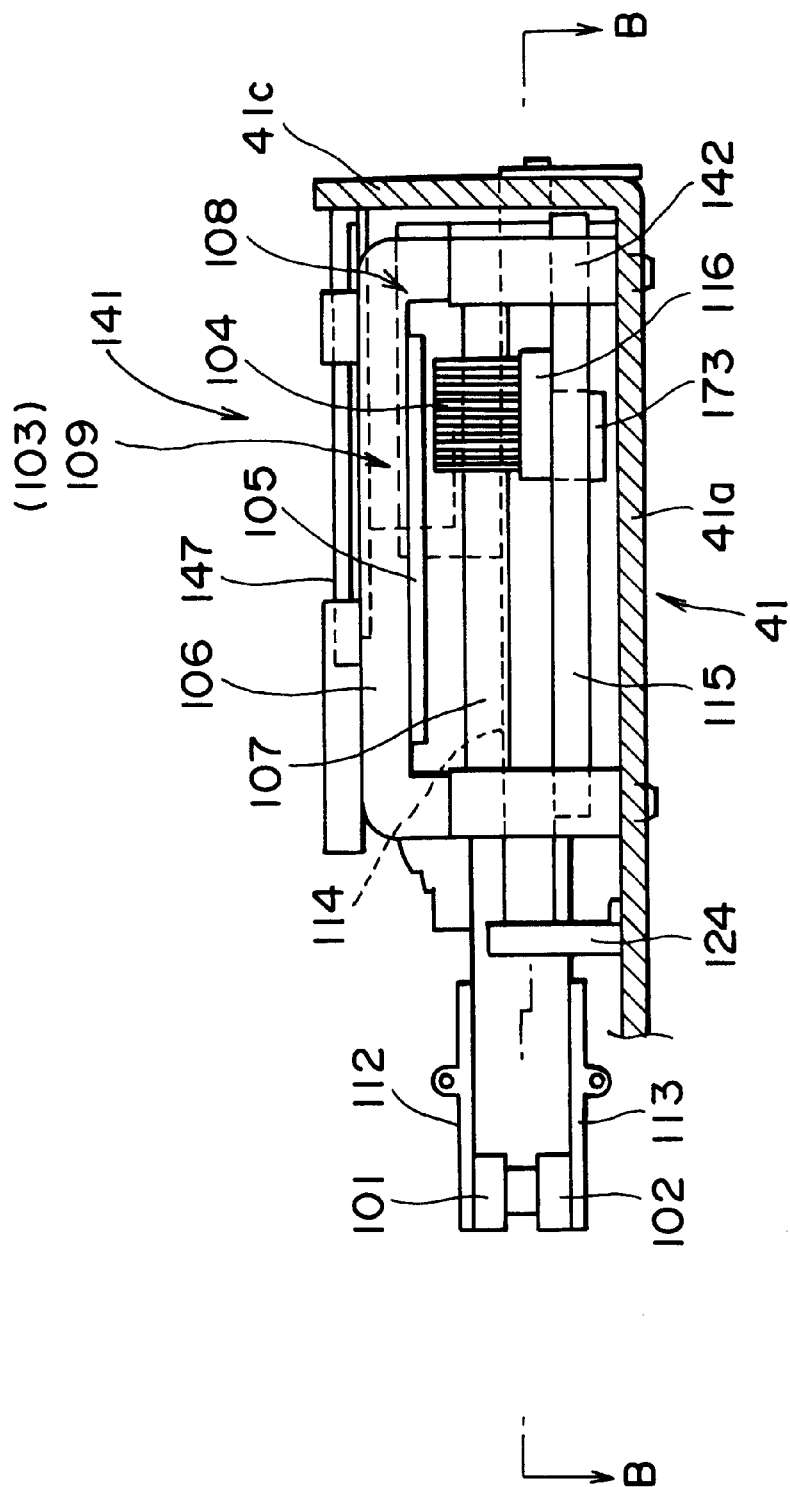
FIG. 56 is a sectional view along a line A—A in FIG. 58.
Figure 57:
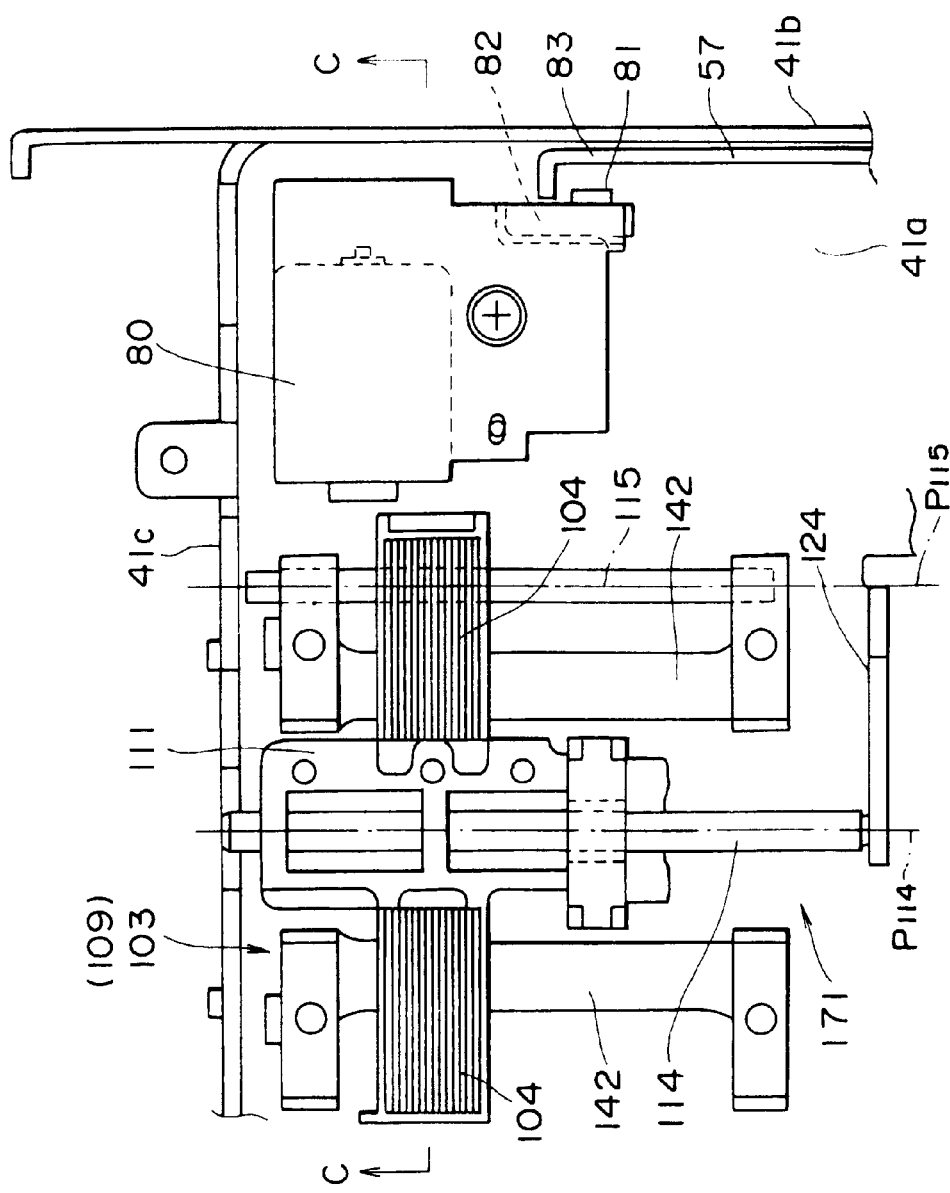
FIG. 57 is a sectional view along a line B–B in FIG. 56.
Figure 58:
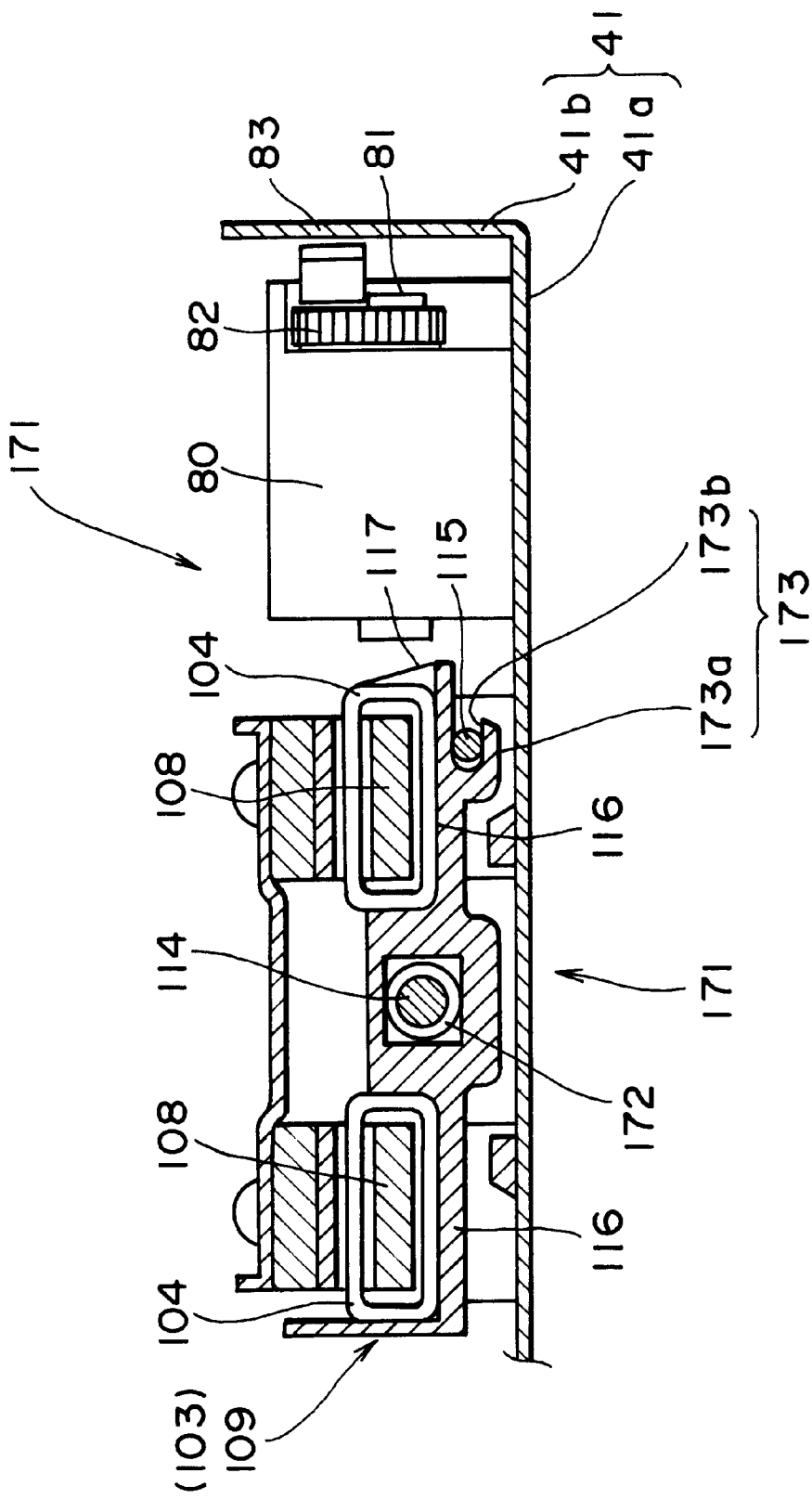
FIG. 58 is a sectional view along a line C–C in FIG. 57.

Next, the linear actuator 103 will be described by referring to FIGS. 55–58. The linear actuator 103 is a magnetic head transport mechanism which transports the upper and lower magnetic heads 101 and 102, forming a flying head structure in the directions indicated by the arrows a and b along the scanning center $P_2$. The linear actuator 103 is implemented by a voice coil motor 109 comprising a pair of left and right coils 104, and a pair of left and right magnetic circuits 108 comprising a pair of left and right magnet plates 105 and upper and lower yokes 106, 107 which together form a closed magnetic path. As will be seen later, the upper and lower magnetic heads 101, 102 are supported by a carriage 111 made of synthetic resin or the like via a pair of upper and lower head arms 112, 113. In this structure, the carriage 111 can slide freely in the directions indicated by the arrows a and b along the scanning center $P_2$ while being guided by a guide mainshaft 114 and a guide auxiliary shaft 115 installed in parallel to the scanning center $P_2$ on the base plate 41a of the chassis 41. Here, the guide mainshaft 114 is offset and disposed in a direction perpendicular to the axis direction for the scanning center $P_2$ as shown in FIG. 55. The left and right coils 104 are stuck by an adhesive material 117 in a horizontal posture on a coil base 116 formed in one piece on the left and right sides of the carriage 111. On the other hand, the left and right magnetic circuits 108, which are horizontal, form an angular closed magnetic path by vertically joining the ends of the upper and lower yokes 106, 107 in the longitudinal direction which are installed horizontally, and are vertically separated from each other. The magnet plates 105 are tightly bound to the lower surface of the upper yoke 106 or the upper surface of the lower yoke 107 by their own magnetic force. The left and right magnetic circuits 108 are installed in a horizontal posture parallel to the scanning center $P_2$ on the base plate 41a of the chassis 41. The left and right coils 104, which are installed so as to form a right angle with the scanning center $P_2$, are inserted without coming in contact with the outer circumference of the lower yoke 107 or the upper yoke 106 of the left and right magnetic circuits 108. The left and right coils 104 are electrically connected to the main board 60 through a flexible print board 118 shown in FIG. 49. When a control current is passed through these left and right coils 104, propelling forces are generated in the left and right coils 104 by the magnetic circuits 108, transporting the carriage 111 along the guide mainshaft 114 and the guide auxiliary shaft 115 in the directions indicated by the arrows a and b in the so-called seek and tracking operation.

(5) Description of Members for Installing the Guide Mainshaft

Figure 59:
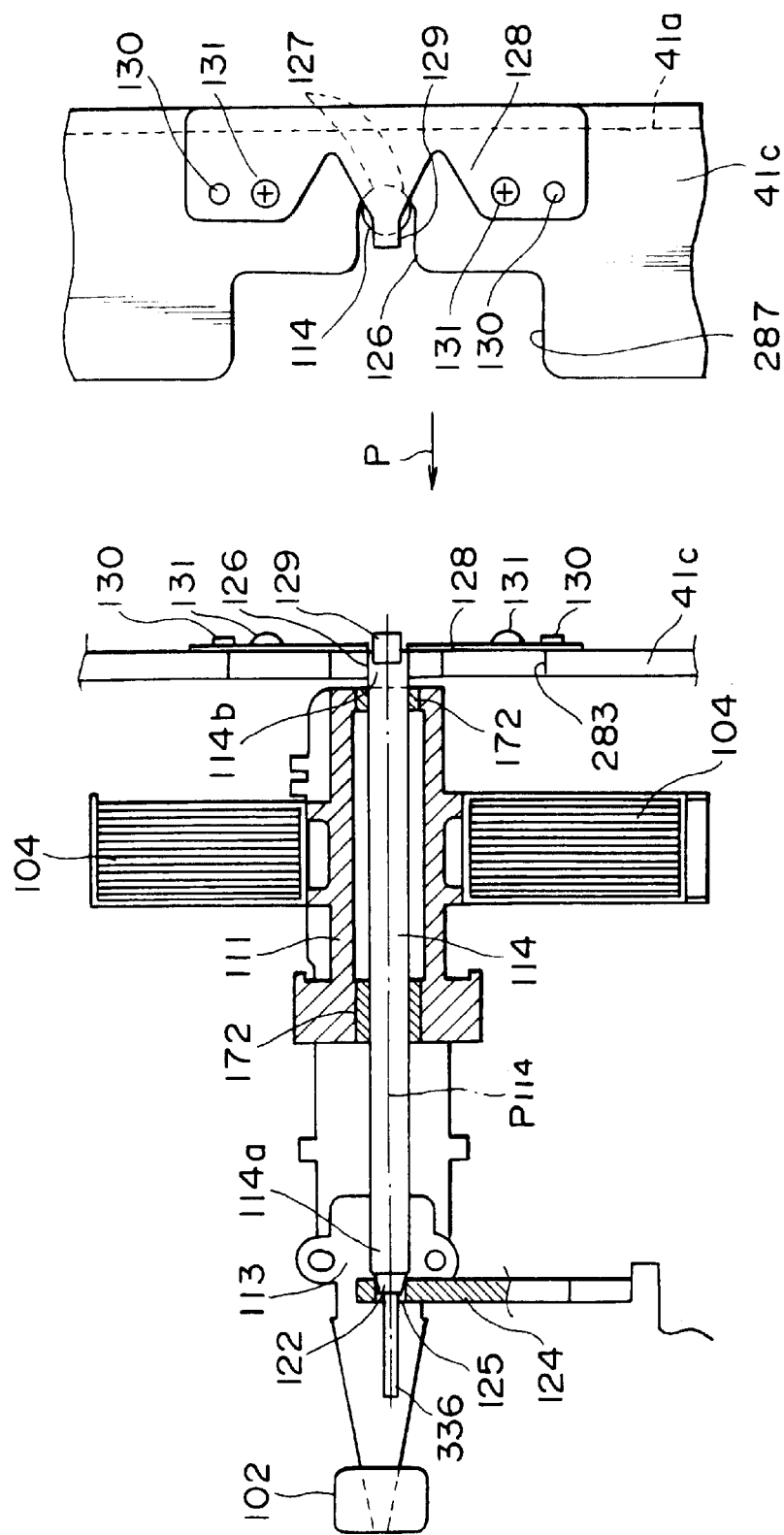
FIGS. 59A and 59B are partial cut-away plan views of a guide mainshaft attachment device.
Figure 60:
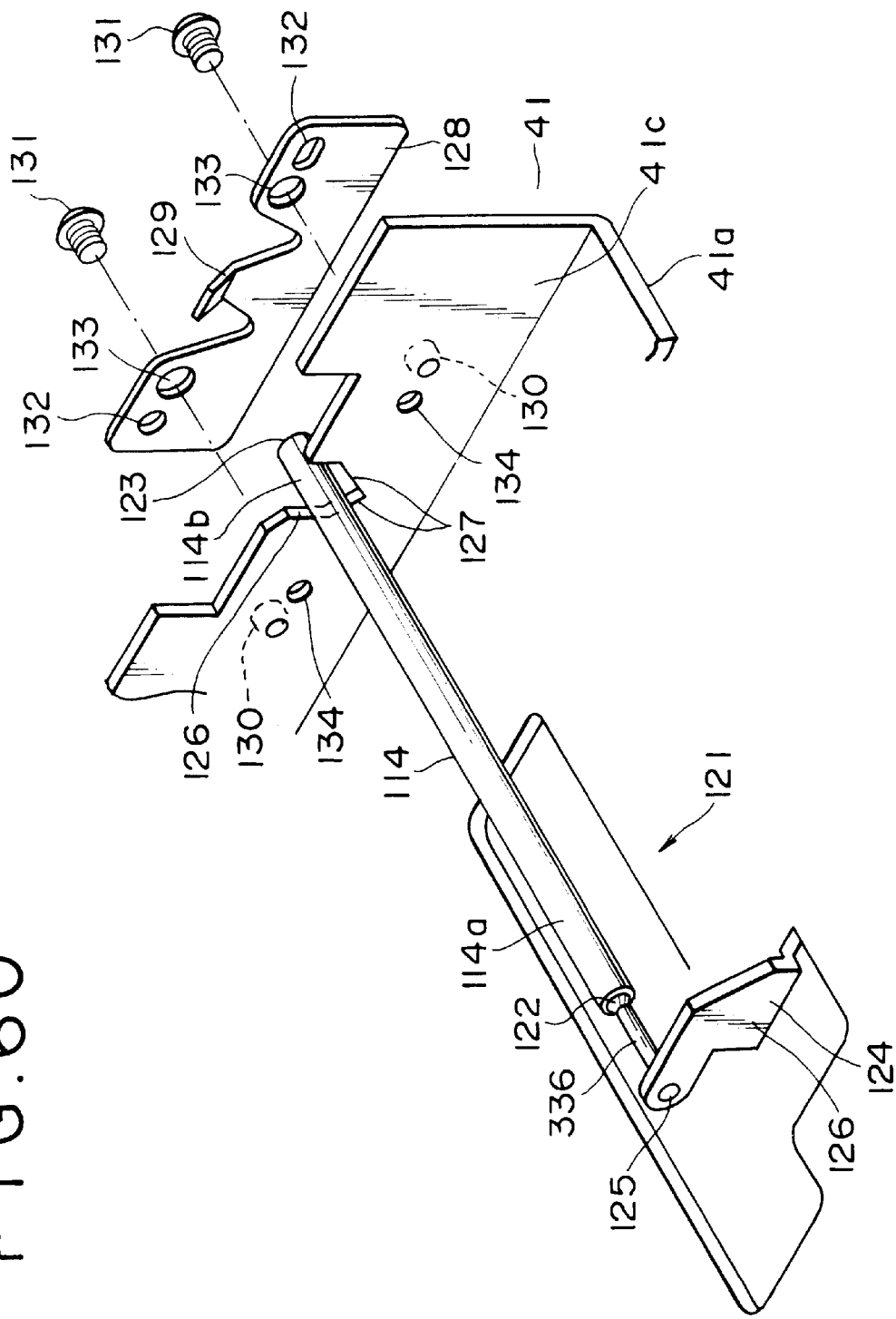
FIG. 60 is a perspective view of the components of a guide mainshaft attachment device.
Figure 61:
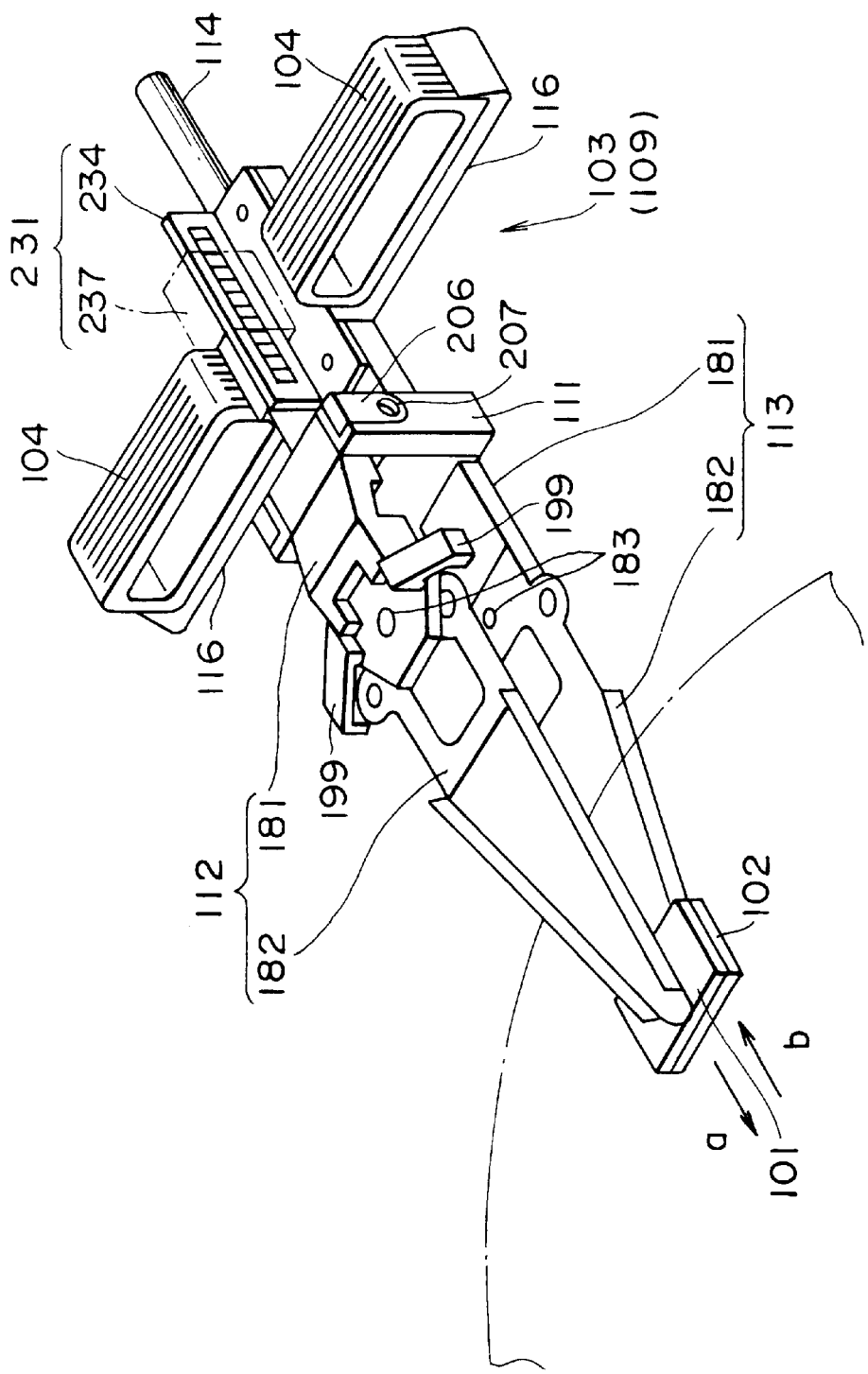
FIG. 61 is a perspective view describing a head assembly.
Figure 62:
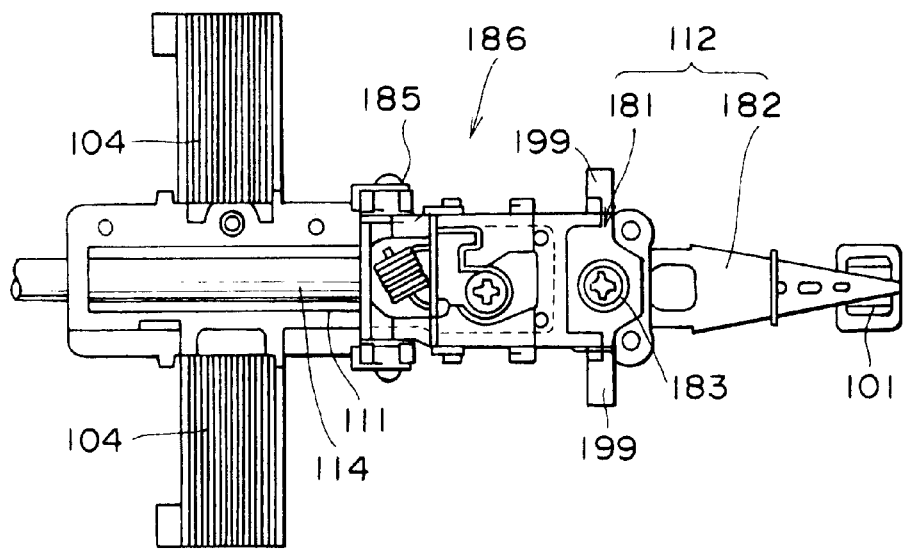
FIG. 62 is a plan view of FIG. 61.
Figure 63:
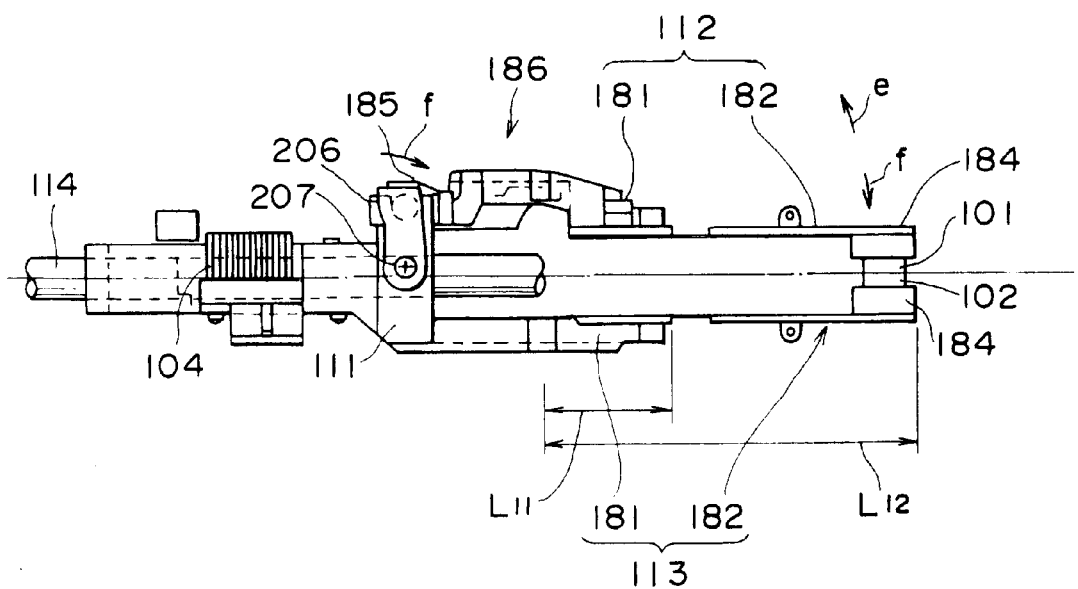
FIG. 63 is a lateral view of FIG. 62.
Figure 64:
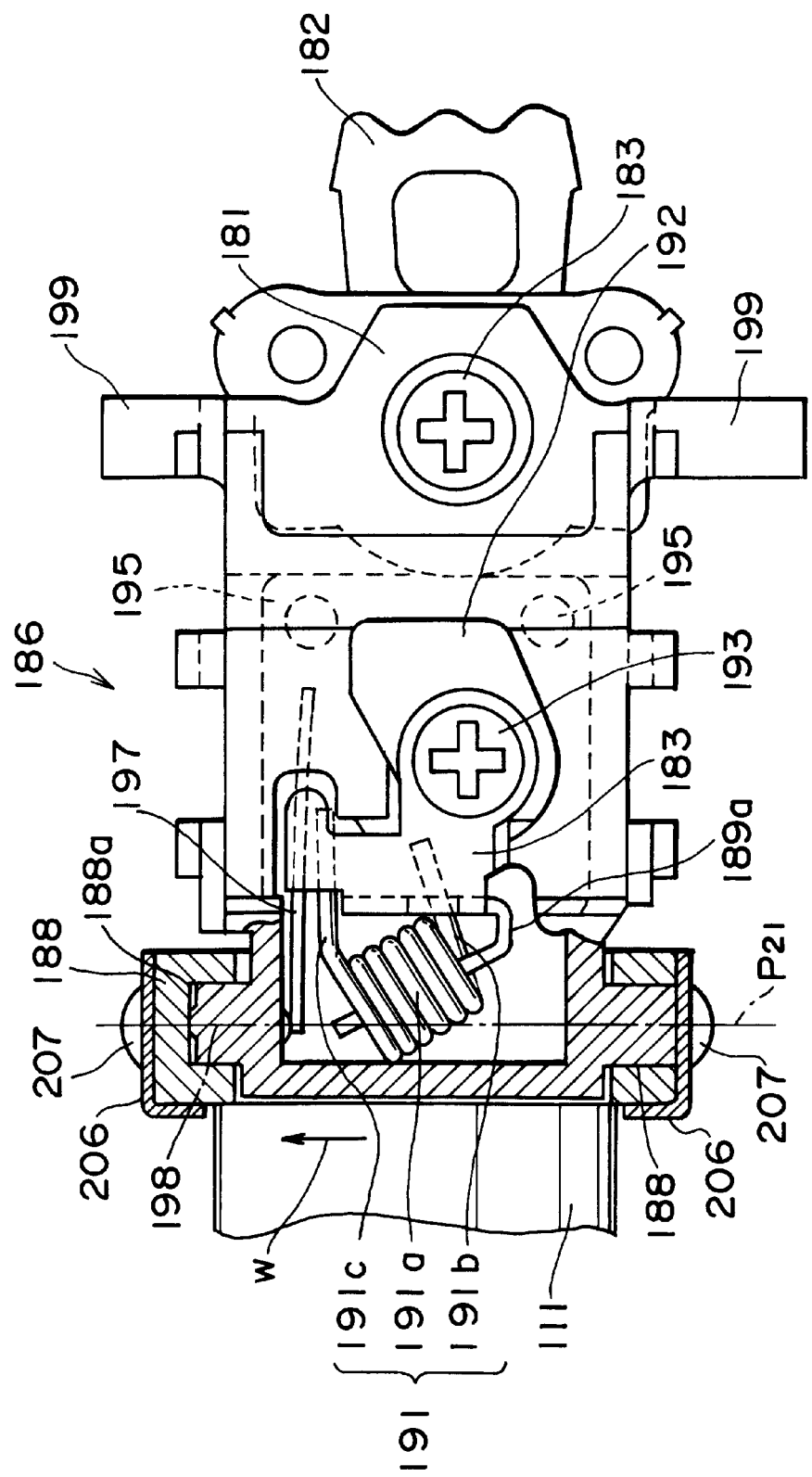
FIG. 64 is a partial cut-away plan view showing a rotation support mechanism of a head assembly.

As shown in FIGS. 55, 59 and 60, guide mainshaft installing members 121 for installing the guide mainshaft 114 on the chassis 41 comprise a taper shaft 122 of small diameter and a chamfer 123. The taper shaft 122 is formed concentrically at one end 114a of the guide mainshaft 114, whereas the chamfer 123 is provided on the outer circumference of the other end 114b of the guide mainshaft 114. A cut piece 124 which extends vertically upward from the base plate 41a of the chassis 41 and is disposed at right angles to the scanning center $P_2$, is formed at a front end fixed position of the guide mainshaft, and a guide mainshaft bearing hole 125, through which the taper shaft 122 of the guide mainshaft 114 is inserted, is formed in the cut piece 124. The guide mainshaft bearing hole 125 is formed with a diameter approximately equal to the average of the maximum and the minimum of the diameters of the taper shaft 122. A back plate 41c, which is a side wall extending vertically upward from the rear end of the base plate 41a of the chassis 41 and which is disposed so as to form a right angle with the scanning center $P_2$ is provided at a rear end fixed position of the guide mainshaft 114. A guide mainshaft bearing groove 126 is cut out of the back plate 41c vertically downward from the upper end thereof, a V-shaped taper surface 127 being formed at the lower end of the guide mainshaft bearing groove 126. A plate spring 128 is attached to the rear surface (surface on the opposite side to the front panel 44) of the back plate 41c by a pair of left and right positioning dowels 130 and by one or more screws 131 such that the plate spring 128 can be attached and removed from a position behind the rear surface. A pressure piece 129 inclined at an angle theta 1 with respect to a center $P_{114}$ of the guide mainshaft 114, is formed in one piece in the central upper part of this plate spring 128.

When the guide mainshaft 114 is installed in a horizontal posture parallel to the scanning center $P_2$ on the chassis 41, the taper shaft 122 of the guide mainshaft 114 is inserted into the guide mainshaft bearing hole 125 in a direction indicated by an arrow n while the rear end 114b of the guide mainshaft 114 is inserted into the guide mainshaft bearing groove 126 in a direction indicated by an arrow o as shown in FIG. 59. Then, the plate spring 128 is engaged with the left and right positioning dowels 130 on the back plate 41c of the chassis 41 by a pair of left and right positioning dowel holes 132 from the rear side, and a pair of left and right screws 131 inserted from the rear respectively into a pair of left and right screw through holes 133 on the plate spring 128 are attached to a pair of left and right screw stop holes 134 formed on the back plate 41c. In this way, the plate spring 128 is fixed to the rear surface of the back plate 41c by screws in a direction indicated by the arrow n. By so doing, the pressure piece 129 of the plate spring 128 is pressed elastically against the chamfer 123 on the rear end 114a of the guide mainshaft 114 in a direction indicated by an arrow p, that is, a direction inclined with respect to the axial center $P_{114}$, applying a pressing force Fp of the pressure piece 129 to the chamfer 123 of the guide mainshaft 114 in the direction indicated by the arrow p. A horizontal direction component Fn of the pressing force Fp presses the guide mainshaft 114 in a direction indicated by the arrow n, that is, the axial direction. As a result, the taper shaft 122 of the guide mainshaft 114 is inserted into the guide mainshaft bearing hole 125 by a wedge effect. At the same time, a vertical direction component Fo of the pressing force Fp presses the guide mainshaft 114 in a direction indicated by the arrow o, that is, a direction perpendicular to the axial direction. By the same token, the rear end 114b of the guide mainshaft 114 is pressed against the taper surface 127 of the guide mainshaft bearing groove 126 by a wedge effect. As a result, the guide mainshaft 114 is fixed on the chassis 41. In addition, the posture of guide mainshaft 114 parallel to the scanning center $P_2$ is adjusted with a high degree of precision by virtue of a self-aligning effect of the taper shaft 122 and the taper surface 127.

With the guide mainshaft installation members 121 having the structure described above, the guide mainshaft 114 can be attached to the chassis 41 very easily with a high degree of precision by using only a small number of components and by carrying out only a few assembly processes or, to be more specific, by merely fixing a single component comprising the plate spring 128 and the pressure piece 129 to the rear surface of the back plate 41c of the chassis 41 using one or more of the screws 131. As a result, the cost can be much reduced and productivity can be substantially improved.

(6) Description of Head Assembly

A head assembly 110 is described next by referring to FIGS. 61 to 70. The carriage 111 of the head assembly 110 is made of a rigid material such as synthetic resin or a light metal such as aluminum and magnesium. Designed as a flying head structure, the upper and lower magnetic heads 101, 102 are attached to the front end of the carriage 111 by the upper and lower head arms 112, 113 respectively. The upper and lower head arms 112, 113 each comprise an arm base 181, which is a molded part made of a rigid material such as synthetic resin or a light metal such as aluminum and magnesium, and a suspension 182 made of an elastic material such as a plate spring. The suspension 182 is attached to the tip of the arm base 181 by a screw tightening technique using a screw 183 or an outsert formation technique in a one piece construction. A pair of upper and lower head bases 184 are attached to vertically facing surfaces of the ends of the suspensions 182 of the upper and lower head arms 112, 113. The upper and lower magnetic heads 101, 102, each having a shape resembling a chip, are attached to the vertically facing surfaces of the upper and lower head bases 184 via gimbal plates, not shown. The length L11 of the arm base 181 of each of the upper and lower magnetic arms 112, 123 is set at ⅓ of the total length L12 of the upper and lower head arms 112, 123. When the high capacity floppy disk cartridge HFDC or the low capacity floppy disk cartridge FDC is loaded and unloaded to and from the high capacity floppy disk drive HFDD in the directions indicated by the arrows a and b as described earlier by referring to FIGS. 7 and 8, it is almost unnecessary to move the lower magnetic head 102 up and down. Thus, the arm base 181 of the lower head arm 113 for supporting the lower magnetic head 102 can be formed in one piece with the carriage 111 or fixed to the carriage 111 by using a screw. When the floppy disk cartridge HFDC having a high storage capacity or the low capacity floppy disk cartridge FDC is loaded and unloaded to and from the high capacity floppy disk drive HFDD in the directions indicated by the arrows a and b, however, it is necessary to move the upper magnetic head 101 up and down to avoid interference with these cartridges HFDC or FDC. For this reason, the arm base 181 of the upper head arm 112 supporting the upper magnetic head 101 is installed on an upper magnetic head mounting 185 formed in one piece with the carriage 111 such that the arm base 181 can be rotated by a rotation supporting mechanism 186 freely in the directions indicated by the arrows e and f in FIG. 63, that is the up and down directions respectively.

[0037]

In addition, the rotation supporting mechanism 186 comprises a pair of left and right support pins 187 formed in one piece with the mechanism 186. The support pins 187 are cylindrical shafts provided on a rotational center line $P_{21}$ perpendicular to the scanning center $P_2$ on the left and right sides of the rear end of the arm base 181 of the upper head arm 112. The left and right support pins 187 are engaged from above with V-shaped support pin engagement grooves 188 formed in one piece on the left and right sides of the upper magnetic head mounting 185. A coil 191a of a torsion coil spring 191 is inserted horizontally into a spring supporting arm 190 formed in a horizontal posture on a spring bearing 189 made of a sheet metal or synthetic resin. The torsion coil spring 191 serves as a means for naturally causing a rotation. The spring bearing 189 and the torsion coil spring 191 are inserted into an opening 192 formed on the arm base 181. The spring bearing 189 is fixed downward on the upper magnetic head mounting 185 by a screw 193 in order to set the torsion coil spring 191 in a state close to a space between the pair of left and right support pins 187. A spring contact rib 194 is formed in one piece with the arm base 181 in such a way that the spring contact rib 194 crosses a space beneath the torsion coil spring 191 at about the center of the opening 192. A movable end 191b of the torsion coil spring 191 is pressed downward against the spring contact rib 194, resisting a spring force, while a fixed end 191c of the torsion coil spring 191 is pressed upward against the spring bearing 189.

In the rotation supporting mechanism 186 having the aforesaid construction, as the entire arm base 181 is moved by the torsion coil spring 191 in a downward direction indicated by the arrow r, the left and right support pins 187 are pressed against the pair of left and right V-shaped grooves 188 in the direction indicated by the arrow r. A rotational force is then applied to the arm base 181 in the downward direction indicated by the arrow r around the left and right support pins 187. In this arrangement, the arm base 181 is pressed in the direction indicated by the arrow f against a pair of left and right horizontal reference surfaces 195, formed in one piece on the upper edge of the front end (side of the magnetic head 101) of the upper magnetic head mounting 185, to be settled thereon. Thus, with the left and right support pins 187 brought into contact with two contact points $P_{22}$ on the left and right V-shaped grooves 188 respectively in a steady and stable state, the upper head arm 112 can be rotated around the left and right support pins 187 in the upward and downward directions indicated by the arrows e and f. Even when the arm base 181 is returned by a force generated by the torsion coil spring 191 in the direction indicated by the arrow f, being brought into contact with the left and right horizontal reference surfaces 195, there will by no means be caused a problem that the left and right support pins 187 are floated above the two contact points $P_{22}$ of the left and right V-shaped grooves 188. In other words, there is absolutely no problem that a noise is caused in the supporting part of the pair of left and right supporting pins 187, and the arm base 181 is rotated with high precision in the direction of the arrows e, f around the support pins 187. In addition, as there are no unstable elements with respect to torsion and twists of components such as plate springs between the carriage 111 and the upper head arm 112, there is basically no degree of freedom with respect to torsion and twists provided that an excessively large external force exceeding a spring force generated by the torsion coil spring 191 is not applied in an upward direction indicated by an arrow v. As a result, adverse effects of rolling of the upper magnetic head 101 can be effectively eliminated. In addition, it is possible to ensure the installation precision of the suspension 182 of the upper head arm 112 relative to the carriage 111. Further, a pair of left and right support pin press plates 206 which press the pair of left and right support pins 187 from above, are screwed in on the left and right sides of the upper magnetic head mounting 185 by screws 207 as a safety means for preventing the pair of left and right support pins 187 from moving up away from the pair of left and right V-shaped grooves 188 due to an excessive external force.

The front end of an aside setting spring 197 comprising a plate spring or the like is inserted into a spring engagement groove 196 formed in a part of the front end side of the upper magnetic head mounting 185 on the rotation supporting mechanism 186 to be fixed therein. The entire arm base 181 is slid by the rear end of the aside setting spring 197 in an aside direction indicated by an arrow w. A pivot 198 integrated on an end surface of one of the support pins 187 (or a side surface of one of the V-shaped grooves 188) is elastically pressed against a side surface of one of the V-shaped grooves 188 (or an end surface of one of the support pins 187). Thus, it is possible to assure the positioning precision of the upper magnetic head 101 supported by the front end of the suspension 182 in the upper head arm 112 in the circumferential direction of the floppy disk 1 although the rotation of the upper head arm 112 in the directions indicated by the arrows e and f can be carried out smoothly. That is, the positioning precision of the upper magnetic head 101 on the floppy disk 1 can be assured with a high degree of reliability. In addition, by employing the arm base 181 made of a rigid material in each of the head arms 112 and 113, the length of the suspension 182 can be reduced. Thus, a vibrating resonance point of the suspension 182 having an adverse effect on the tracking servo can be brought to a high position, and the resonance of the upper and lower magnetic heads 101, 102 can be effectively eliminated. In the case of a head arm wherein a long suspension 182 is attached directly to the carriage 111, the spring constant of the suspension 182 becomes more lenient. Thus, when the posture of the floppy disk drive HFDD is changed, the heights of the upper and lower magnetic heads 101, 102 relative to the floppy disk 1 also change due to the effect of the weight of the suspension 182, and the floppy disk drive HFDD becomes more sensitive to vibration from an external source. By making the suspension 182 short, however, these problems are considerably resolved.

A pair of left and right slide arms 199 are also formed in one piece on the left and right sides of the front end, that is, the end on the side of the upper magnetic head 101, of the arm base 181 in the upper head arm 112. As shown in FIG. 49, the left and right slide arms 199 are mounted in an upper part of the left and right edges of the head insertion opening 73, formed by cutting out the central portion on the rear edge side of the ceiling plate 56a of the cartridge holder 56 along the scanning center $P_2$, such that the left and right slide arms 199 can be slid freely in the directions indicated by the arrows a and b.

Figure 66:
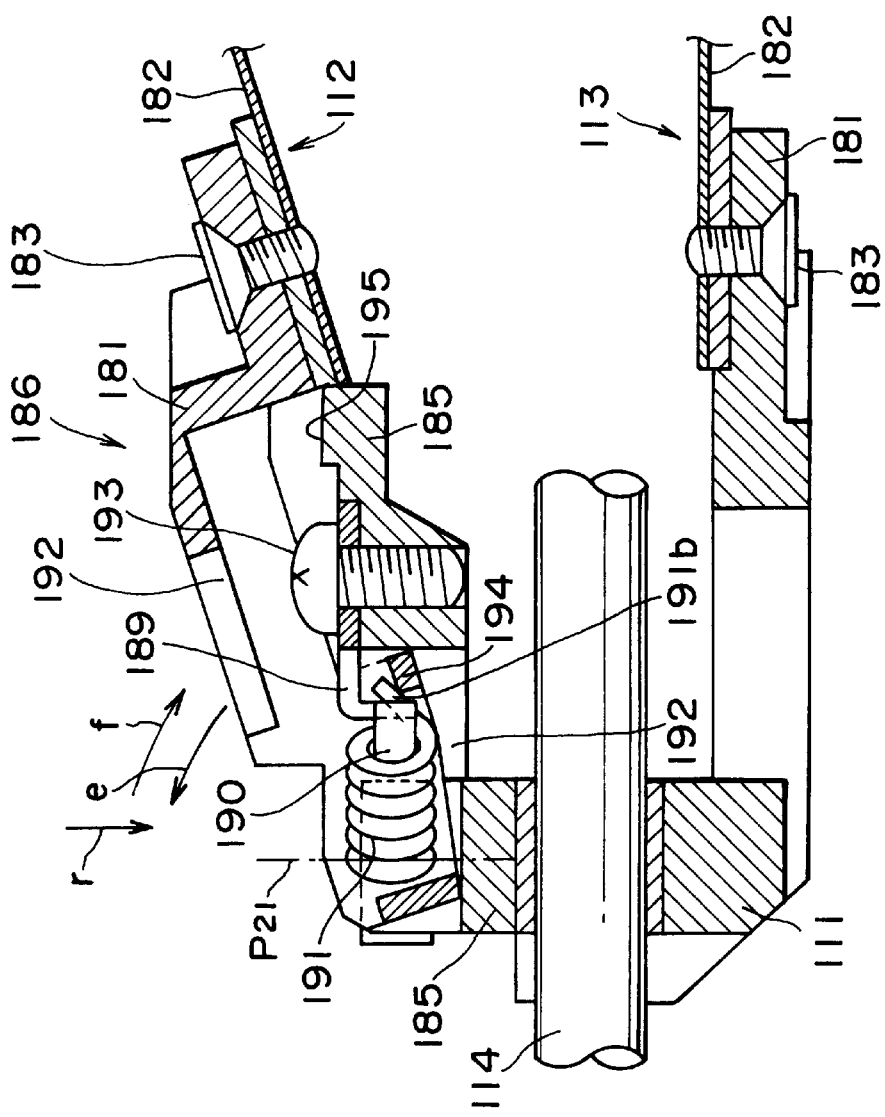
FIG. 66 is a sectional view when an upper head arm of FIG. 64 is rotated upwards.
Figure 69:
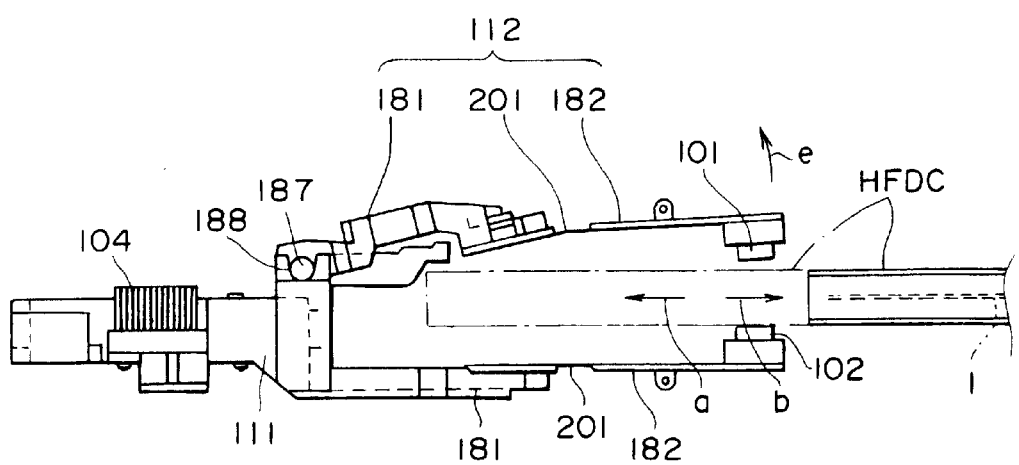
FIG. 69 is a lateral view describing the removal and insertion of a cartridge between upper and lower magnetic heads.

Thus, according to this high capacity floppy disk HFDD, in the unloading state of the high capacity floppy disk cartridge HFDC or the low capacity floppy disk cartridge FDC, when the cartridge holder 56 is raised in the direction indicated by the arrow h to the unloading position $P_{13}$ shown in FIG. 53, the left and right slide arms 199 of the upper head arm 112 are pressed upward by the cartridge holder 56 in the direction indicated by the arrow h so that, as shown in FIGS. 66 and 69, the arm base 181 of the upper head arm 112 is rotated upward in the direction indicated by the arrow e around the left and right support pins 187 against a force generated by the torsion coil spring 191, and the suspension 182 and upper magnetic head 101 are retracted in the direction indicated by the arrow f to a high position which is not prone to interference when the high capacity floppy disk cartridge HFDC or low capacity floppy disk cartridge FDC are inserted or taken out in the directions indicated by the arrow a or b respectively. On the other hand, the lower magnetic head 102 is initially set at a low position not prone to interference by the insertion or removal of the high capacity floppy disk cartridge HFDC or the low capacity floppy disk cartridge FDC in the directions indicated by the arrow a or b.

Figure 65:
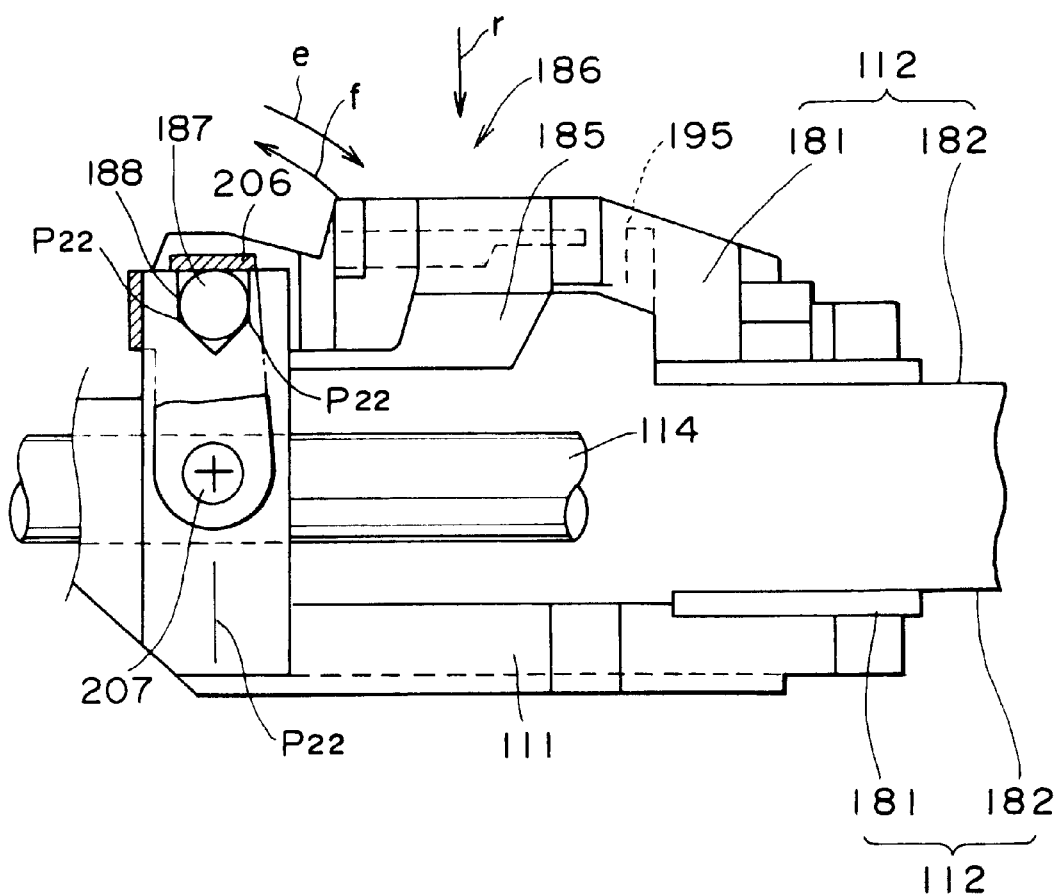
FIG. 65 is a partial cut-away view of FIG. 64.
Figure 67:
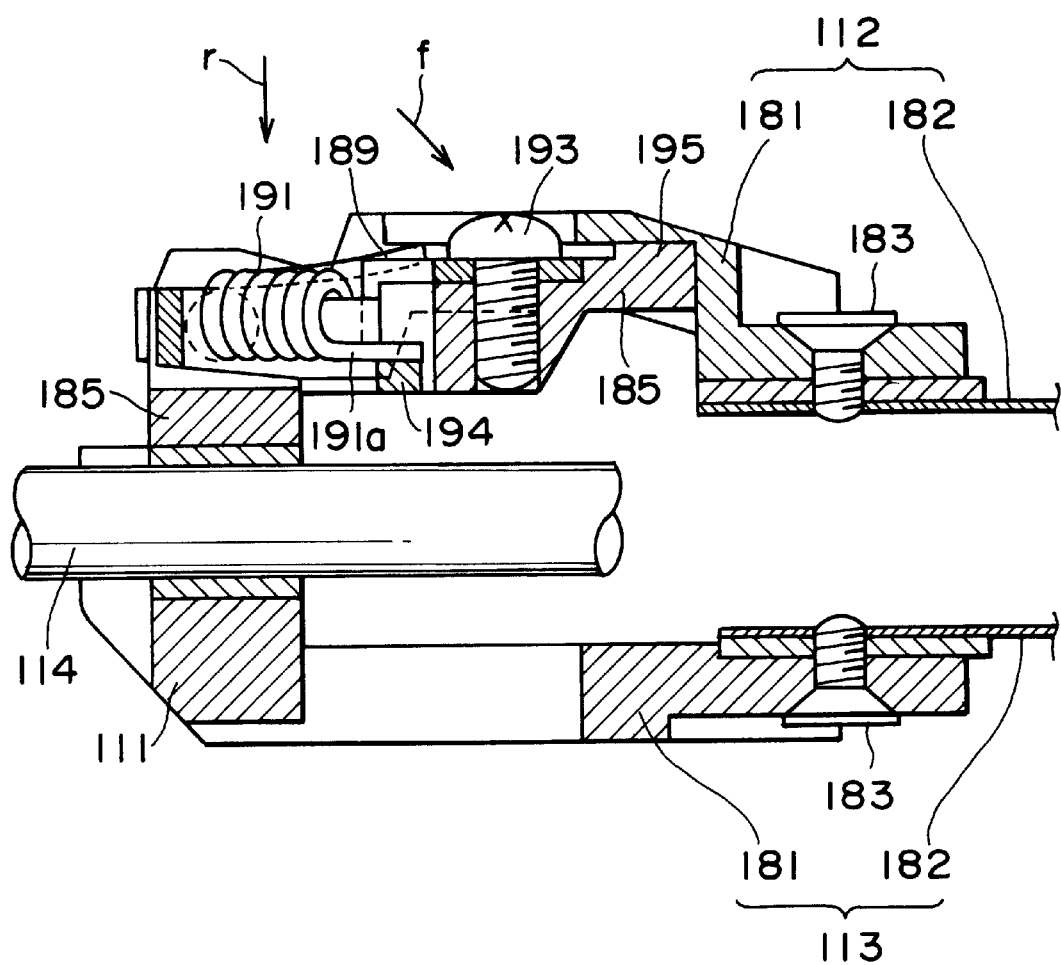
FIG. 67 is a sectional view when an upper head arm of FIG. 64 is returned to a fixed position.
Figure 68:
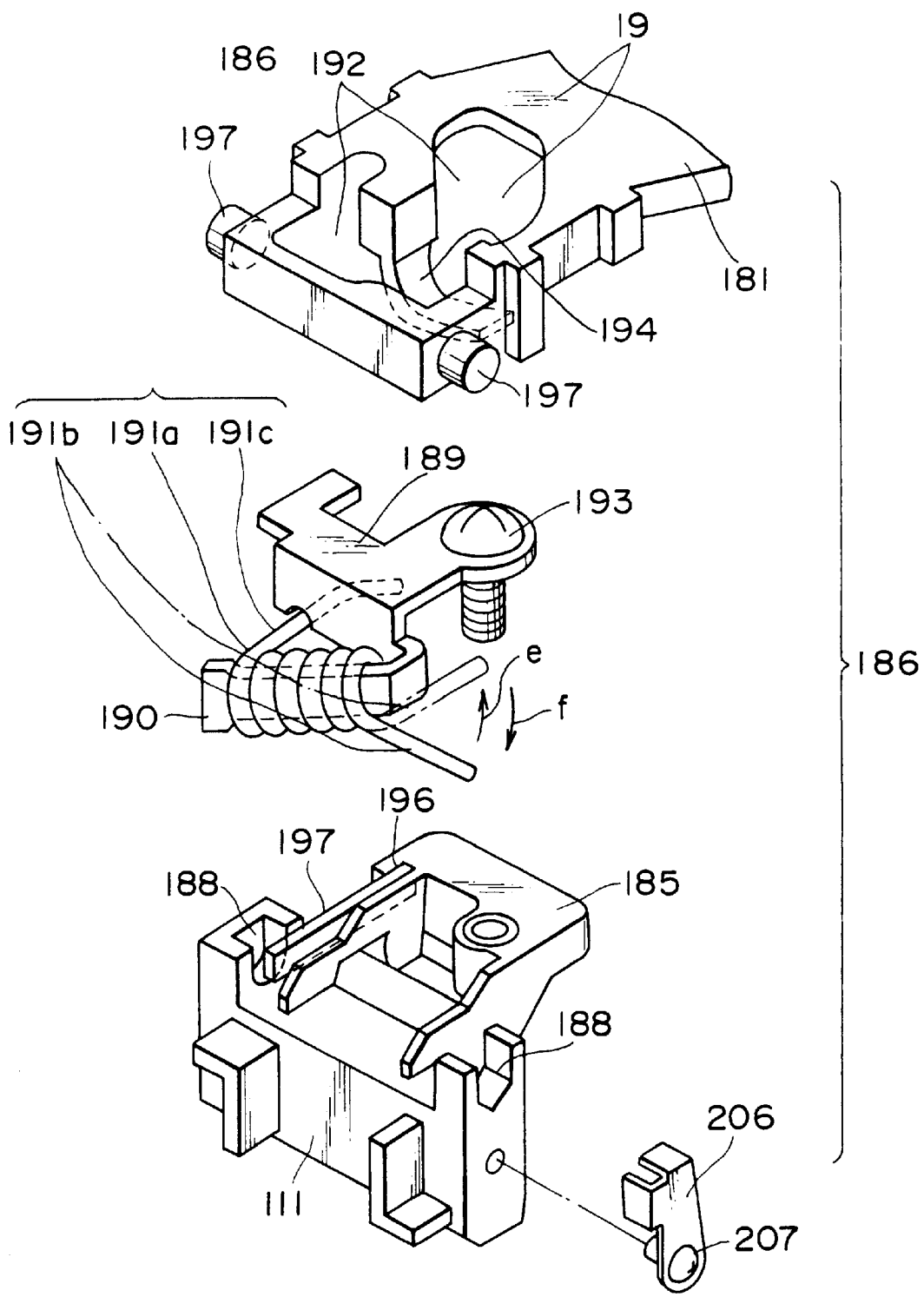
FIG. 68 is a perspective view of components of FIG. 64.
Figure 70:
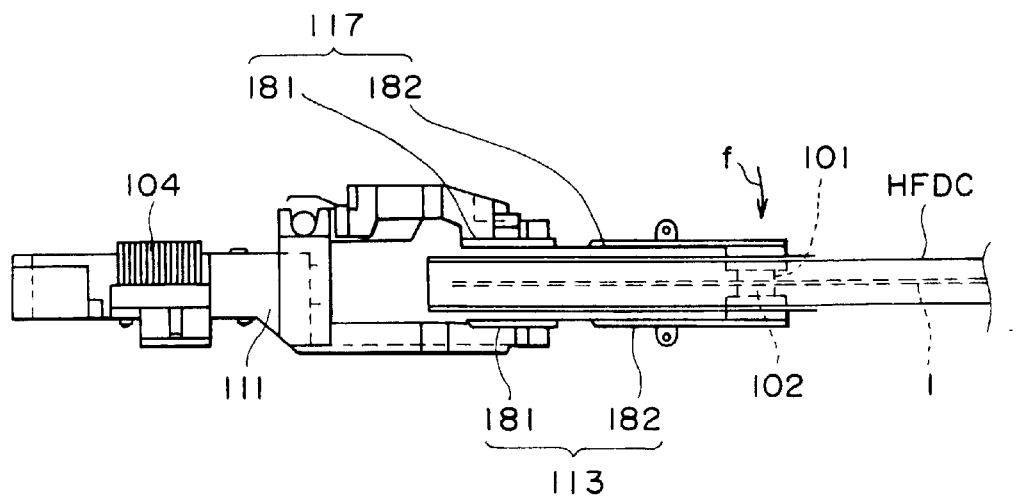
FIG. 70 is a lateral view describing recording and playback of a cartridge inserted between upper and lower magnetic heads.

Next, when the operation to load the high capacity floppy disk cartridge HFDC or the low capacity floppy disk cartridge FDC is completed, the cartridge holder 56 is moved down in the direction indicated by the arrow g to the loading position $P_{14}$ shown in FIG. 54A. In this state, first of all, the lower magnetic head 102 is inserted upward into the lower head insertion hole 7 of the high capacity floppy disk cartridge HFDC or the low capacity floppy disk cartridge FDC, being brought into contact with the lower surface of the floppy disk 1 thereof as shown in FIGS. 69 and 70. Then, the cartridge holder 56 is moved down in the direction indicated by the arrow g to a position lower than the lowest position of the left and right slide arms 199 of the upper head arm 112. In addition, the arm base 181 of the upper head arm 112 is rotated downward in the direction indicated by the arrow f around the left and right support pins 188 by the torsion coil spring 191, being brought into contact with the left and right horizontal reference surfaces 195 and settled thereon as shown in FIGS. 65, 67 and 70. Then, the upper magnetic head 101 is inserted downward by the suspension 182 of the upper head arm 112 into the upper head insertion hole 7 of the high capacity floppy disk cartridge HFDC or the low capacity floppy disk cartridge FDC, being brought into contact with the upper surface of the floppy disk 1 thereof.

The most important point is the fact that the distance, the parallelism and the levelness of the upper and lower suspensions 182 relative to the floppy disk 1 are controlled with a high degree of precision in a state wherein the upper and lower magnetic heads 101, 102 have been brought into contact with the upper and lower surfaces of the floppy disk 1. It is the rotation supporting mechanism 186 described earlier that makes it possible to control the distance, the parallelism and the levelness of the upper and lower suspensions 182 relative to the floppy disk 1 with a high degree of precision. In addition, the upper and lower suspensions 181 do not comprise any unstable elements such as torsions and twists. Therefore the upper and lower magnetic heads 101, 102 can be floated at a stable height above and below the upper and lower surfaces of the floppy disk 1 respectively with a high degree of stability by virtue of a balance of weights of the upper and lower suspensions 182 without causing irregular rolling of the upper and lower magnetic heads 101, 102, and particularly in the case of the high capacity floppy disk cartridge HFDC wherein the floppy disk 1 is driven into rotation at a high rotational speed of at least 3,600 rpm, and the upper and lower magnetic heads 101, 102 are separated from the upper and lower surfaces of the floppy disk 1 respectively by air films in order to record and/or play back 100 MB or more of data at a high density. At the same time, the upper and lower magnetic heads 101, 102 can be driven into smooth scanning even in the event of slight surface vibration occurring on the floppy disk 1, allowing the recording and/or playing back of data on and/or from the floppy disk 1 to be carried out in a stable and steady state. It should be noted that, much like the upper head arm 112, the lower head arm 113 can also be attached to the carriage 111 by the rotation supporting mechanism 186 in such a way that the lower head arm 113 is freely rotatable in the upward and downward directions (indicated by the arrows e and f.

(7) Description of a Tracking Servo

Figures 71A, 71B:
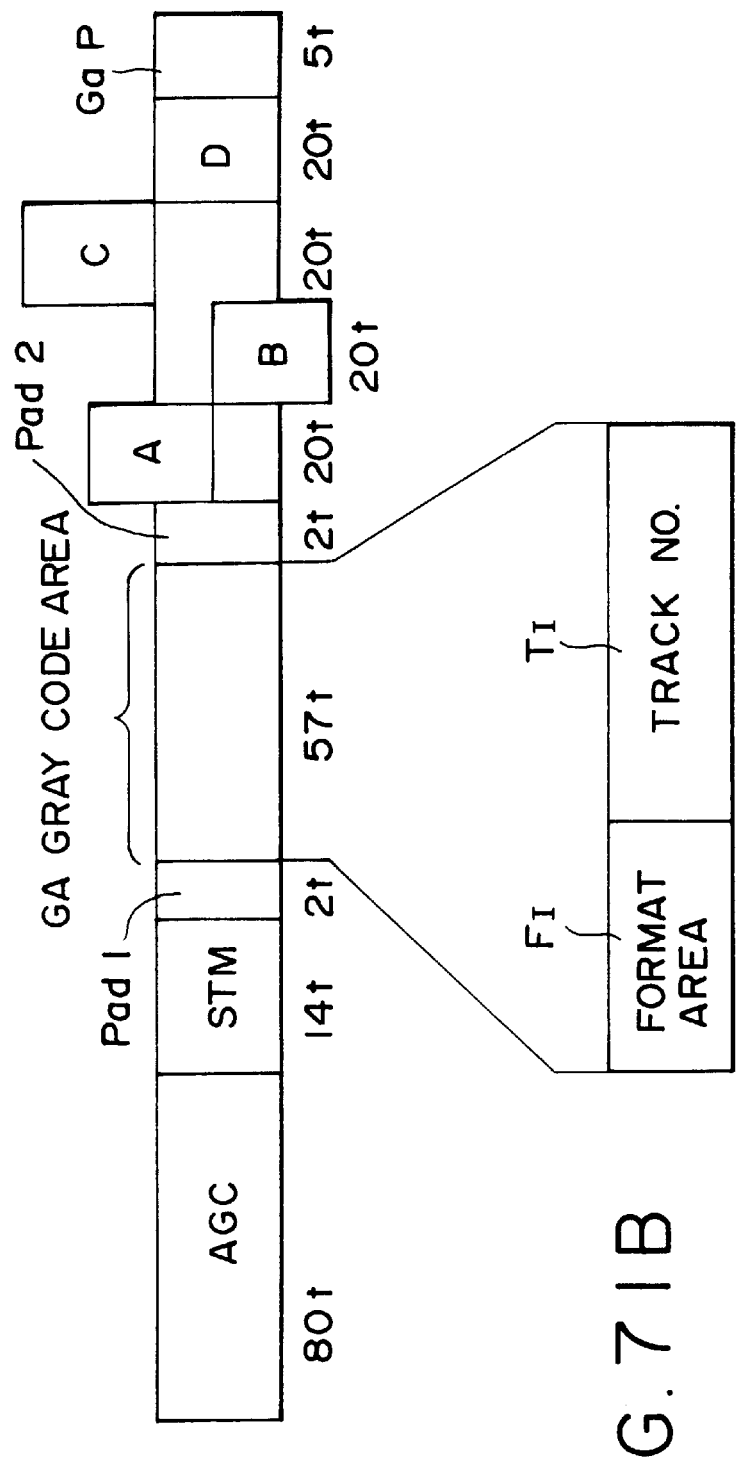
FIGS. 71A and 71B are drawings describing a tracking servo.
Figure 72:
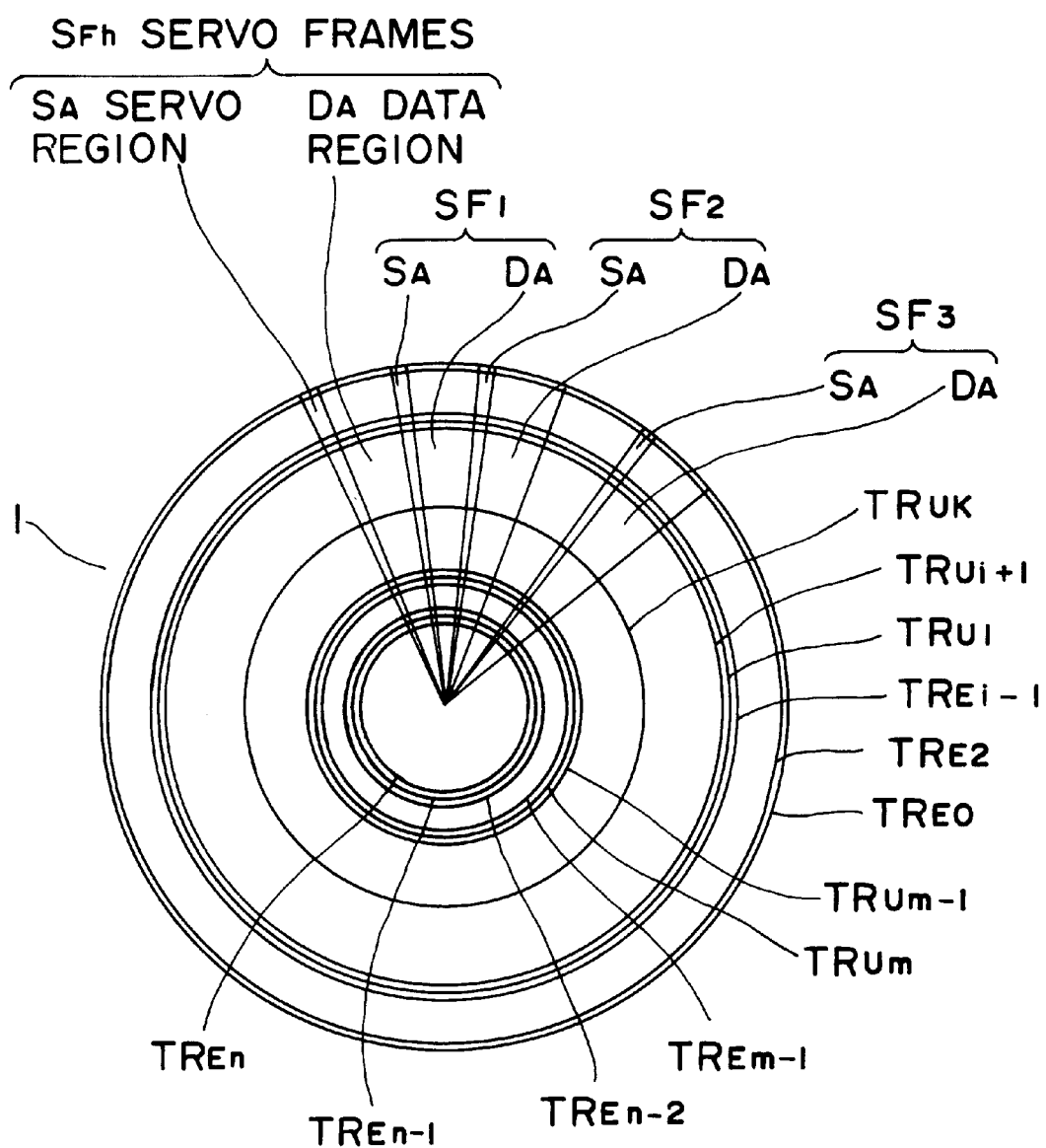
FIG. 72 is a descriptive drawing of a floppy disk describing the tracking servo.

A tracking servo is implemented on the high capacity (upper) floppy disk 1 of the high capacity floppy disk cartridge HFDC mounted in the high capacity floppy disk drive HFDD of the present invention, as shown in FIGS. 71 and 72.

The tracking servo adopts an embedded servo technique for carrying a servo operation for each servo frame whereby format information is written into a servo area as shown in FIG. 71. This format information is typically used to notify the high capacity floppy disk drive HFDD of the format of the high capacity floppy disk 1 or a version difference, and it is recorded in a servo area SA.

As shown in FIG. 72, the high capacity floppy disk 1 comprises tracks $TR_{Ui}, TR_{Ui-1}, \ldots, TR_{Uk}, \ldots, TR_{Um-1}$ and $TR_{Um}$ formed in a user data recording/playback area, empty tracks $TR_{E0}, TR_{E2}, \ldots, TR_{Ei-1}$ formed at an outer circumferential position outside the user data recording/playback area, and empty tracks $TR_{Em+1}, \ldots, TR_{En-1}$ and $TR_{En}$ formed at an inner circumferential position outside the user data recording/playback area, these tracks being laid out in the radial direction.

A plurality of h servo frames $SF_1, SF_2, \ldots, SF_g, \ldots, SF_n$ are formed in an inner circumferential direction of the high capacity floppy disk 1. The number h of servo frames is typically 100. Thus, in the recording and/or playback of data on and/or from the high capacity floppy disk 1, information is read out from the servo frames $SF_1, SF_2, \ldots SF_g, \ldots SF_n$ to perform tracking with a high degree of precision.

(8) Description of Head Raising and Lowering Mechanism

Next, a head raising and lowering mechanism 331 which raises and lowers the pair of upper and lower magnetic heads 101, 102 supported in the carriage 111 via the pair of upper and lower suspensions 182 between a head loading position wherein they are in contact with the upper and lower surfaces of the floppy disk 1 which is a disk-shaped recording medium, and a head unloading position where they are moved above and below the upper and lower surfaces of the disk 1, is incorporated in this high capacity floppy disk drive HFDD, as shown in FIGS. 1 to 17.

This head raising and lowering mechanism 331 is selectively disposed in a loading position on the chassis 41 further back than the front end 5a which is the outer circumference of the cartridge 5 of the high capacity floppy disk cartridge HFDC and low capacity floppy disk cartridge FDC which are loaded horizontally, as shown in FIGS. 5 to 11.

In this head raising and lowering mechanism 331, the slide plate 57 of the aforesaid cartridge loading mechanism 58 is formed from a first slide plate (hereafter referred to as first slide plate), and the pair of upper and lower head raising and lowering arms 332, 333 are mounted on a second slide plate 334.

The pair of upper and lower head raising and lowering arms 332, 333 are inserted vertically inside (between) the pair of upper and lower suspensions 182 at right angles to the scanning center $P_2$ which is the length direction of the pair of upper and lower suspensions 182. A fixed guide shaft 335 parallel to the scanning center position $P_2$ is constructed horizontally between the pair of upper and lower suspensions 182, and a horizontal pivot shaft 336 is constructed parallel to the guide shaft 335 on the second slide plate 334 at a side position of the guide shaft 335.

The guide shaft 335 is formed in one piece concentrically with the tip of the guide mainshaft 114 of the carriage 111, and the pivot shaft 336 is constructed on a support 334a cut out from the second guide plate 334, as shown in FIGS. 59 and 60. The pivot shaft 336 is inserted in shaft insertion holes 337, 338 formed at one end 332a, 333a of the pair of upper and lower head raising and lowering arms 332, 333, these upper and lower head raising and lowering arms 332, 333 being so constructed that they are symmetrically rotated in the upward/downward directions of the arrows A, B shown in FIGS. 1 through 4 around the pivot shaft 336.

Cam grooves 339, 340 are formed horizontally in the length direction at the other ends 332b, 333b of the pair of upper and lower head raising and lowering arms 332, 333, the guide shaft 335 being inserted free to slide in this pair of upper and lower cam grooves 339, 340 perpendicular to the axial direction. A pair of upper and lower cam action parts 339a, 340a for rotating the pair of upper and lower head raising and lowering arms 331, 332 in the direction of the arrows A, B, are formed in a shape which is symmetrically bent up and down at one end on the pivot shaft 336 side of the pair of upper and lower cam grooves 339, 340.

Figure 14:
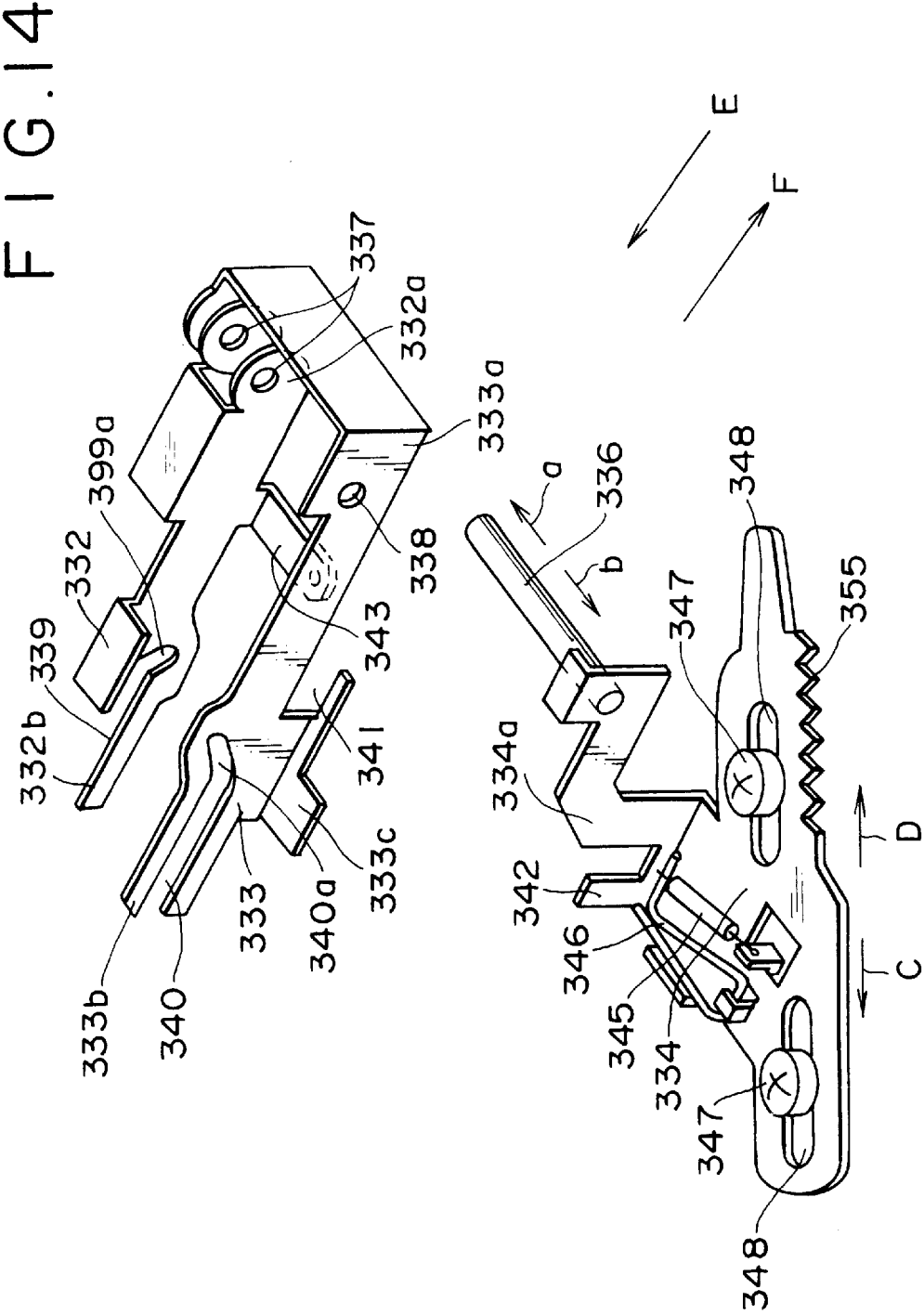
FIG. 14 is a perspective view of the components of essential parts showing another embodiment of this head raising and lowering mechanism.
Figure 30:
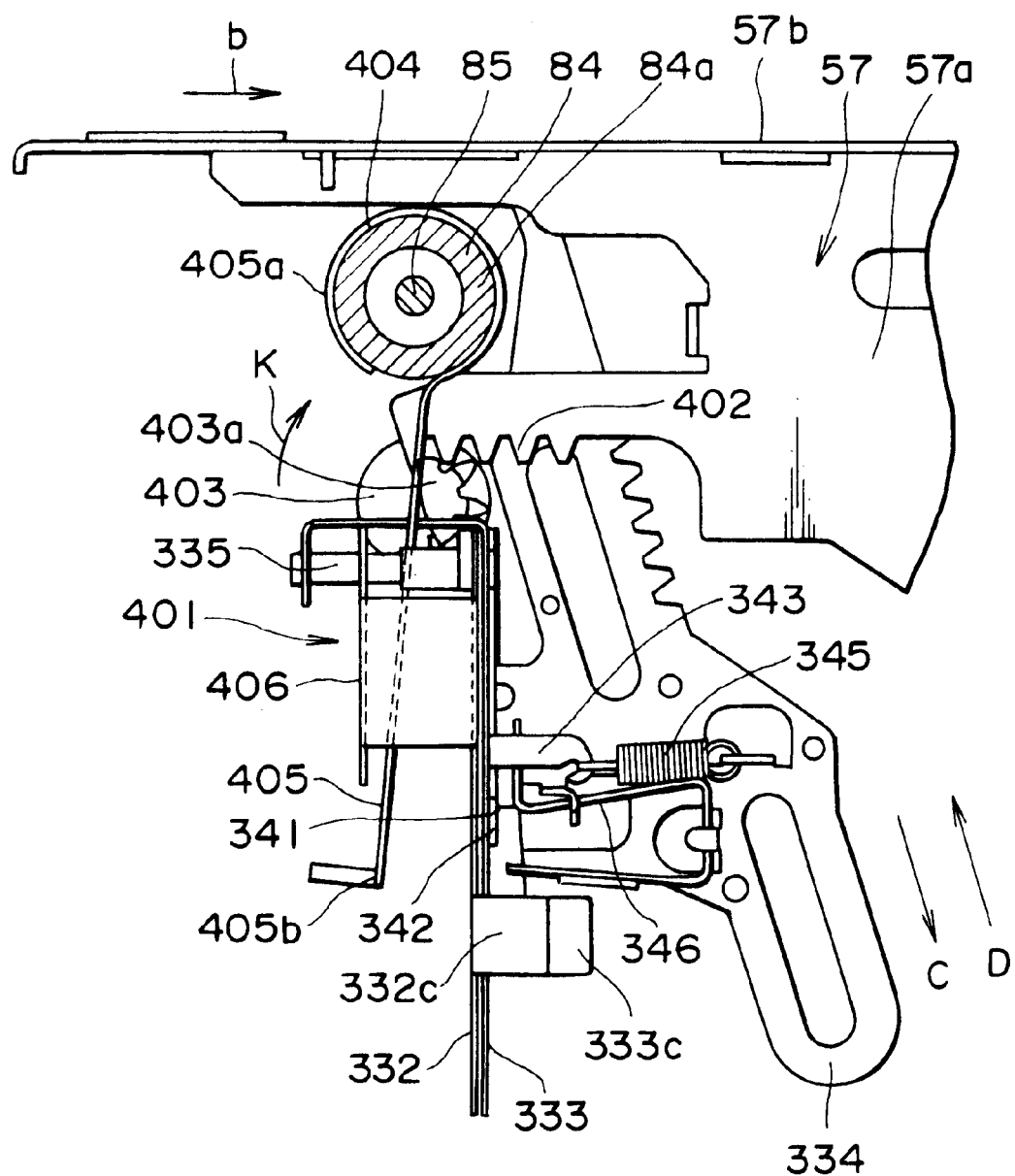
FIG. 30 is a plan view describing a slide mechanism attached to this head raising and lowering mechanism.
Figure 31:
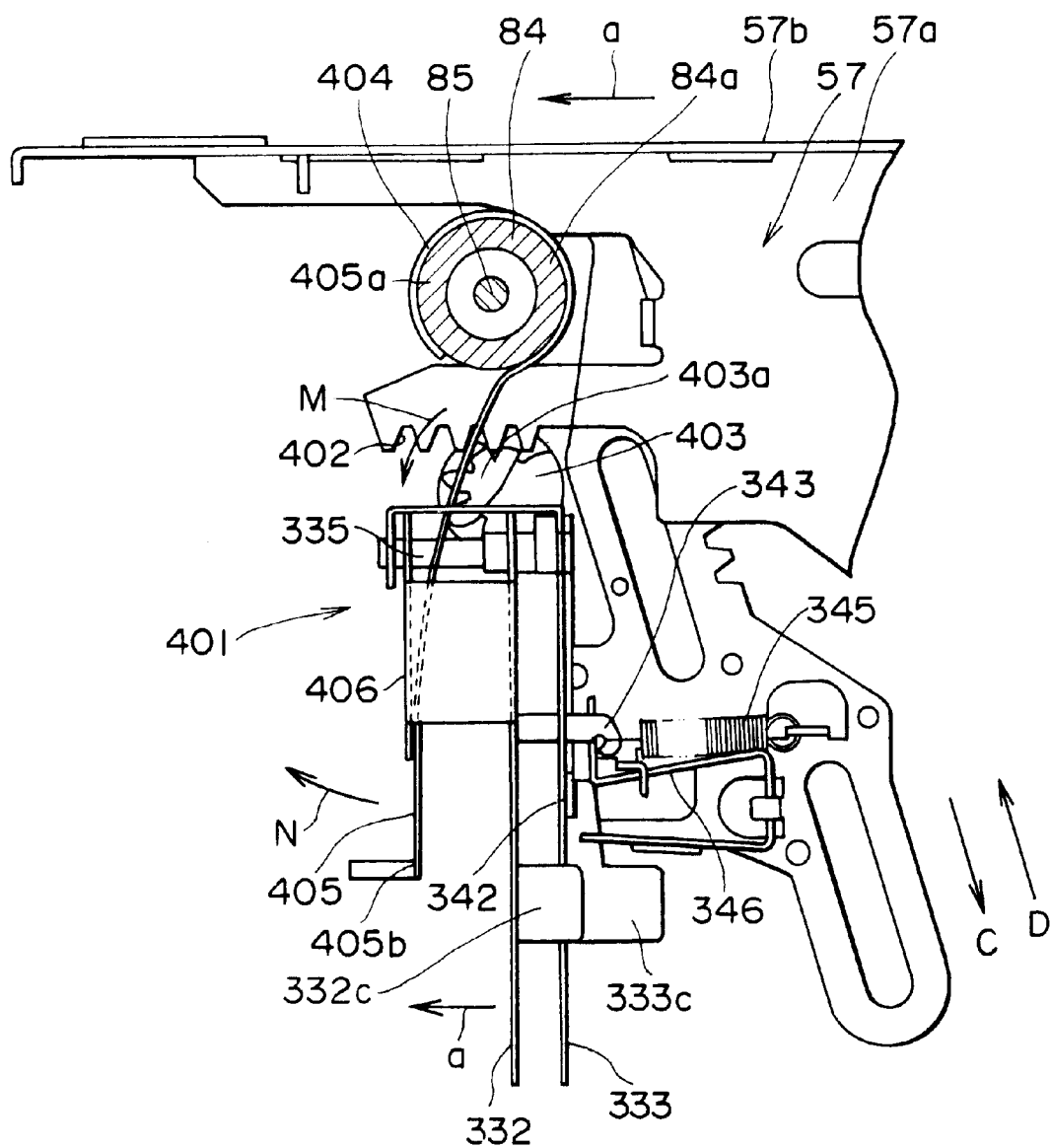
FIG. 31 is a plan view describing a slide state of the head raising and lowering mechanism according to this slide mechanism.
Figure 32A:
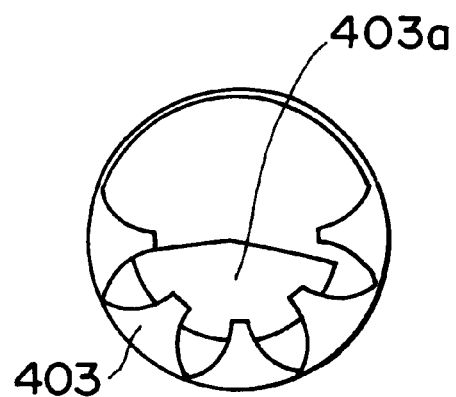
FIGS. 32A and 32B are plan views describing a cam gear and plate spring attached to this head raising and lowering mechanism.
Figure 32B:
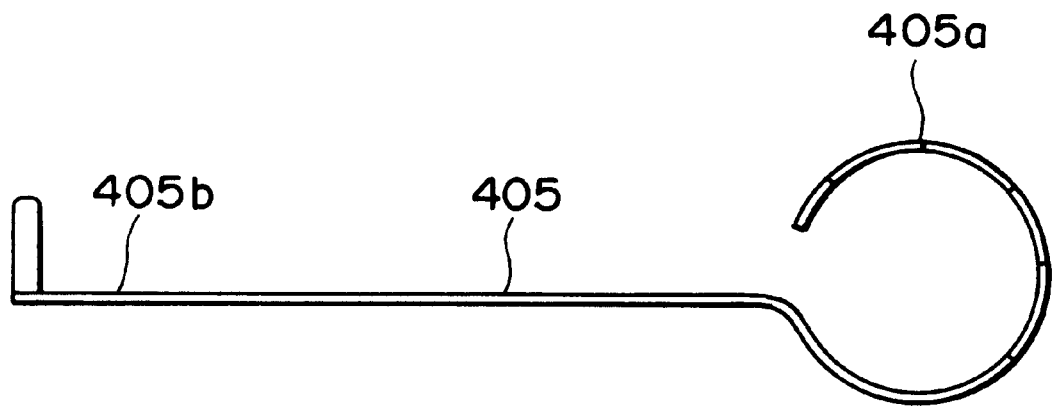
Figure 33:
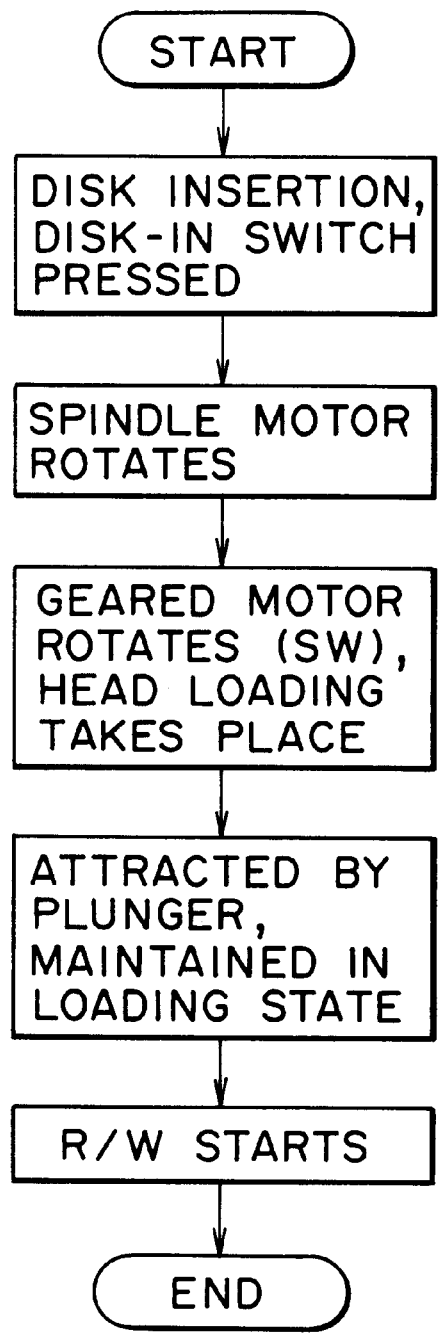
FIG. 33 is a flowchart describing head loading when a disk of this high capacity floppy disk drive is initially inserted.

In the middle part of the length direction of the pair of upper and lower head raising and lowering arms 331, 333, suspension backing plates 332c, 333c bent horizontally are formed in one piece at right angles to the top and bottom edges of these arms on the side of the pair of upper and lower magnetic heads 101, 102. One of the head raising and lowering arms 332 which raises and lowers the upper magnetic head 101, is formed free to slide in the direction of the arrows C, D which is the front/back direction along the guide shaft 335 and pivot shaft 336. The other head raising and lowering arm 333 which raises and lowers the lower magnetic head 102 is disposed in front of the first head raising and lowering arm 332 (on the side of the arrow a), sliding of this other head raising and lowering arm 333 in the direction of the arrows C, D being prohibited. Specifically, a slit 341 formed at the lower edge of the other head raising and lowering arm 333 is engaged free to slide in the direction of the arrows A, B with a vertical guide piece 342 formed in part of the supporting piece 334a of the second slide plate 334, thereby prohibiting the sliding of this other head raising and lowering arm 333 in the direction of the arrows C, D. A pull coil spring 345, which is a slide pushing means, is suspended between a horizontal spring stop 343 bent at the lower edge of one of the head raising and lowering arms 332 and a spring stop 345 cut out from the second slide plate 334, and due to this pull coil spring 345, the head raising and lowering arm 332 is pushed so that it slides in the direction of the arrow C along the guide shaft 335 and pivot shaft 336. It is desirable that the head raising and lowering arm 332 is rotated without fail in the direction of the arrow A, i.e., upwards, by the grip coil spring 346 which is a rotating means attached to the second slide plate 334 as shown in FIGS. 14, 30 and 31, but this grip coil spring 346 is not absolutely necessary. This second slide plate 334 is guided by a pair of guide pins 347 and guide grooves 348 on a chassis 241, and is formed in the direction of the arrows E, F along a slide center P334 which is a slanting direction inclined to the scanning center $P_2$. Due to the sliding of this second slide plate 334, the pair of upper and lower head raising and lowering arms 332, 333 is inserted in (between) and ejected from the pair of upper and lower suspensions 182 from the direction of the arrows E, F.

A third slide plate 351 formed free to slide in the direction of the arrows a, b, which is the same direction as that of the first slide plate 57, is disposed between the first slide plate 57 and second slide plate 334, as shown in FIGS. 9 to 21. This third slide plate 351 and the second slide plate 334 operate in conjunction with a direction changing means 356 comprising a rack 352 and pinion 353, and a pinion 354 and rack 355, which are two sets of gears. The second slide plate 334 is made to slide in the direction of the arrows C, D in synchronism with the sliding of the third slide plate 351 in the direction of the arrows a, b. This third slide plate 351 is engaged free to slide by a pair of guide grooves 357 at the base of a boss 84a of a trigger lever 84 and a height reference pin 65 attached to the chassis 41.

A drive mechanism 361 which selectively drives the first and third slide plates 57, 351 by the eject motor 80 comprising a guard motor, comprises the eject drive pin 81 of the eject cam 82, eject arm 83 of the first slide plate 57, and a transmission arm 362 which is a molded part attached to the third slide plate 351, as shown in FIGS. 9 to 21.

This transmission arm 362 is incorporated horizontally at right angles to the direction of the arrows a, b in an arm supporting member 351a formed at the rear end (rear end in the direction of the arrow a) of the third slide plate 351, and is free to rotate in the direction of the arrows G, H. The eject drive pin 81 selectively comes in contact from the direction of the arrow b with an arm part 363 extending backwards from the outer edge of this transmission arm 362 (on the side of the arrow a).

A pin 364 formed in one piece at right angles on the outside of this arm part 363 can come in contact with the eject arm 83 of the first slide plate 57 from the direction of the arrow d. A pull coil spring 367 having a long stroke is suspended between a spring stop 365 formed in one piece at right angles inside this arm part 363, and a spring stop 366 formed on the chassis 41 at a position sufficiently towards the rear (on the side of the arrow a). This pull coil spring 367 causes the third slide plate 351 to slide in the direction of the arrow a via the transmission arm 362, and causes the transmission arm 362 to rotate in the direction of the arrow G which is upwards. The pull coil spring 367 forms a sliding means which slides the whole of the head raising and lowering mechanism 331 in the direction of the arrow E. A projection 368, which is a linking means, is formed at a position separated by an interval in the direction of the arrow b from a tip 83a in the direction of the arrow b inside the eject arm 83 of the first slide plate 57, this projection 368 being able to come in contact from the direction of the arrow a with a contact part 369 of the transmission arm 362.

Figure 1D:
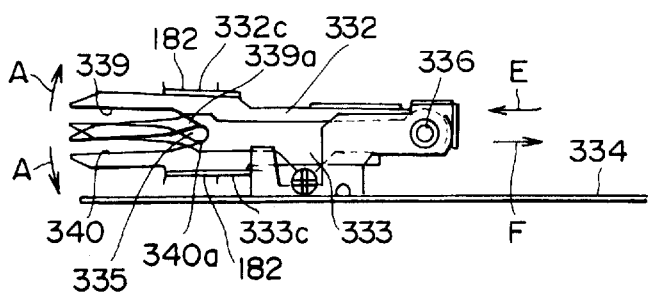
Figure 2:
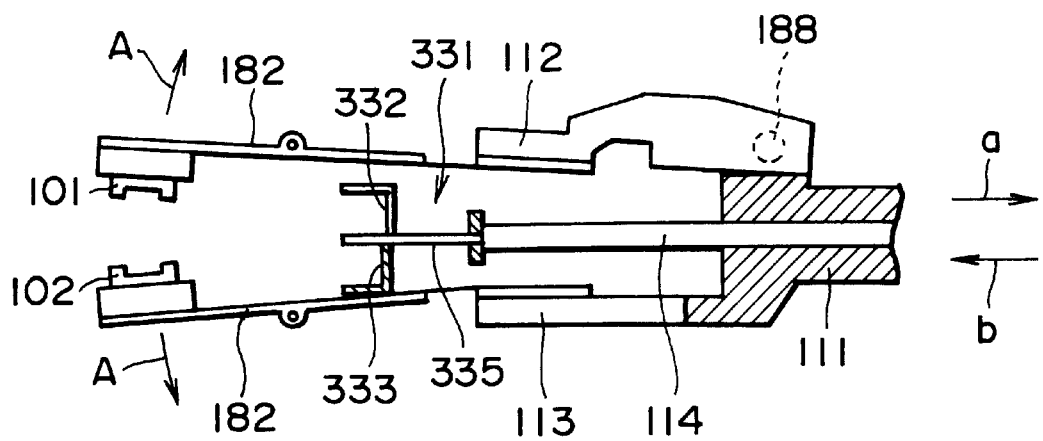
FIG. 2 is a partially cut away lateral view of a head retraction state describing the operation of this head raising and lowering mechanism.
Figure 9:
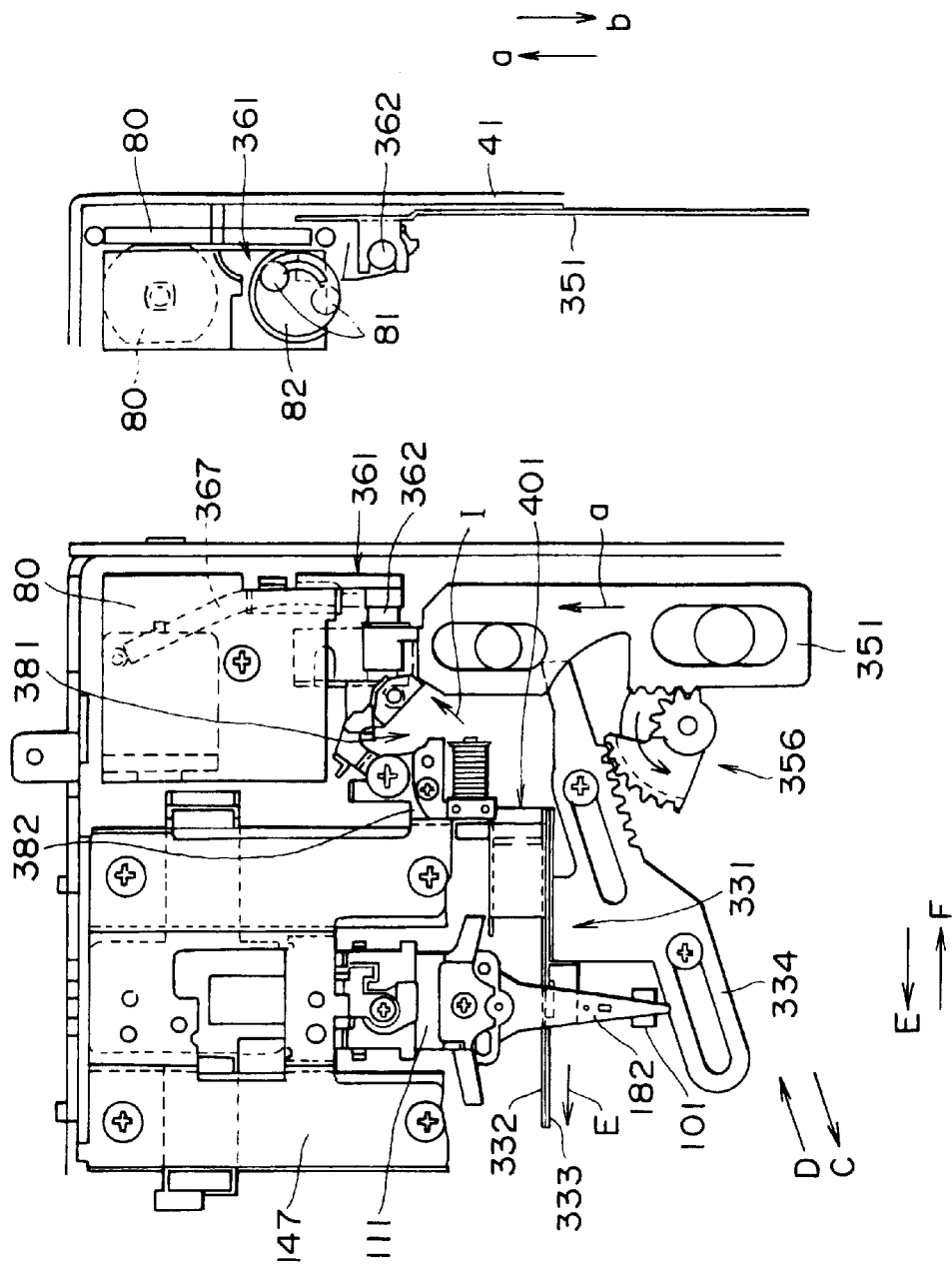
FIGS. 9A and 9B are a plan view and lateral view of a head unloading state of this head raising and lowering mechanism.

First, describing the action of the head raising and lowering mechanism 331 having the aforesaid construction in the case of the high capacity floppy disk cartridge HFDC, when the cartridge is in the unloaded state, the upper head arm 112 of the carriage 111 is lifted in the direction of the arrow e to the raised retracted position shown in FIG. 69 by the cartridge holder 56 which has been raised and returned to the unloaded state as described hereabove, and the upper magnetic head 101 and suspension 182 are pushed up in the direction of the arrow A to the raised retracted position shown in FIG. 2 against the elastic restoring force of the suspension 182. In this cartridge unloaded state, the third slide plate 351 is slid in the direction of the arrow a by the pull coil spring 367 as shown in FIG. 9, the second slide plate 324 is slid in the direction of the arrow E via the direction changing means 356, and the pair of upper and lower head raising and lowering arms 332, 333 of the head raising and lowering mechanism 331 are inserted in the direction of the arrow E to the deepest part between the pair of upper and lower suspensions 182 as shown in FIG. 1D. The guide shaft 335 is inserted in the direction of the arrow E in the pair of cam grooves 339, 340 of this pair of head raising and lowering arms 332, 333. The pair of cam action parts 339a, 340a formed in the deepest part of these cam grooves 339, 340 is then engaged above and below the guide shaft 335 so that this pair of upper and lower head raising and lowering arms 332, 333 are symmetrically rotated outwards up and down in the direction of the arrows A around the pivot shaft 336. At that time, the lower suspension 182 is pushed down a little in the direction of the arrow A which is underneath by the suspension backing plate 333c of the lower head raising and lowering arm 333.

Figure 3:
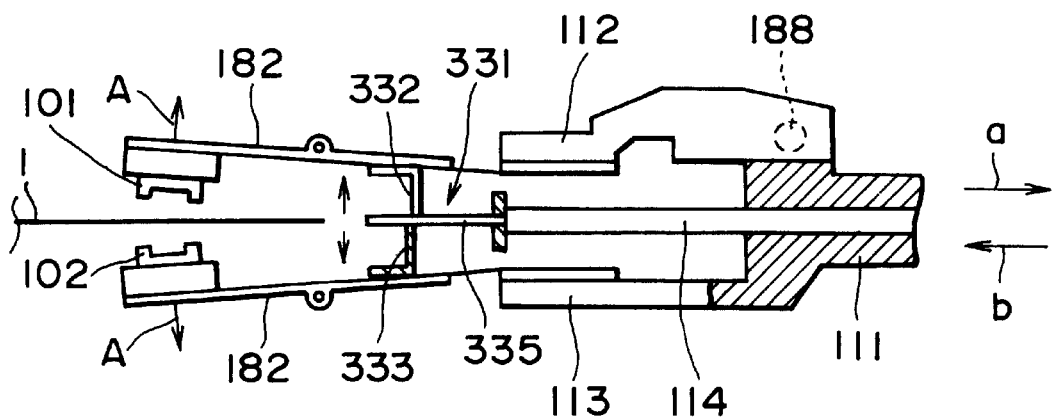
FIG. 3 is a partial cut-away lateral view of a head unloading state describing the operation of this head raising and lowering mechanism.

The high capacity floppy disk cartridge HFDC is then pushed in from the direction of the arrow a in the cartridge holder 56 shown in FIG. 53 as described above, the first slide plate 57 is slid in the direction of the arrow b from the unloading position $P_{11}$ to the loading position $P_{12}$, and when the high capacity floppy disk cartridge HFDC reaches the cartridge loading state wherein it is pushed down in the direction of the arrow g from the unloading position $P_{13}$ to the loading position $P_{14}$ shown in FIG. 54, the suspension 182 comes in contact with the suspension backing plate 332c of the upper head raising and lowering arm 332, as shown in FIG. 3. In this state, the pair of upper and lower magnetic heads 101, 102 are maintained in a head unloading position wherein they are situated above and below the upper and lower surfaces of the floppy disk 1. Therefore, there is absolutely no risk that the pair of upper and lower magnetic heads 101, 102 will come into contact with the upper and lower surfaces of the floppy disk 1 with a shock due to the cartridge loading action.

Figure 1B:
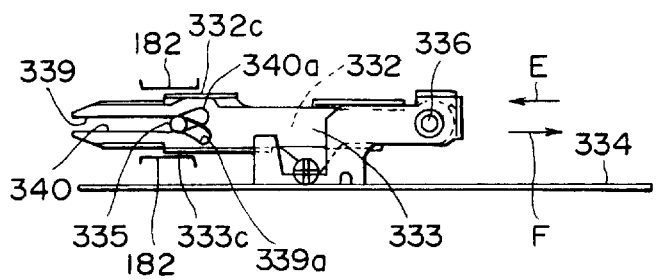
Figure 1C:
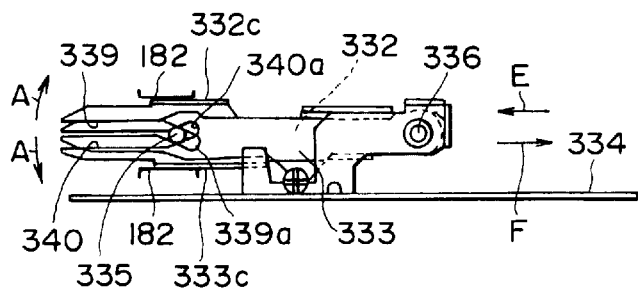
Figure 10:
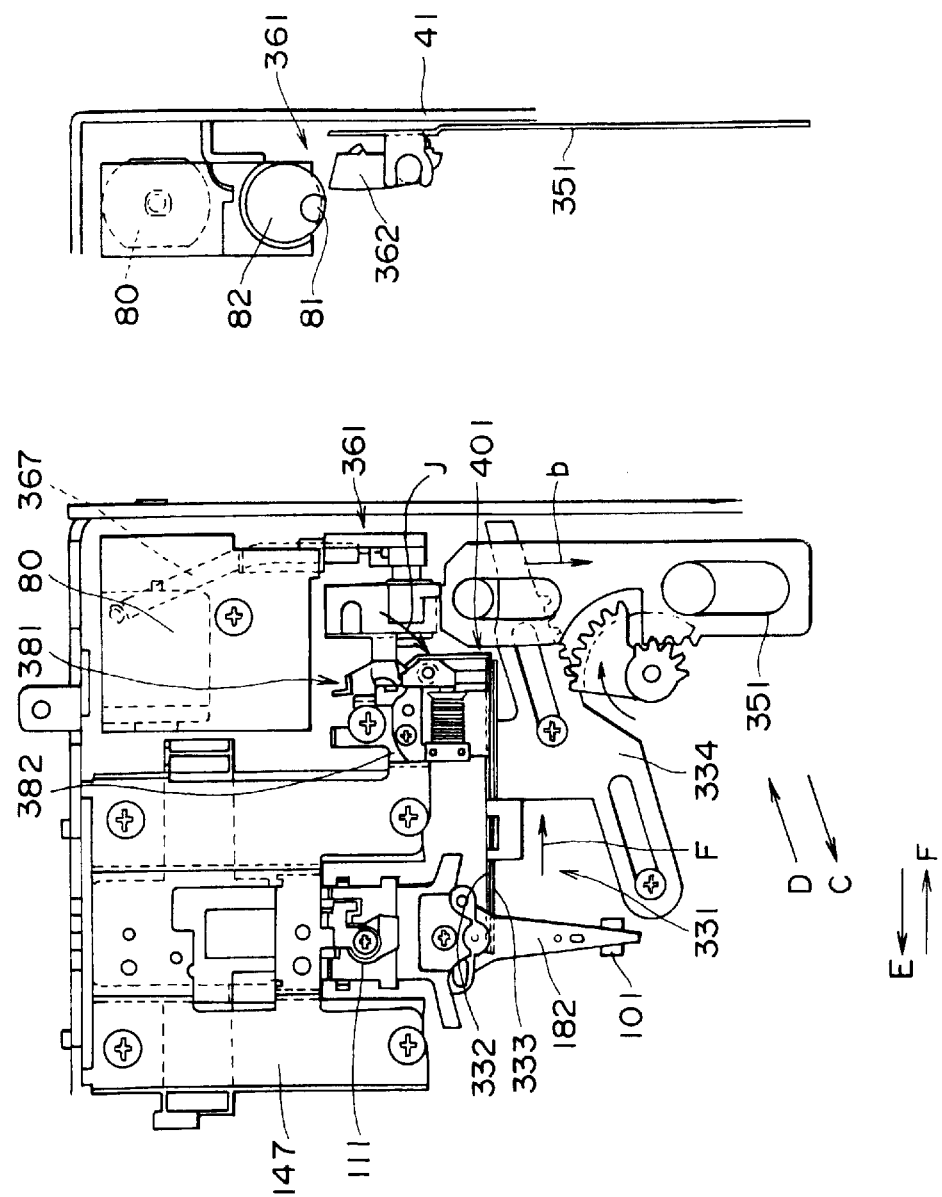
FIGS. 10A and 10B are a plan view and lateral view of data recording and playback of this head raising and lowering mechanism.
Figure 11:
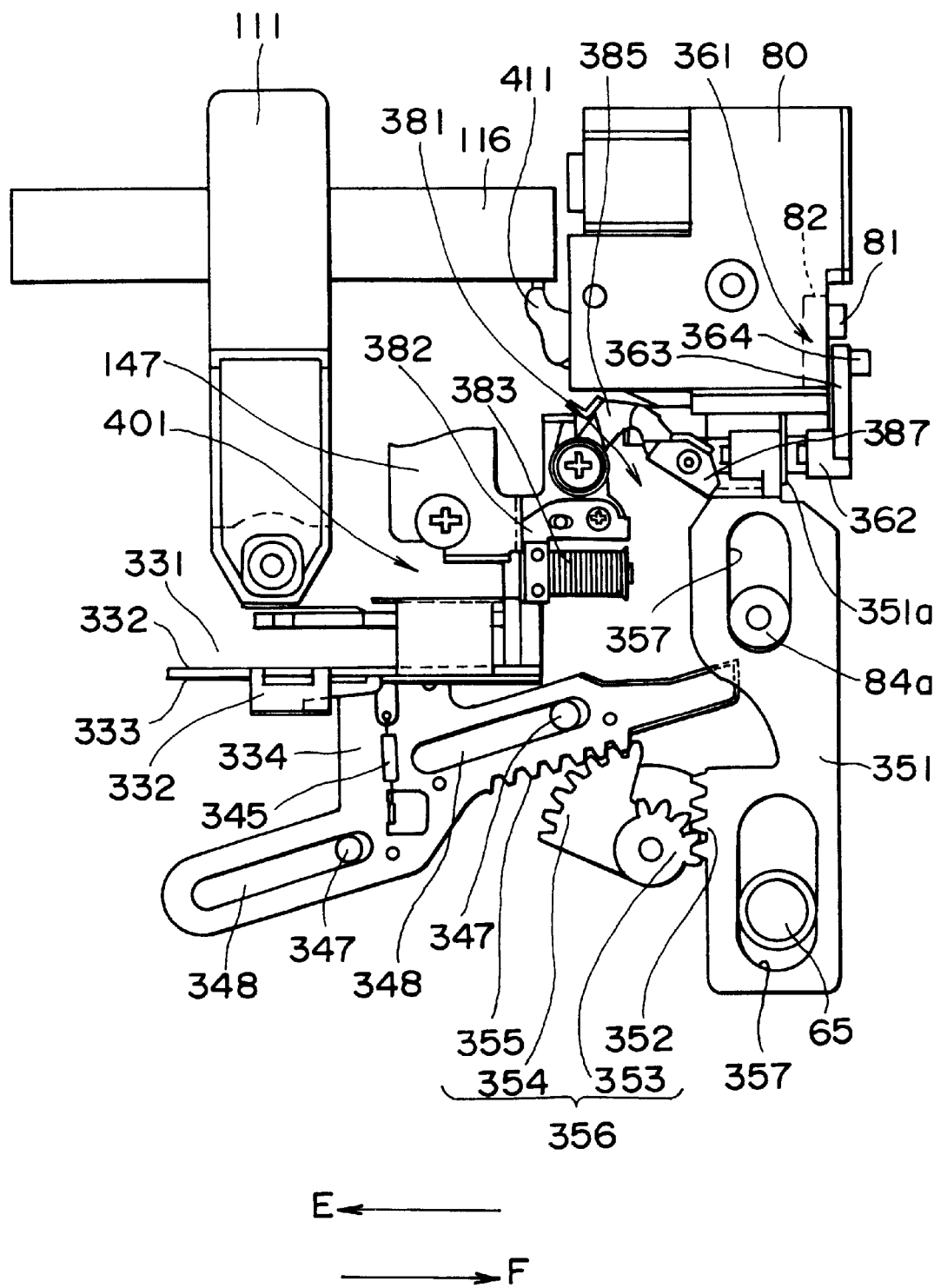
FIG. 11 is a plan view of the whole of this head raising and lowering mechanism.

Subsequently, when a data recording or playback command signal is input from a host computer as described later, the third slide plate 351 is slid in the direction of the arrow b as shown in FIG. 10 by the eject motor 80 as described later, the second slide plate 334 is slid at a safe speed in the direction of the arrow F via the direction changing means 356, and the pair of upper and lower head raising and lowering arms 332, 333 are ejected at a safe speed in the direction of the arrow F from the inside of the pair of upper and lower suspensions 182 as shown in FIGS. 1C, 1B, and 1A. At that time, the pair of cam grooves 339, 340 of the pair of upper and lower head raising and lowering arms 332, 333 are pulled out in the direction of the arrow F from the guide shaft 335, and the pair of upper and lower head raising and lowering arms 332, 333 are symmetrically rotated inwards up and down in the direction of the arrows B around the pivot shaft 336 so as to close them.

Figure 4:
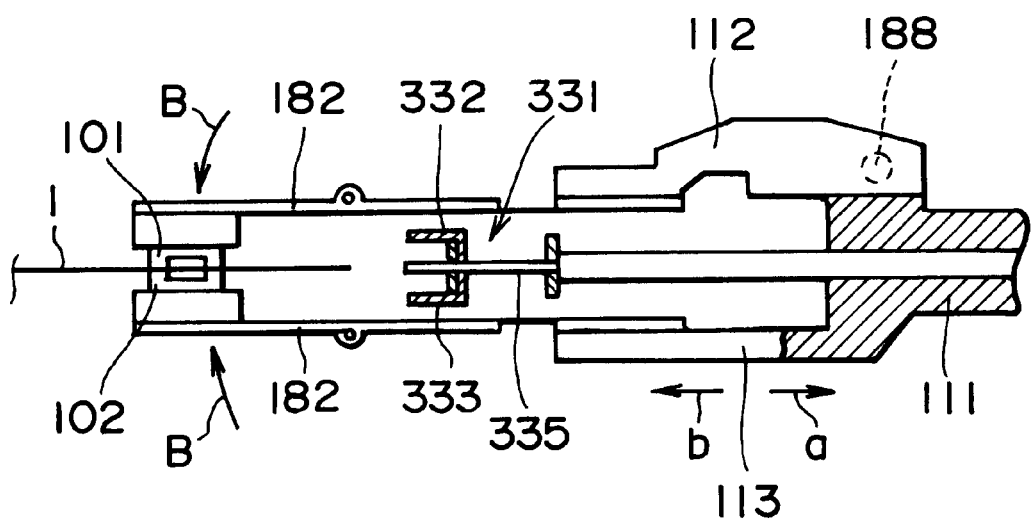
FIG. 4 is a lateral view of a head loading state describing the operation of this head raising and lowering mechanism.

When this occurs, the pair of upper and lower suspensions 182 close inwards at a safe speed in the direction of the arrows B due to their elastic restoring force in synchronism with the pair of upper and lower head raising and lowering arms 332, 333, and the pair of upper and lower magnetic heads 101, 102 approach the upper and lower surfaces of the floppy disk 1 at a safe speed symmetrically from above and below from the direction of the arrows B. When the pair of suspension backing plates 332c, 333c of the pair of upper and lower head raising and lowering arms 332, 333 have been safely ejected in the direction of the arrow F from the pair of upper and lower suspensions 182 as shown in FIG. 1A, a head loading action takes place wherein the pair of upper and lower magnetic heads 101, 102 are closed at a safe speed from the direction of the arrows B to a head loading position wherein they are in contact with the upper and lower surfaces of the floppy disk 1, as shown in FIGS. 1A and 4. This head loading action is a "soft landing" action.

Figure 20A:
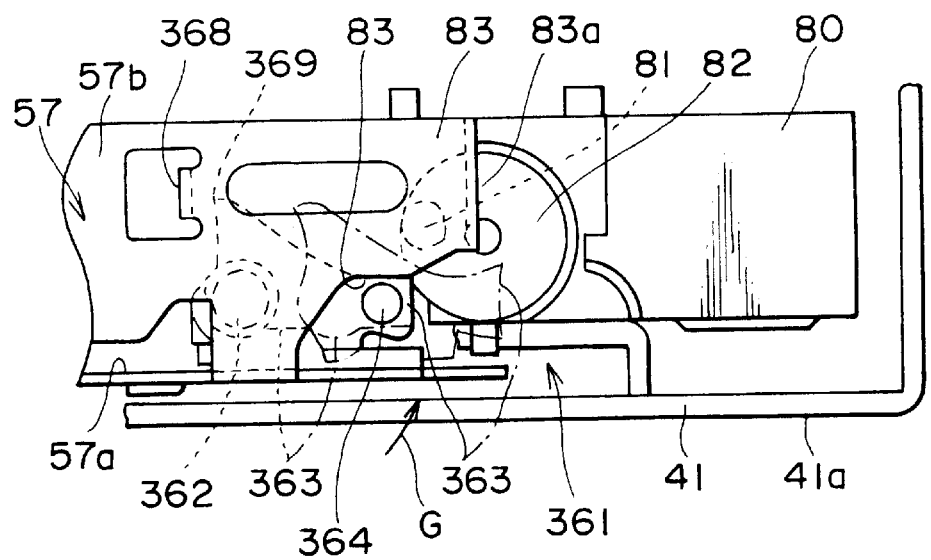
FIGS. 20A and 20B are lateral views describing the operation during forced manual eject of this eject motor.

After this soft landing action is completed, data recording and/or playback on the floppy disk 1 is performed according to a command from the host computer. When the cartridge is ejected after this data recording and/or playback, and the first slide plate 57 is slid back in the direction of the arrow a from the loading position shown in FIG. 54 to the unloading position shown in FIG. 53, the projection 368 formed inside the eject arm 83 of the first slide plate 57 comes in contact with the contact part 369 of the transmission arm 362 as shown in FIGS. 20(A) and (B) from the direction of the arrow a, as described above, and this is pushed in the same direction. The third slide plate 351 is then slid in the direction of the arrow a together with the transmission arm 362, and the second slide plate 334 is slid in the direction of the arrow E via the direction changing means 356, as shown in FIG. 9. As a result, the pair of head raising and lowering arms 332, 333 of the head raising and lowering mechanism 331 are re-inserted from the direction of the arrow C into the pair of upper and lower suspensions 182, as shown in FIGS. 1A, 1B, 1C, and 1D and FIG. 3, the pair of upper and lower suspensions 182 are again pushed apart in the direction of the arrows A against their elastic restoring force, and the pair of upper and lower magnetic heads 101, 102 are again unloaded to the unloading position.

(9) Description of Latch Mechanism

Next, a latch mechanism 381 is built into this high capacity floppy disk drive HFDD as shown in FIGS. 9 to 17, 23 and 24. In the head loading state described above, the latch mechanism 381 mechanically maintains the pair of upper and lower head raising and lowering arms 332, 333 of the aforesaid head raising and lowering mechanism 331 when they are fully ejected in the direction of the arrow F from the inside of the pair of upper and lower suspensions 182. Hence, the pair of upper and lower head raising and lowering arms 332, 333 of the head raising and lowering mechanism 331 do not irregularly come in contact with the pair of upper and lower magnetic heads 101, 102 during data recording and/or playback on and/or from the floppy disk 1.

This latch mechanism 381 comprises a plunger 383 which is a plunger solenoid horizontally attached lengthwise on a cartridge holder 382 formed together with a side piece at the front end of a yoke pushing plate 147 attached to the uppermost part of the aforesaid linear actuator 103, a rotating arm 385 substantially in the shape of a letter "C" attached free to rotate through a rotation angle of approximately 90° in the direction of arrows I, J via a pivot shaft 384 on this holder 382, and a suction piece 387 attached free to rotate through a fixed angle via a pin 386 at the tip of the rotation arm 385. A rotating pushing means such as a grip coil spring 388 which rotates the rotating arm 385 in the direction of the arrow J is attached if necessary to the outer circumference of the pivot shaft 384, for example. A latched member 390 of the head raising and lowering mechanism 331 which is latched by the rotating arm 385 may also be provided on the second slide plate 334, but from the viewpoint of spatial relationships, it is bent down onto the third slide plate 351 which is mechanically connected by the direction changing means comprising the two sets of gears 352, 353, 354, 355 to this second slide plate 334.

Figure 16:
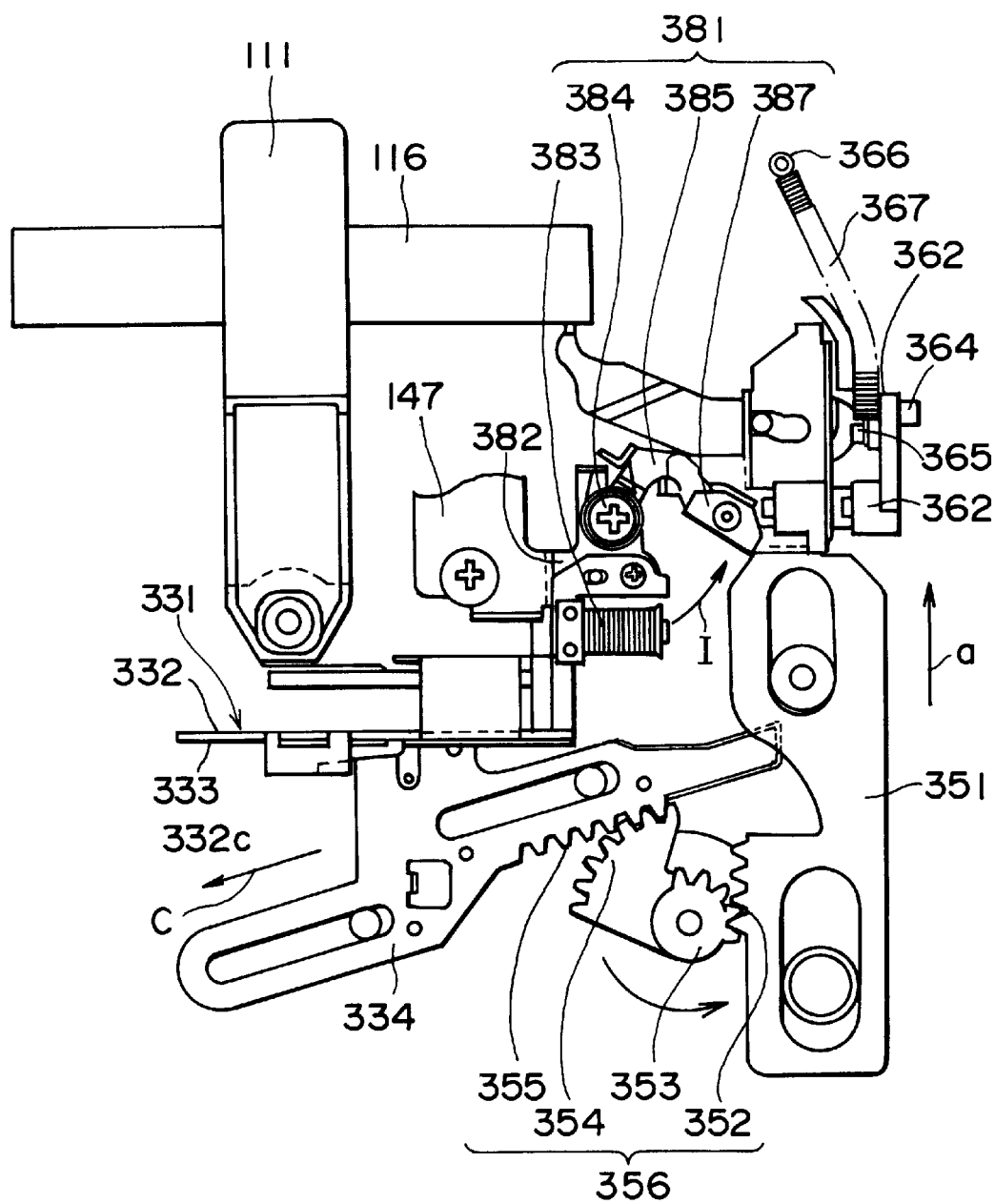
FIG. 16 is a plan view describing the operation during head unloading of this head raising and lowering mechanism.

In this latch mechanism 381 having the aforesaid construction, firstly when the pair of upper and lower magnetic heads 101, 102 are in the head loading state, the third slide plate 351 is slid in the direction of the arrow a, and the pair of upper and lower head raising and lowering arms 332, 333 is inserted from the direction of the arrow E into the pair of upper and lower suspensions 182 by sliding the second slide plate 334 in the direction of the arrow C as described above, as shown in FIG. 9. At that time, the latched member 390 allows the rotating arm 385 of the latch mechanism 381 to escape in the direction of the arrow I to the latch release position against the grip coil spring 388, as shown in FIG. 16.

Figure 15:
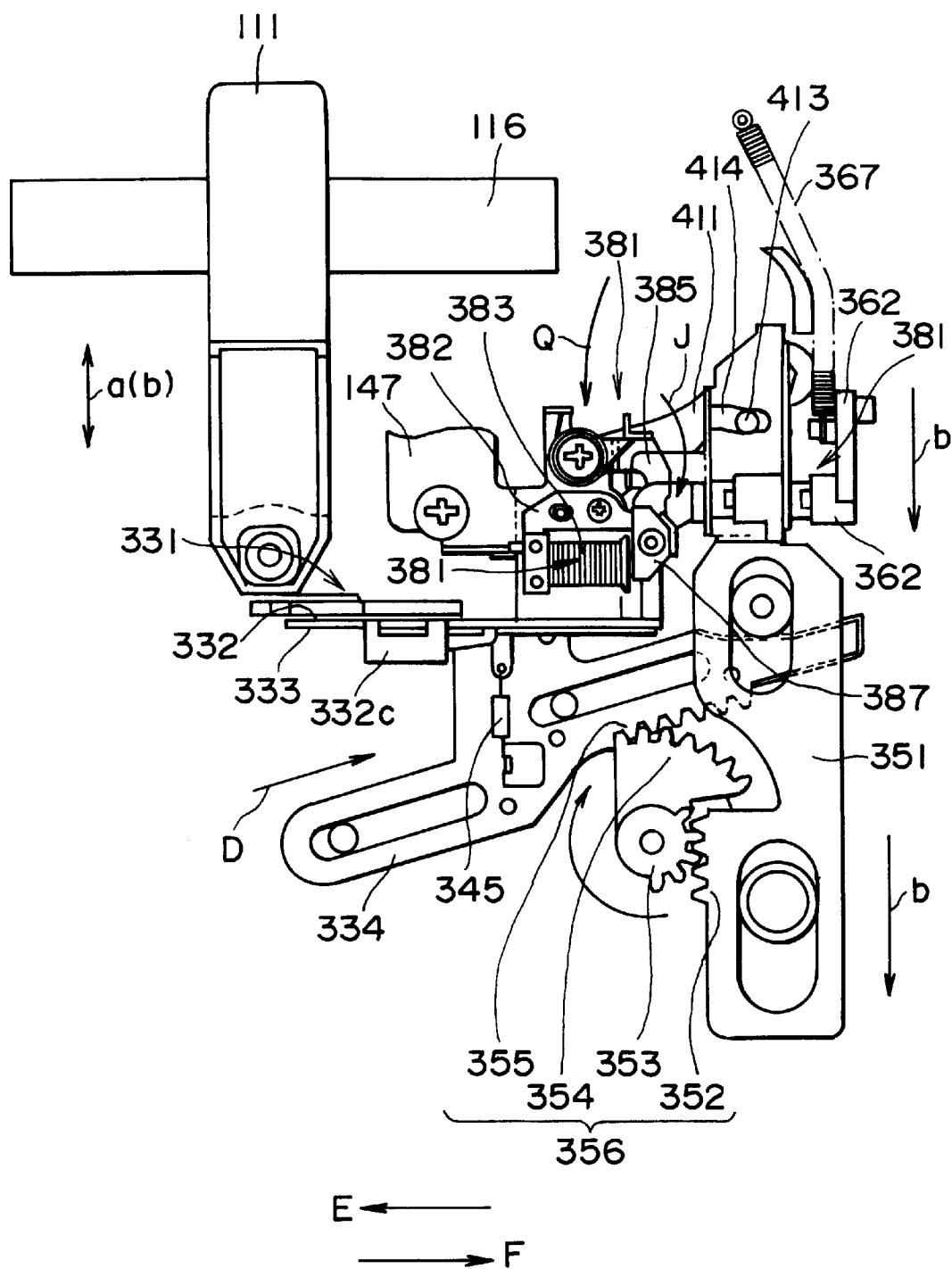
FIG. 15 is a plan view describing the operation during head loading of this head raising and lowering mechanism.

A coil 383a of the plunger 383 is energized by this high capacity floppy disk drive HFDD. Power is supplied. Then, the third slide plate 351 is slid in the direction of the arrow b as shown in FIG. 10, the pair of upper and lower head raising arms 332, 333 are ejected in the direction of the arrow D from inside the suspensions 182 and the head loading state of the pair of upper and lower magnetic heads 101, 102 is implemented as described above due to the sliding of the second slide plate 334 in the direction of the arrow F. When the third sliding plate 351 is moved in the direction of the arrow b, the rotating arm 385 is simultaneously rotated in the direction of the arrow J to a latch position by the grip coil spring 345, the suction piece 387 is attracted by the plunger 383, and the rotating arm 385 is locked in the latch position, as shown in FIG. 15. Movement of the latched member 390 in the direction of the arrow a is then prohibited, the second slide plate 334 which is mechanically connected to the third slide plate 351 is locked in the slide position in the direction of the arrow F, and the head loading state of the pair of upper and lower magnetic heads 101, 102 is stably maintained. When energization of the coil 383a of the plunger 383 is interrupted, the aforesaid latch of the head loading state is released.

Figure 26:
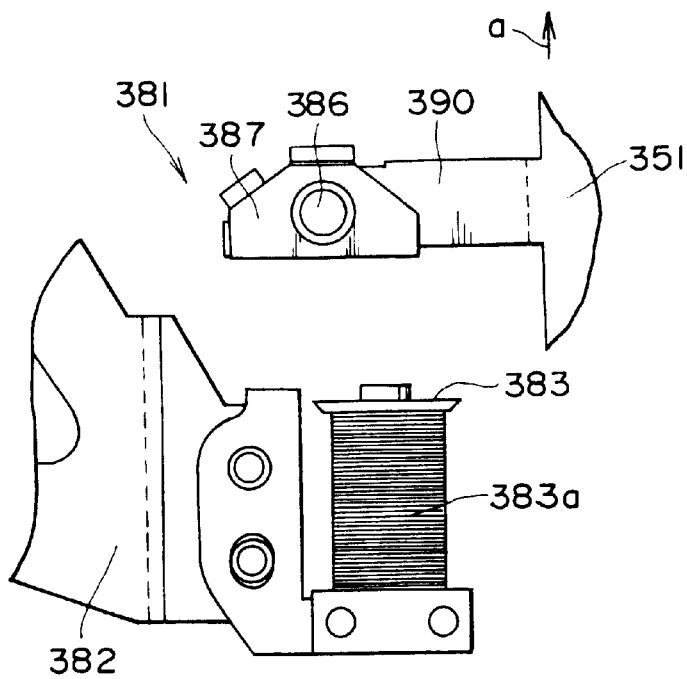
FIG. 26 is a plan view describing a latch release operation of another embodiment of this latch mechanism.
Figure 27:
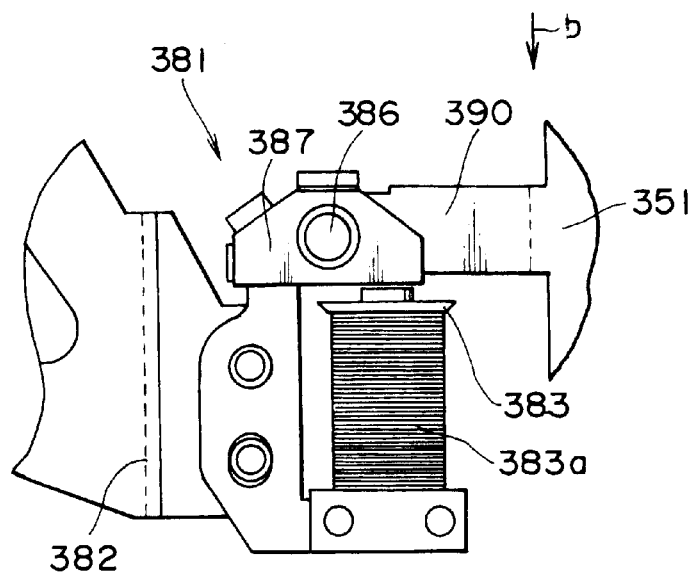
FIG. 27 is a plan view describing the latch operation of the latch mechanism of FIG. 26.

Describing now the priority of the latch mechanism 381 using the rotating arm 385, the latch mechanism 381 still functions to maintain the head loading state even if the suction piece 387 is directly attached to the third slide plate 351, as shown in FIGS. 26 and 27. However, in this case, as the spring reaction force of the pull coil spring 367 which acts on the third slide plate 351 now acts directly on the plunger 383, the suction force of the plunger 383 must be increased.

Figure 23:
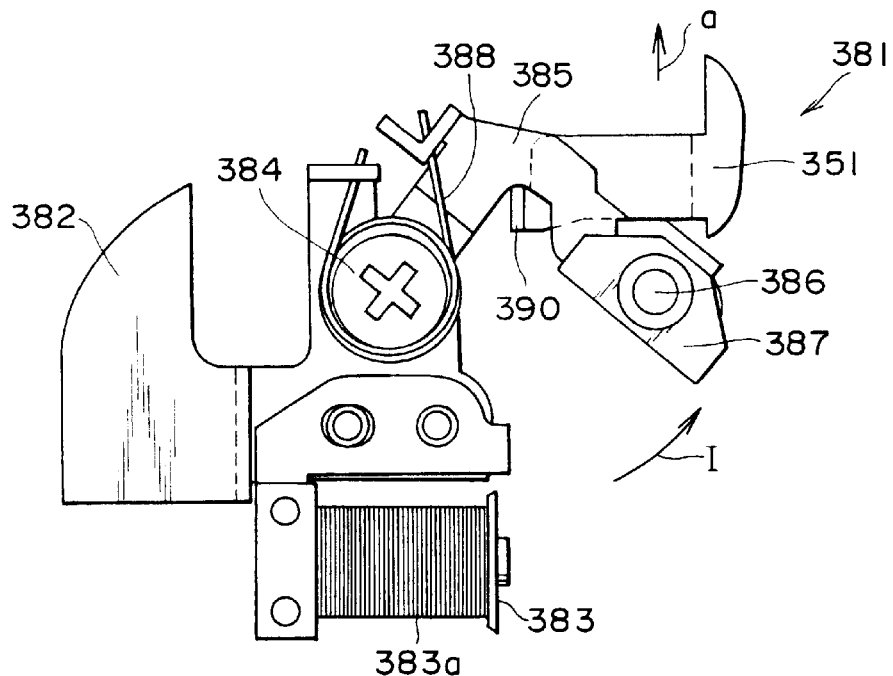
FIG. 23 is a plan view describing a latch release operation of this head raising and lowering mechanism.
Figure 24:
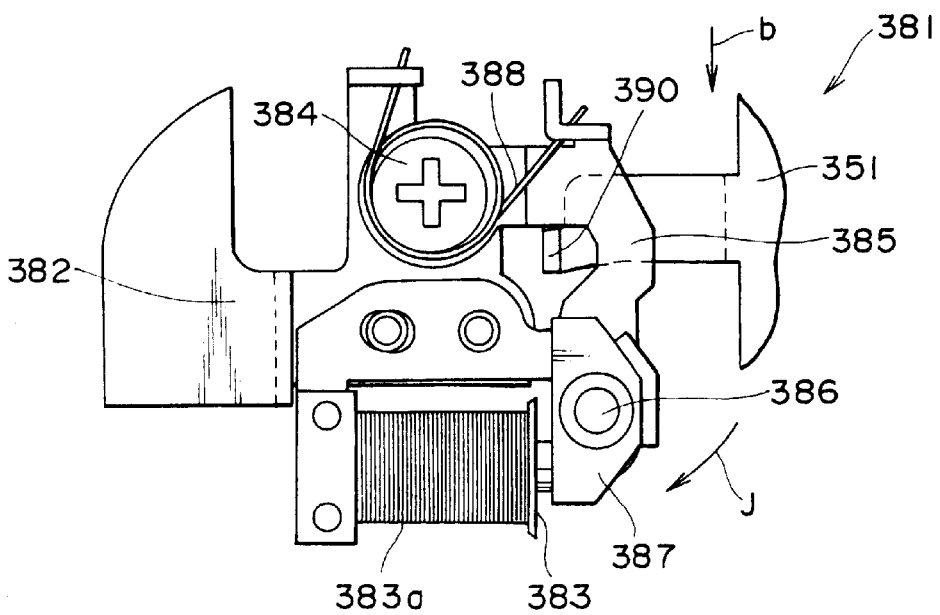
FIG. 24 is a plan view describing the latch operation of this latch mechanism.
Figure 25:
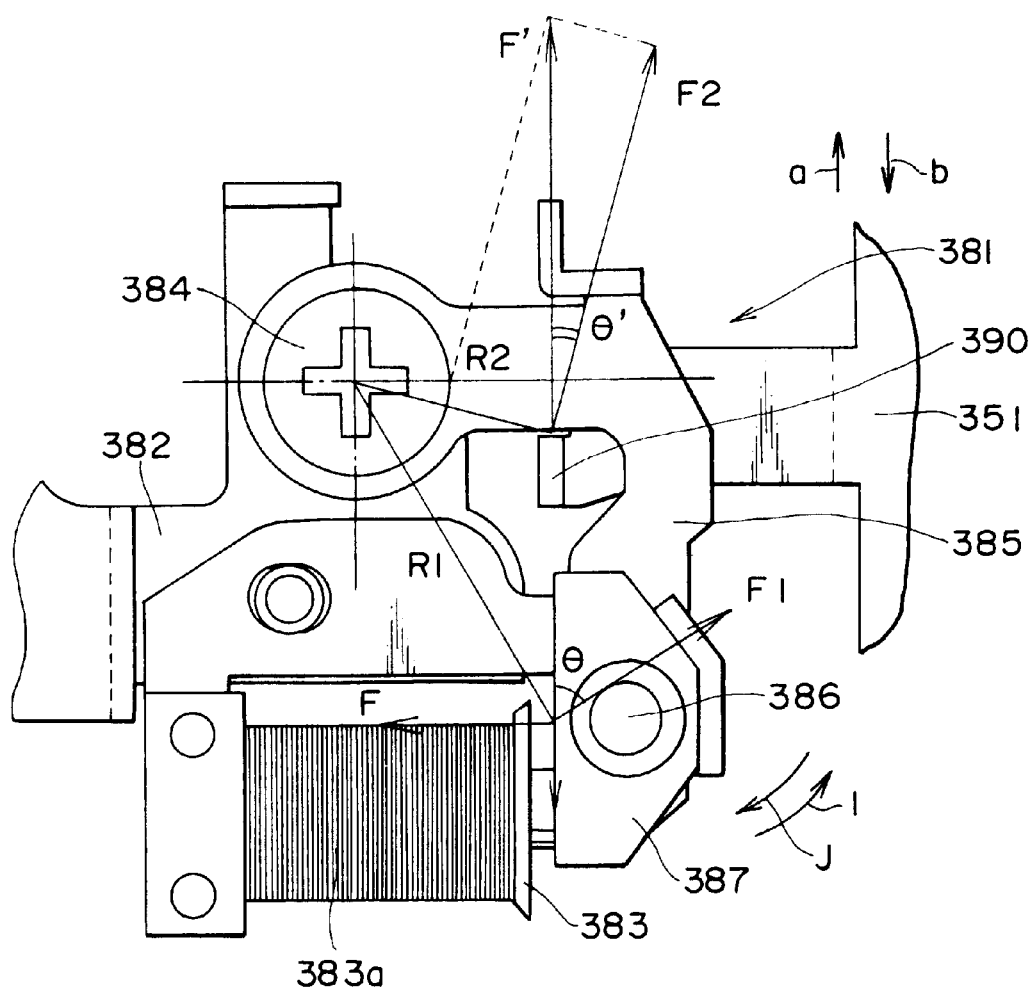
FIG. 25 is a drawing describing a relation between a suction force and a peeling force of this latch mechanism.

However, in a system where the rotating arm 385 which effectively has a "C" shape is rotated through approximately 90° and is attracted by the plunger 383, an angle can be introduced between the direction in which the rotating arm 385 is attracted and the direction of the spring force of the pull coil spring 367 which acts on the third slide plate 351, as shown in FIGS. 23 and 24. As a result, a relation holds between a suction force F with which the suction piece 387 is attracted by the plunger 383 and a peeling force F' with which the suction piece 387 is peeled away from the plunger 383 by the pull coil spring 367, and the suction force F may be made less than the peeling force F' (F<F'), as shown in FIG. 25. If the suction force F can be reduced, the current required to energize the coil 383a of the plunger 383 can be reduced which gives power savings, the heat emitted by the plunger is also suppressed, and space can be saved by making the plunger 383 compact.

In the equations in FIG. 25, F=suction force, F1=moment of a rotation radius R1 acting on the suction piece 387, F2=moment of a rotation radius R2 with which the latched member 390 pushes the rotation arm 385, F'=peeling force due to the spring force of the tension coil spring 367.

If we balance these moments, we have:

$$R1 \times F1 = R2 \times F2$$

or $$F1 = F/\sin\theta, F2 = F' \times \sin\theta'$$

so $$F' = (R1/R2) \times (1/\sin\theta \times \cos\theta') \times F$$

Therefore, the relation F>F' is determined by the radii R1, R2 from the rotation center of the rotation arm 385 as theta approaches from 90° to 0°.

Figure 28:
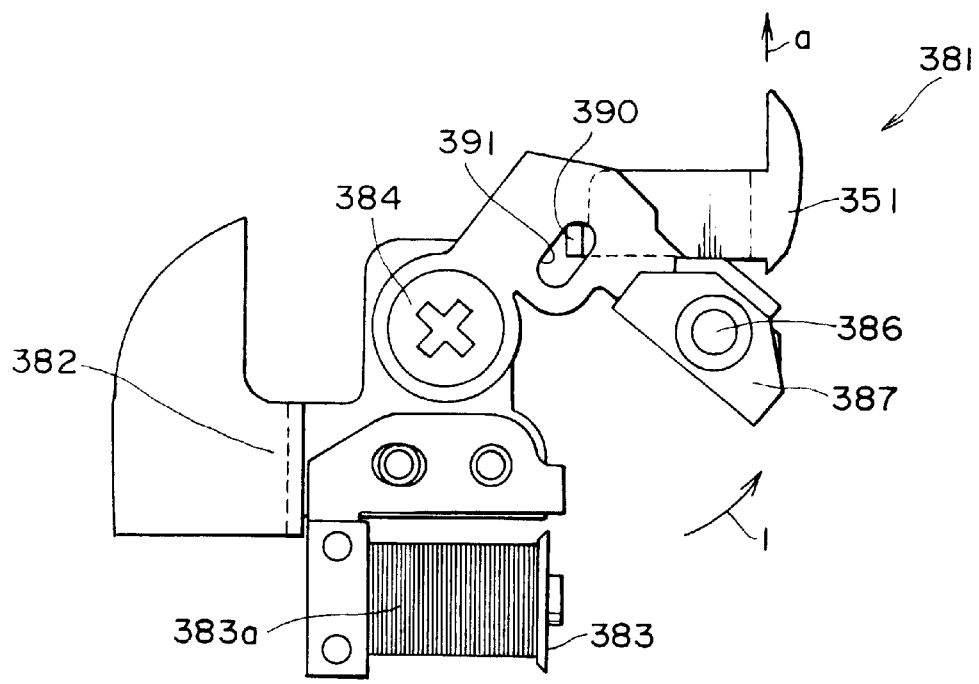
FIG. 28 is a plan view describing the latch release operation of yet another embodiment of this latch mechanism.
Figure 29:
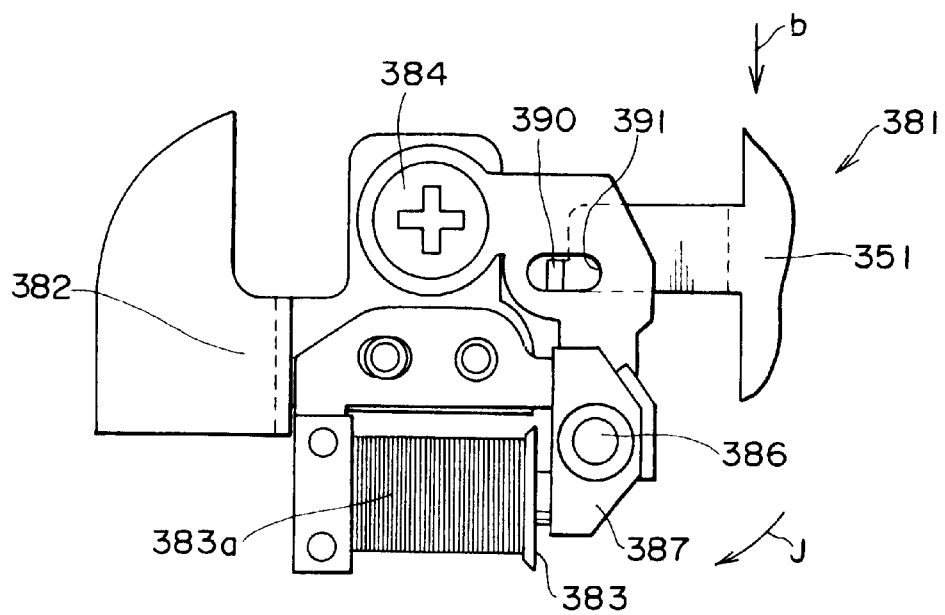
FIG. 29 is a plan view describing the latch operation of the latch mechanism of FIG. 28.

In the latch mechanism 381 shown in FIGS. 23 and 24, the rotation arm 385 was rotated by the grip coil spring 388 in the direction in which it was attracted by the plunger 383, however, the rotation arm 385 can be rotation controlled in the direction of the arrows I, J by the latched member 390 due to the sliding of the third slide plate 351 in the direction of the arrows a, b, even if the latched member 390 is engaged so that it has some play in a connecting hole 391 formed in the rotation arm 385, and the latched member 390 and rotation arm 385 are mechanically joined with some play in the join, as shown in FIGS. 28 and 29. According to this construction, the grip coil spring 388 shown in FIGS. 23 and 24 may be omitted, and the number of component parts and assembly steps may be reduced.

(10) Description of Slide Mechanism

Next, a slide mechanism 401 shown in FIGS. 5 to 7 and FIGS. 30 and 31 is built into this high capacity floppy disk drive HFDD so that the high capacity floppy disk cartridge HFDC does not interfere with the upper head raising and lowering arm 332 of the head raising and lowering mechanism 331 during cartridge loading and ejection, which might damage both of these members. In this sliding mechanism 401, a cam gear 403 rotated by a rack 402 formed in the first slide plate 57 is attached free to rotate on the chassis 41, a cylindrical part 405a at one end of a plate spring 405 is engaged free to rotate with the outer circumference of a cylindrical member engaging part 404 provided on the chassis 41, the middle part of this plate spring 405a is engaged from the direction of the arrow b of a substantially crescent-shaped cam 403a formed in one piece with the cam gear 403, and an end 405b of this plate spring 405 is engaged from the direction of the arrow a with a plate spring engaging part 406 formed in one piece with the upper head raising and lowering arm 332. The upper head raising and lowering arm 332 is slid in the direction of the arrow b by the pull coil spring 345.

Figure 5:
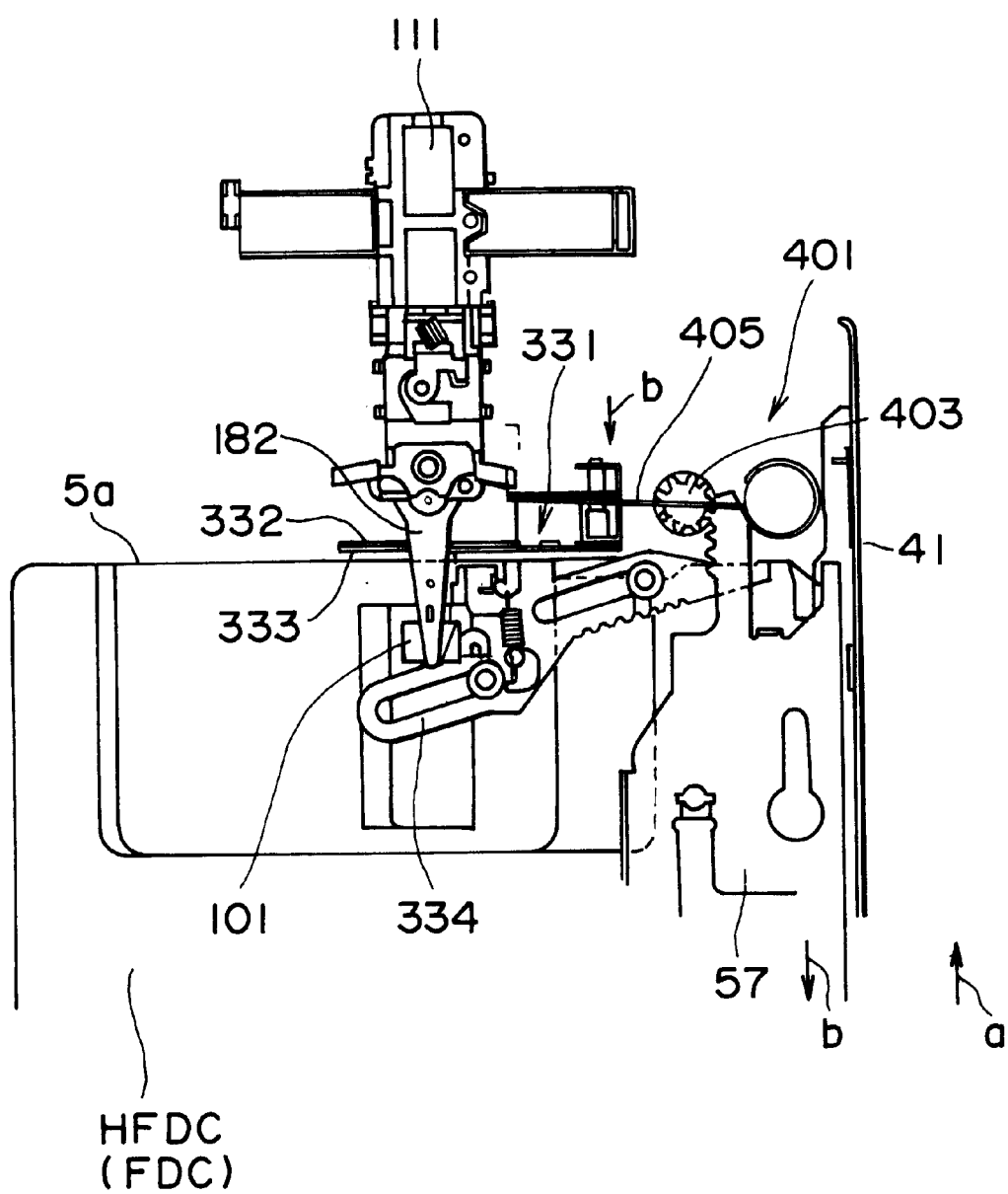
FIG. 5 is a schematic front view of a disk-in state describing the operation of this head raising and lowering mechanism.

According to this slide mechanism 401, in the cartridge loading state shown in FIG. 5, the cam gear 403 is rotated to its initial position in the direction of the arrow K by the rack 402 due to the sliding of the first slide plate 57 in the direction of the arrow b, and the plate spring 405 is free to rotate within a certain angle around the cylindrical member engaging part 404, as shown in FIG. 30. The upper head raising and lowering arm 332 is slid in the direction of the arrow b along the guide shaft 335 and pivot shaft 336 by the pull coil spring 345, and the suspension backing plate 333c is moved in the direction of the arrow b to a position where it overlaps with the upper part of the front end 5a of the high capacity floppy disk cartridge HFDC.

Figure 6:
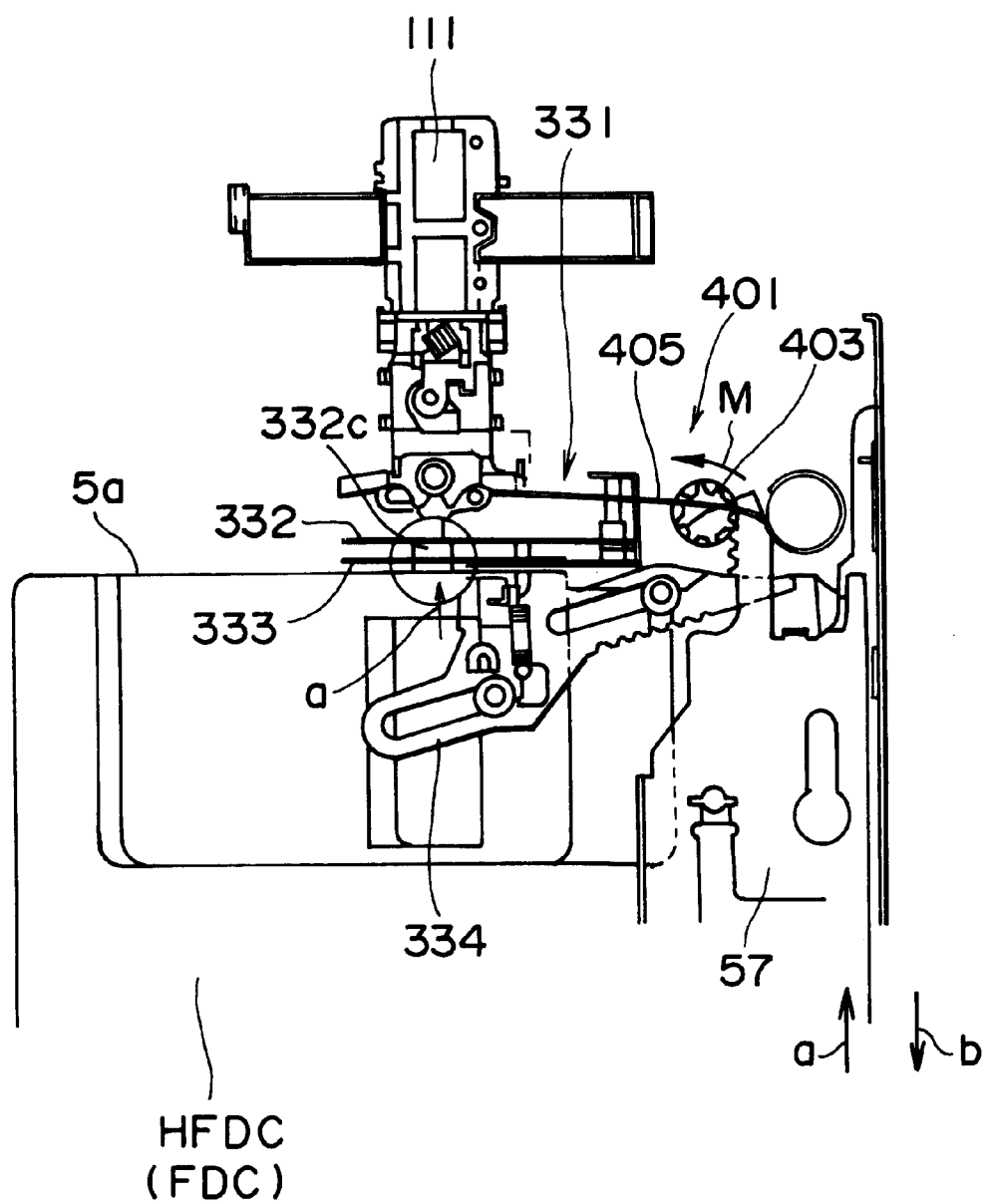
FIG. 6 is a schematic plan view of an eject initial period describing the operation of this head raising and lowering mechanism.
Figure 7:
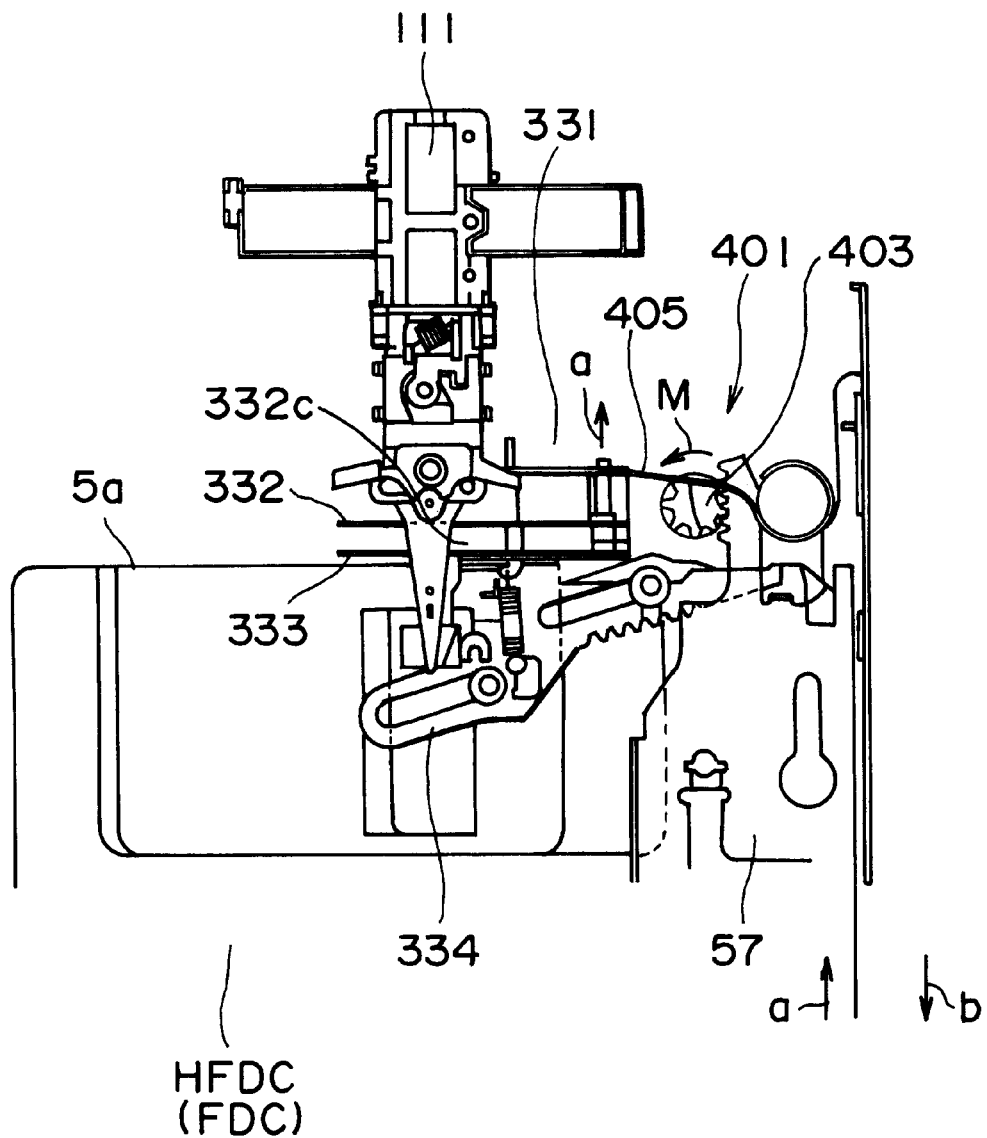
FIG. 7 is a schematic plan view of an eject intermediate period describing the operation of this head raising and lowering mechanism.
Figure 8:
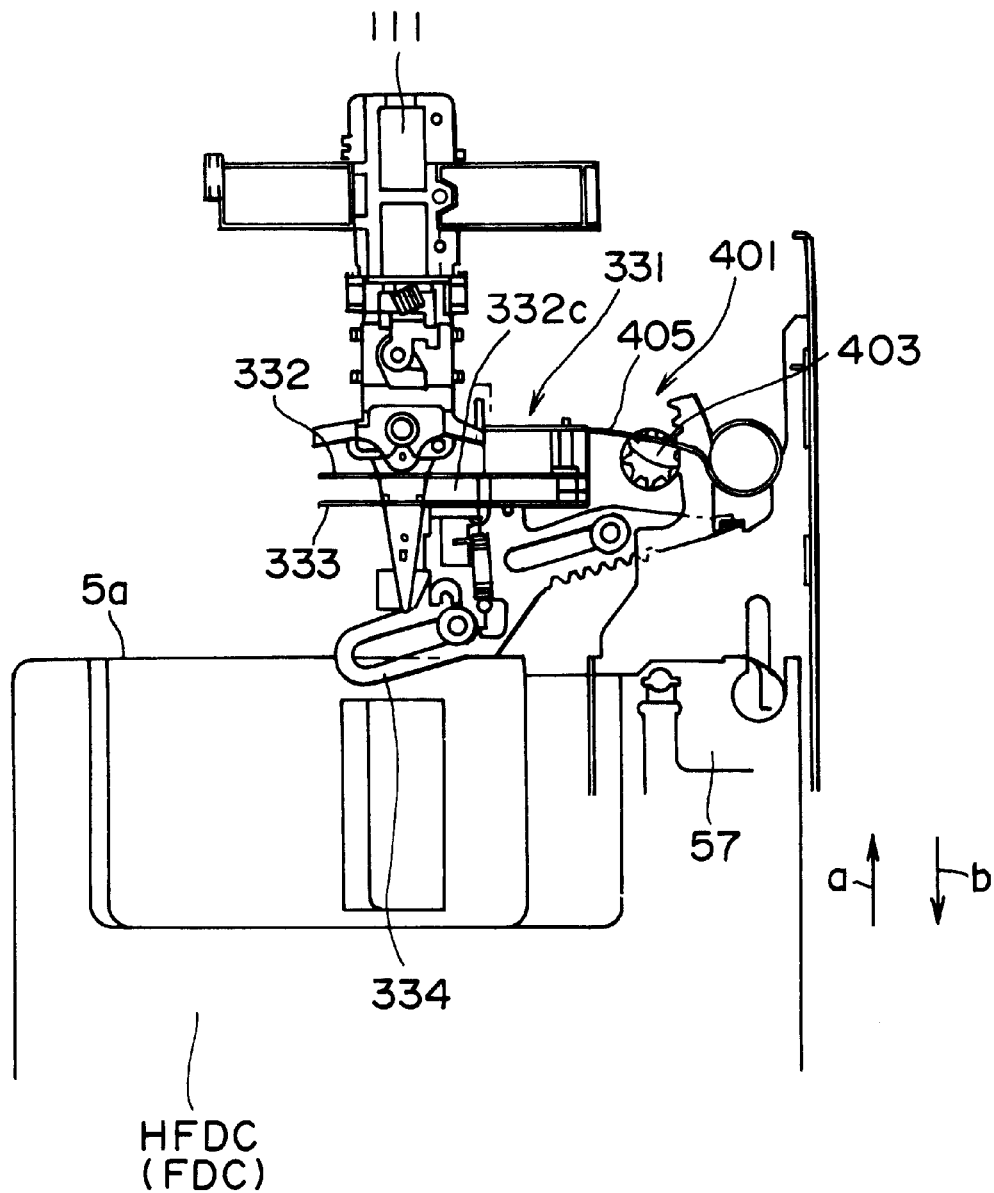
FIG. 8 is a schematic plan view of an eject complete period describing the operation of this head raising and lowering mechanism.

When the high capacity floppy disk cartridge HFDC is ejected, and the first slide plate 57 is slid in the direction of the arrow a, the rack 402 rotates the cam gear 403 in the direction of the arrow M as shown in FIGS. 6, 7 and 31. The cam 403 presses the plate spring 405 in the direction of the arrow a, and this plate spring 405 is rotated in the direction of the arrow N around the cylindrical part 405a. The plate spring 405 elastically pushes the plate spring engaging part 406 of the upper head raising and lowering arm 332 in the direction of the arrow a, and the upper head raising and lowering arm 332 is slid in the direction of the arrow a along the guide shaft 335 and pivot shaft 336 against the pull coil spring 345. The suspension backing plate 333c of the upper head raising and lowering arm 332 is then pulled away in the direction of the arrow a from the front end 5a of the high capacity floppy disk cartridge HFDC. Therefore, when the high capacity floppy disk cartridge HFDC is ejected from the loading position to the unloading position after this sliding action, the high capacity floppy disk cartridge HFDC can be safely ejected without interfering with the upper head raising and lowering arm 332.

In the method wherein the pair of upper and lower head raising and lowering arms 332, 333 are slid in the direction of the arrows E, F along a sliding center $P_{334}$ which is inclined relative to the tracking center $P_2$ by the second slide plate 334, the pair of suspension backing plates 332c, 333c can be made to approach the pair of upper and lower magnetic heads 101, 102 by inserting the pair of upper and lower head raising and lowering arms 332, 333 inside the pair of upper and lower suspensions 182, and the magnetic head approach position of the pair of upper and lower suspensions 182 can be raised or lowered in the direction of the arrows A, B by the pair of upper and lower head raising and lowering arms 332, 333, as described above. Raising and lowering of the pair of upper and lower magnetic heads 101, 102 between the head loading position and head unloading position can therefore be performed accurately, which is very effective.

Figure 18:
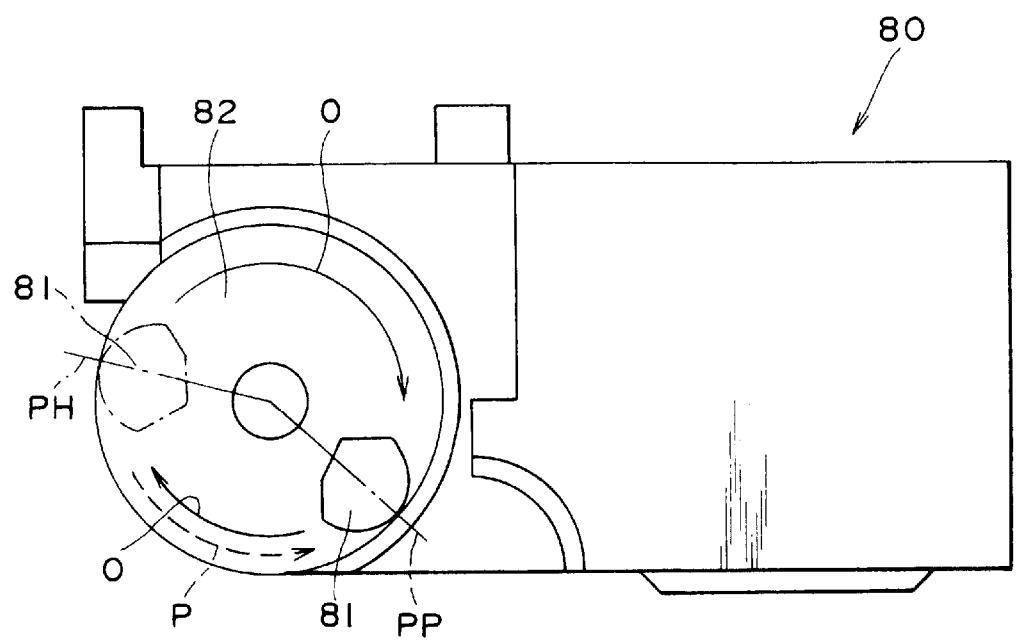
FIG. 18 is a lateral view of the eject motor.

Describing now the selective driving of the first and third slide plates 57, 351 via the drive mechanism 361 by the eject motor 80 with reference to FIGS. 18–20, the eject drive pin 81 which is the output pin of the eject cam 82 of the eject motor 80 is first initialized in an initial position PP as shown in FIG. 18, and when the disk cartridge is ejected, it is rotated clockwise by 360° in the direction of the arrow o from this initial position PP and is stopped in the initial position PP, as described earlier. During head loading as described above, this eject drive pin 81 is rotated in the direction of the arrow O from the initial position PP to the head loading finish position PH, and it is stopped in this position. Also, in a sleep mode described later, it performs forward/reverse rotation wherein it first returns in the direction of the arrow P from the head loading finish position PH to the initial position PP, and is then again rotated in the direction of the arrow O to the head loading finish position PH.

Figure 19A:
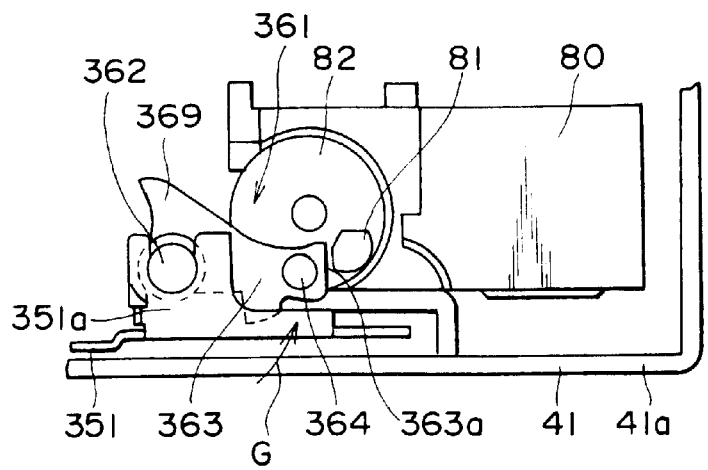
FIGS. 19A to 19C are lateral views describing the operation of this eject motor.
Figure 19B:
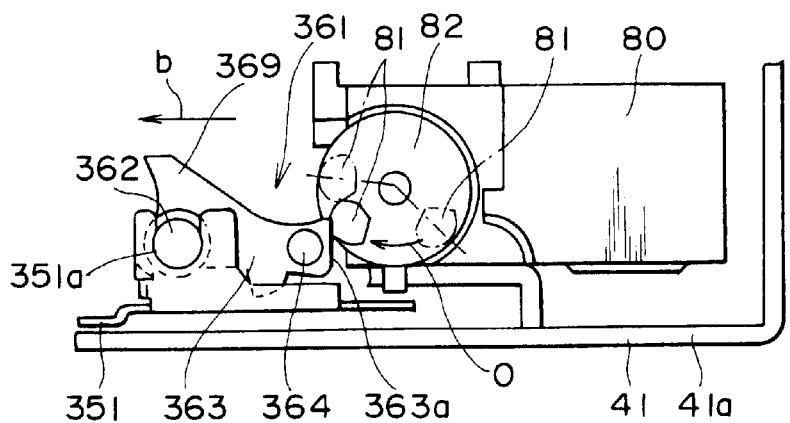

Next, the high capacity floppy disk cartridge HFDC is loaded to the loading position as described above, as shown in FIG. 19, a cartridge insertion detecting switch (disk in switch) 66 shown in FIG. 50 detects disk in, and the spindle motor 52 rotates. During head loading, when the eject drive pin 81 is rotated in the direction of the arrow 0 from the initial position PP shown in FIG. 19A to the head loading finish position PH shown in FIG. 19C, this eject drive pin 81 pushes the arm part 363 of the transmission arm 362 in the direction of the arrow O, as shown in FIG. 19B. The third slide plate 351 is then slid in the direction of the arrow b as shown in FIGS. 10 and 15 via the transmission arm 362, and the head loading mentioned above is performed. At that time, the pin 364 of the transmission arm 362 comes in contact from the direction of the arrow G with a lower surface 83b of the eject cam 83 of the first slide plate 57 as shown in FIG. 20. The arm part 363 therefore cannot escape in the direction of the arrow G, and the third slide plate 351 is slid without fail in the direction of the arrow b by the eject drive pin 81.

Figure 19C:
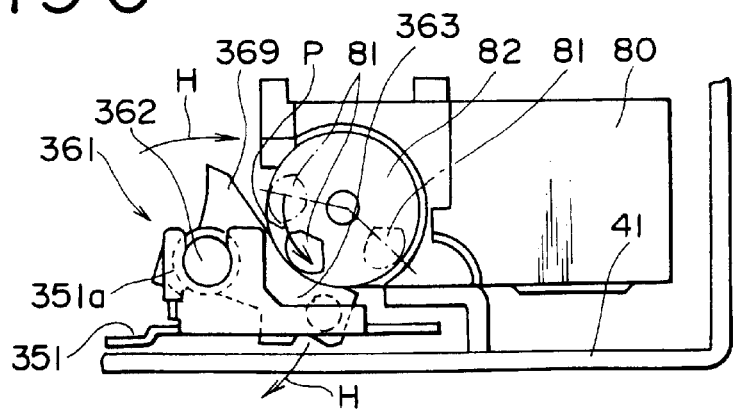

Next, in the sleep mode described later, in the head loading finish state shown in FIG. 20A, the third slide plate 351 is slid in the direction of the arrow a, the head unloading described earlier is performed, and the arm part 363 of the transmission arm 362 is inserted from the direction of the arrow a below the eject drive pin 81 as shown by the single dotted line in FIG. 20. When there is a return from this sleep mode (head unloading state) to the head loading state, the eject drive pin 81 is first rotated backwards in the direction of the arrow P from the head loading finish position PH to the initial position PP as shown in FIG. 19C. The eject drive pin 81 then returns to the initial position PP while the arm part 363 of the transmission arm 362 is rotated away in the direction of the arrow H against the rotational force of the pull coil spring 367. Immediately before the eject drive pin 81 passes through in the direction of the arrow P to return to the initial position PP as shown in FIG. 19A, the arm part 363 of the transmission arm 362 is returned in the direction of the arrow G as shown in FIG. 19A by the rotational force of the pull coil spring 367. Subsequently, when the eject drive pin 81 is again rotated in the direction of the arrow o from the initial position PP to the head loading finish position PH, the arm part 363 of the transmission arm 362 is pushed in the direction of the arrow b by the eject drive pin 81, the third slide plate 351 is slid in the direction of the arrow b, and head loading is performed, as shown in FIG. 19B.

In this high capacity floppy disk drive HFDD, a lock arm 411 is used which locks the pair of upper and lower magnetic heads 101, 102 at the outermost circumferential position of the floppy disk 1 during head unloading, and releases the lock when head loading is complete, as shown in FIGS. 15 to 17 and 22. This lock arm 411 is formed from molded components. A pivot pin 412 formed in one piece with the undersurface of one of its ends 411a is attached to the chassis 41 such that it is free to rotate in the directions of arrows Q, R. A connecting pin 413 formed in one piece with the upper surface of its middle part engages free to slide in a connecting groove 414 at right angles to the direction of the arrows a, b which is formed at the tip (end in the direction of the arrow a) of the third slide plate 351. The other end 411b of the lock arm 411 is free to come in contact with or separate from one of the coil receptacles 116 of the linear actuator 103 in the direction of the arrows Q, R.

Figure 17:
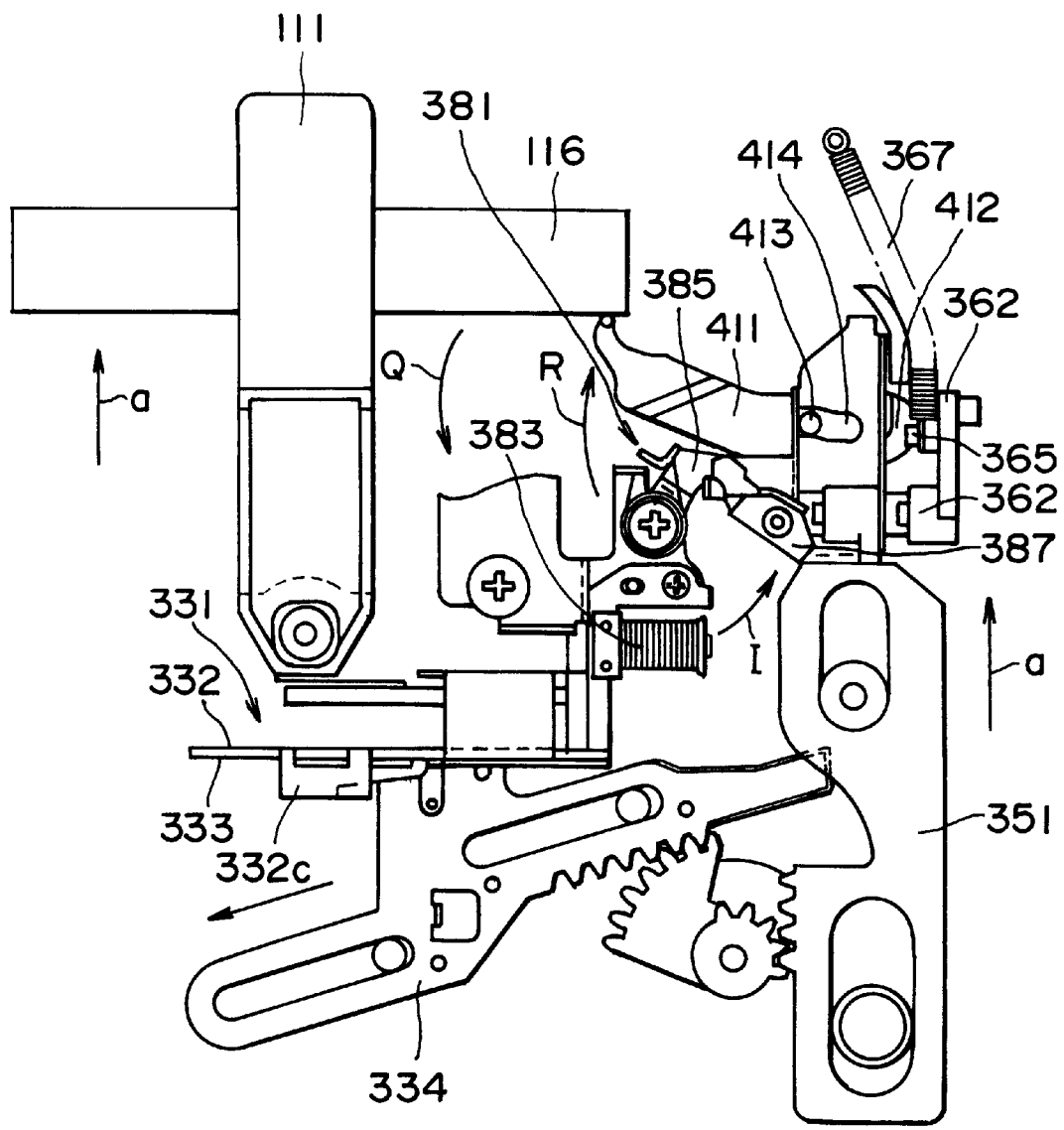
FIG. 17 is a plan view describing the operation of a carriage lock during head unloading of this head raising and lowering mechanism.

When power is cut in the head loading state, the plunger 383 switches OFF, and the third slide plate 351 is slid in the direction of the arrow a by the pull coil spring 367, as shown in FIG. 17. The lock arm 411 is rotated through a large angle in the direction R around the pivot pin 412 via the connecting groove 414 and connecting pin 413, and its other end 411b pushes one of the coil receptacles 116 in the direction of the arrow a. Then, the carriage 111 is slid in the direction of the arrow a, the pair of upper and lower magnetic heads 101, 102 are slid in the direction of the arrow a to the outermost circumferential position of the floppy disk 1, and the lock arm 411 is locked in this position.

During head loading, when the third slide plate 351 is slid in the direction of the arrow b, the lockarm 411 is rotated through a large angle in the direction of the arrow Q around the pivot pin 412 via the connecting pin 413 and connecting groove 414, and its other end 411b moves far away in the direction of the arrow b, as shown in FIG. 15. The lock of the carriage 111 is therefore released, and a seek operation of the floppy disk 1 can be performed by the pair of upper and lower magnetic heads 101, 102.

(11) Description of Operating Mode

Next, the operating mode in this high capacity floppy disk drive HFDD will be described.

First in FIG. 15, when loading of the high capacity floppy disk cartridge HFDC is complete and the spindle motor 51 is switched ON, the third slide plate 351 is slid in the direction of the arrow b via the drive mechanism 361 by the eject motor 80, the second slide plate 334 is slid in the direction of the arrow D via the direction changing means 356, the pair of upper and lower head raising and lowering arms 332, 333 are ejected in the direction of the arrow F from inside the pair of suspensions 182, and the pair of upper and lower magnetic heads 101, 102 are head loaded on the floppy disk 1. At the same time, the rotating arm 385 of the latch mechanism 381 is rotated in the direction of the arrow J, and the plunger 383 is attracted so that the head lock state is latched.

Next, in FIG. 16, when head unloading is performed after data recording and/or playback on the floppy disk 1 is complete, a current flows through the voice coil motor 109 of the linear actuator 103, and the carriage 111 is slid in the direction of the arrow a to the outermost circumference of the floppy disk 1. Energization of the plunger 383 of the latch mechanism 381 then switches OFF, the third slide plate 351 is slid in the direction of the arrow a by the pull coil spring 367, the pair of upper and lower head raising and lowering arms 332, 333 of the head raising and lowering mechanism 331 are inserted from the direction of the arrow E into the pair of upper and lower suspensions 182, and the pair of upper and lower magnetic heads 101, 102 are head unloaded above and below the floppy disk 1. The carriage 111 is also slid to the outermost circumferential position of the floppy disk 1, and locked.

Next in FIG. 17, when power is cut in the head loading state, energization of the plunger 383 of the latch mechanism 381 switches OFF, the third slide plate 351 is slid in the direction of the arrow a by the pull coil spring 367, and the carriage 111 is slid in the direction of the arrow a to the outermost circumference of the floppy disk 1 by the lock arm 411. The pair of upper and lower head raising and lowering arms 332, 333 is inserted in the direction of the arrow E into the pair of upper and lower suspensions 182 at the same time as the carriage 111 is slid in the direction of the arrow a, so the pair of upper and lower magnetic heads 101, 102 are pushed apart without fail in the head unloading position by the pair of upper and lower head raising and lowering arms 332, 333.

Figure 20B:
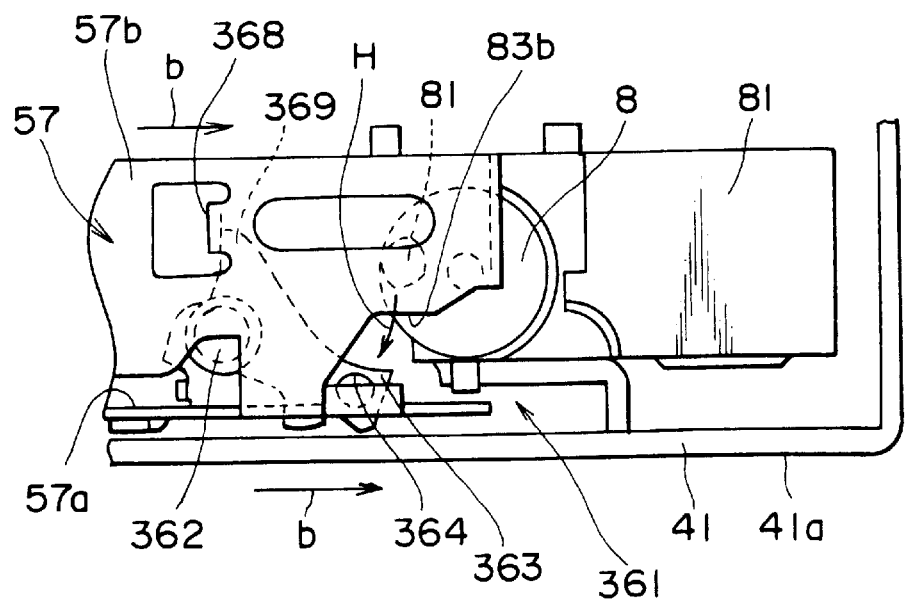
Figure 22A:
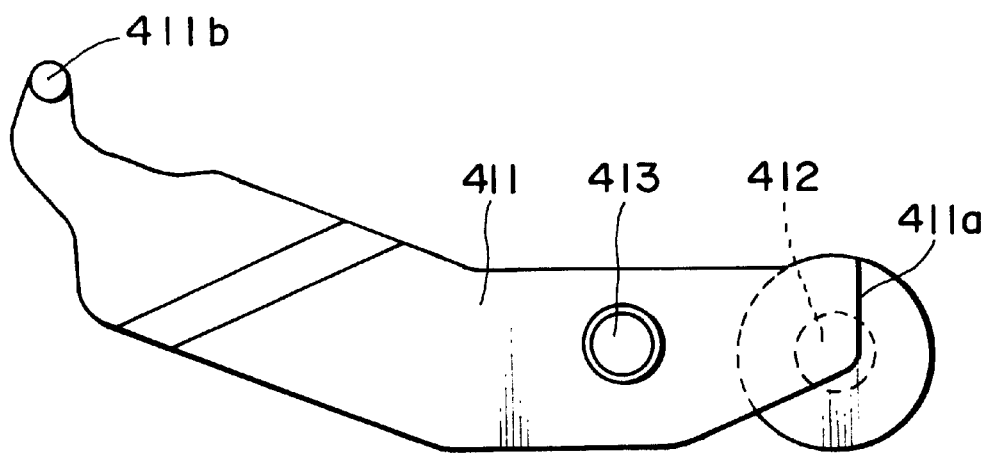
FIGS. 22A and 22B are a plan view and lateral view of a lock arm attached to this head raising and lowering mechanism.
Figure 22B:
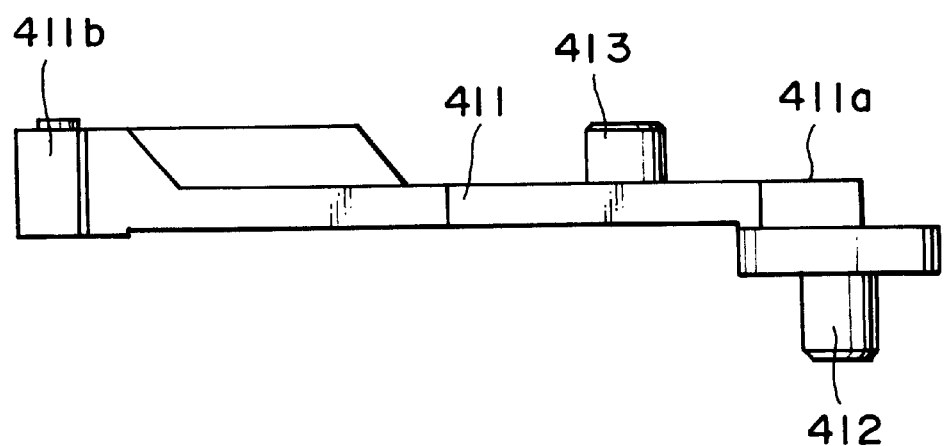

Finally, in FIGS. 17 and 20, the case where the host computer (personal computer) hangs in the head loading state will be described. When the host computer hangs in the head loading state, the eject switch no longer works, and the high capacity floppy disk cartridge HFDC can no longer be ejected by the eject motor 80. Forced eject, wherein the first slide plate 57 is manually ejected in the direction of the arrow a, is therefore performed. The projection 368 of the third slide plate 351 then comes in contact with the contact part 369 of the transmission arm 362 as shown in FIG. 20A, and this is pushed in the direction of the arrow a. The transmission arm 362 rotates in the direction of the arrow H as shown in FIG. 20B, but the arm part 363 comes in contact with the chassis 41 so that further rotation is impossible. The transmission arm 362 is therefore slid in the direction of the arrow a, and the third slide plate 351 is slid in the direction of the arrow a. The rotating arm 385 of the latch mechanism 381 is forcibly rotated in the direction of the arrow I, and the suction piece 387 is forcibly separated from the plunger 383. The third slide plate 351 is then slid in the direction of the arrow a by the pull coil spring 367, and the pair of upper and lower magnetic heads 101, 102 are head unloaded.

Next, in this high capacity floppy disk drive HFDD, the head loaded state is released and the head unloaded state is maintained except when data recording and/or playback is performed so as to suppress power consumption and suppress wear of the floppy disk 1 and the head chips of the pair of upper and lower magnetic heads. This operation will now be described referring to the flowcharts of FIGS. 33 to 36.

Figure 34:
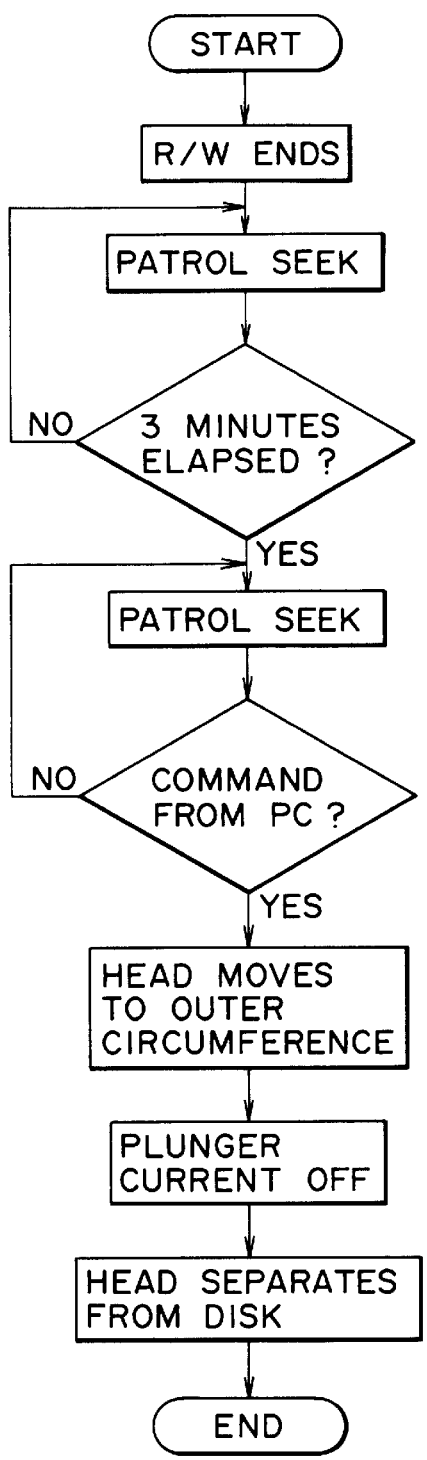
FIG. 34 is a flowchart describing a head unloading operation after data recording and/or playback.

First, the flowchart shown in FIG. 34 is for the purpose of describing the head unloading operation after data recording and/or playback. When this data recording and/or playback is complete, the pair of upper and lower magnetic heads 101, 102 perform patrol seek (patrol seek is an operation wherein the heads move across several tracks in one minute). After three minutes have elapsed, a command (idle command, standby command or sleep command) is sent from the host computer, the pair of upper and lower magnetic heads 101, 102 move to the outermost circumference of the floppy disk 1, energization of the plunger 383 of the latch mechanism 381 temporarily switches OFF, and the hold of the head loading state of the head raising and lowering mechanism 331 is released (latch release). The pair of upper and lower magnetic heads 101, 102 are then head unloaded by this head raising and lowering mechanism 331.

Figure 35:
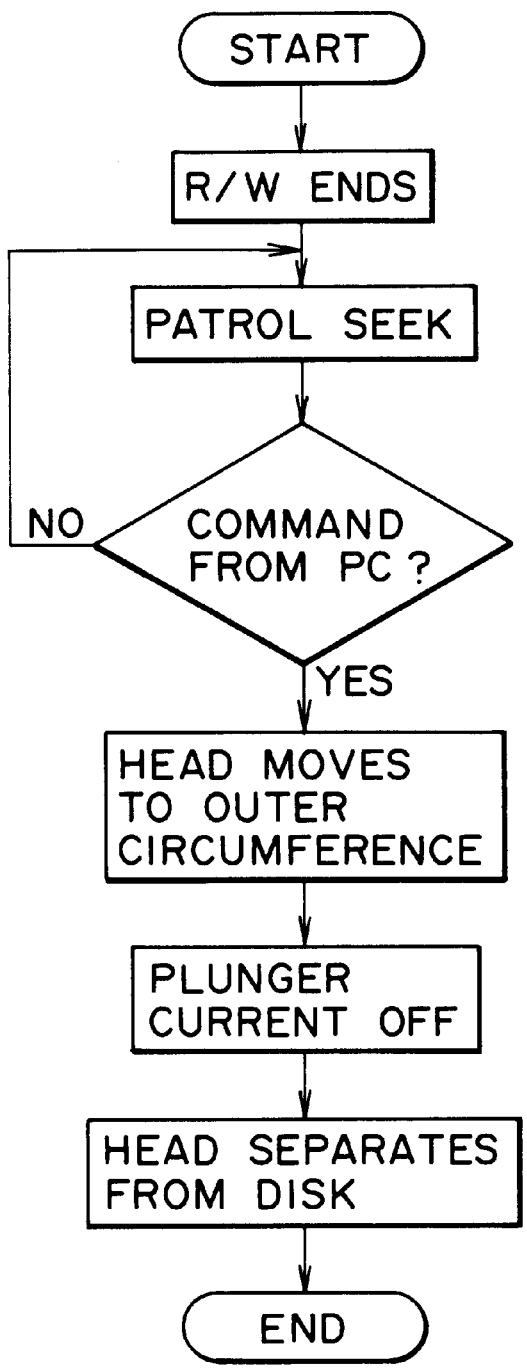
FIG. 35 is a flowchart describing a head unloading operation after data recording and/or playback.

The flowchart at this time is shown in FIG. 35. It may be noted that there are three commands which may be sent from the host computer to release the hold of the head loading state of the head raising and lowering mechanism 331, i.e., the idle command, standby command and sleep command mentioned above, and the drive mode may also be classified into the following three types according to these commands.

Idle command: In this mode, head unloading is performed, but the spindle motor 51 rotates or current is supplied to the circuit, and an operation can be performed by the next command.

Standby command: In this mode, head unloading is performed and the spindle motor 51 also stops, but current is supplied to the circuit, and an operation can still be performed by the next command.

Sleep mode: In this mode, head unloading is performed, the spindle motor 51 stops and current supply to the circuit also switches OFF, so only a reset command will be obeyed.

Whichever of the above commands is sent depends on the host computer, but head loading is released in the case of all these commands.

Figure 36:
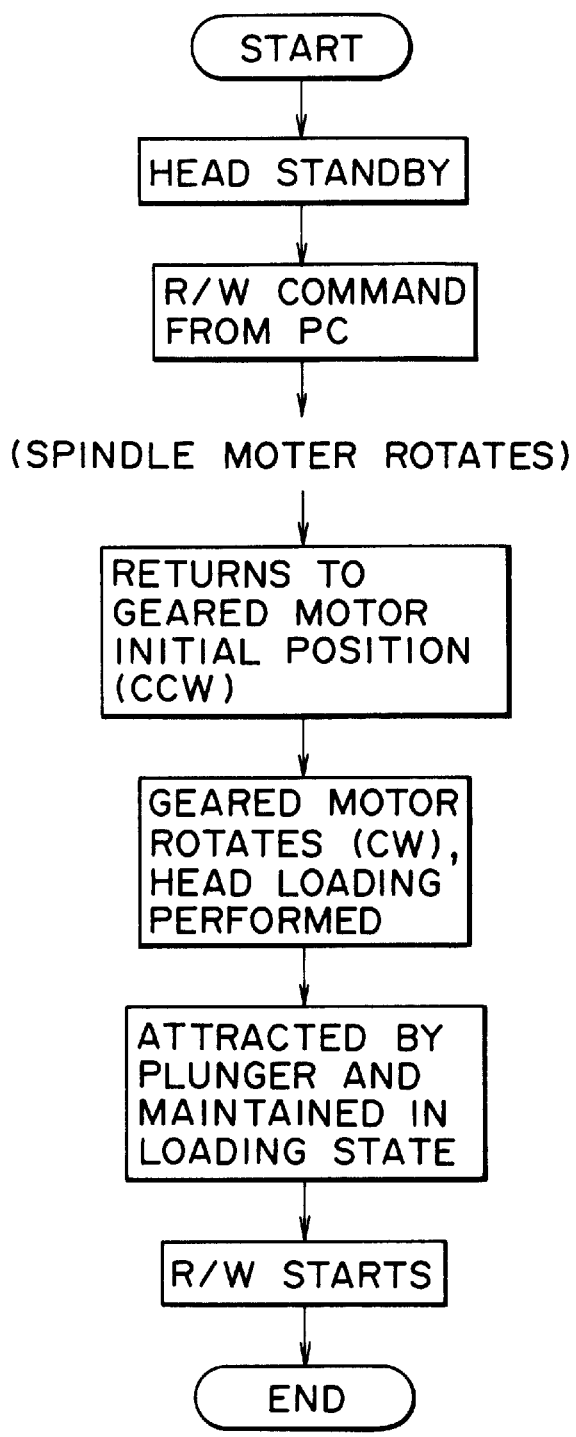
FIG. 36 is a flowchart describing an operation when data recording and/or playback is performed on standby in a disk-in state.
Figure 37:
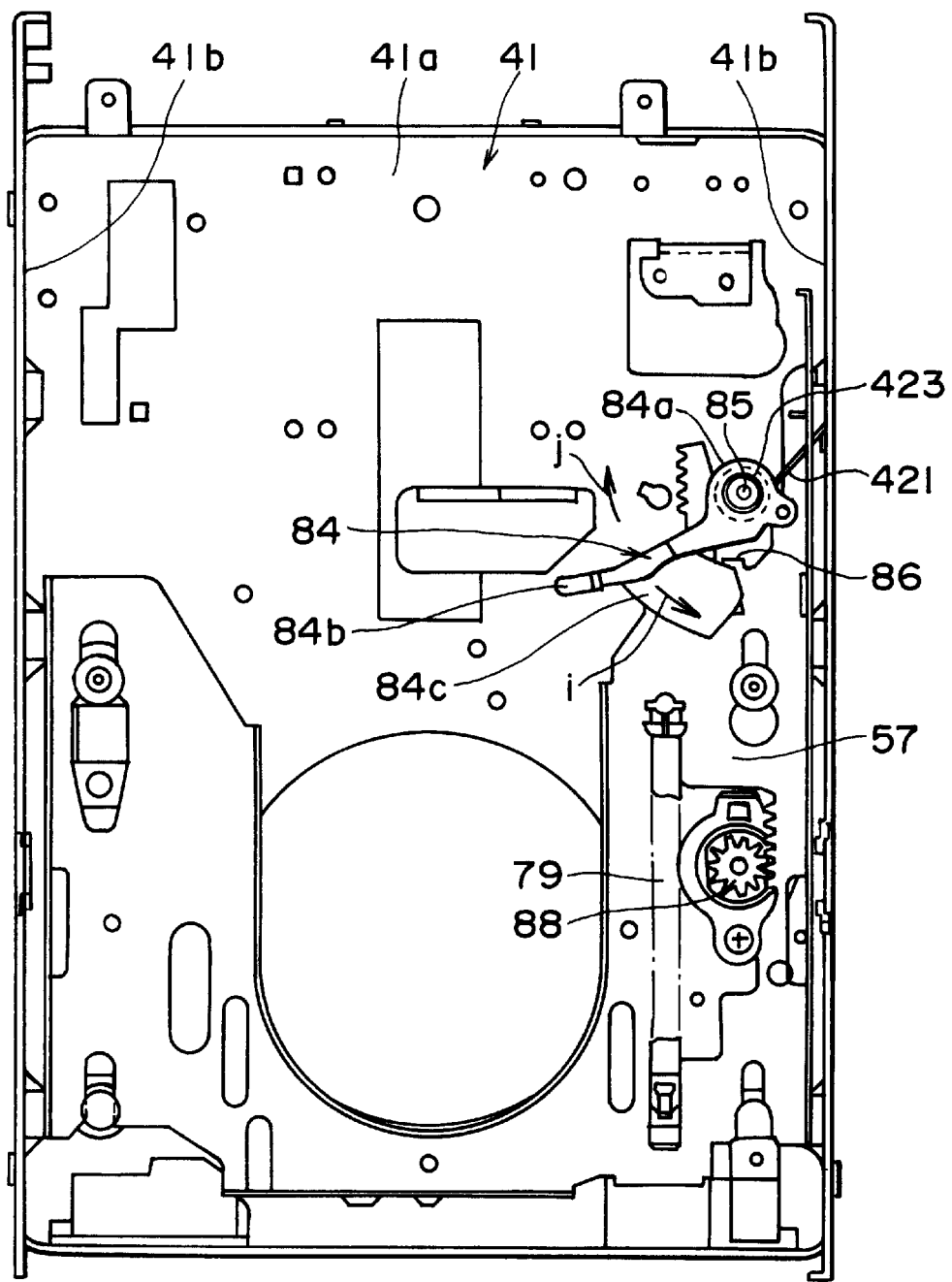
FIG. 37 is a plan view describing a relation between a trigger lever and a first slide plate.
Figure 38:
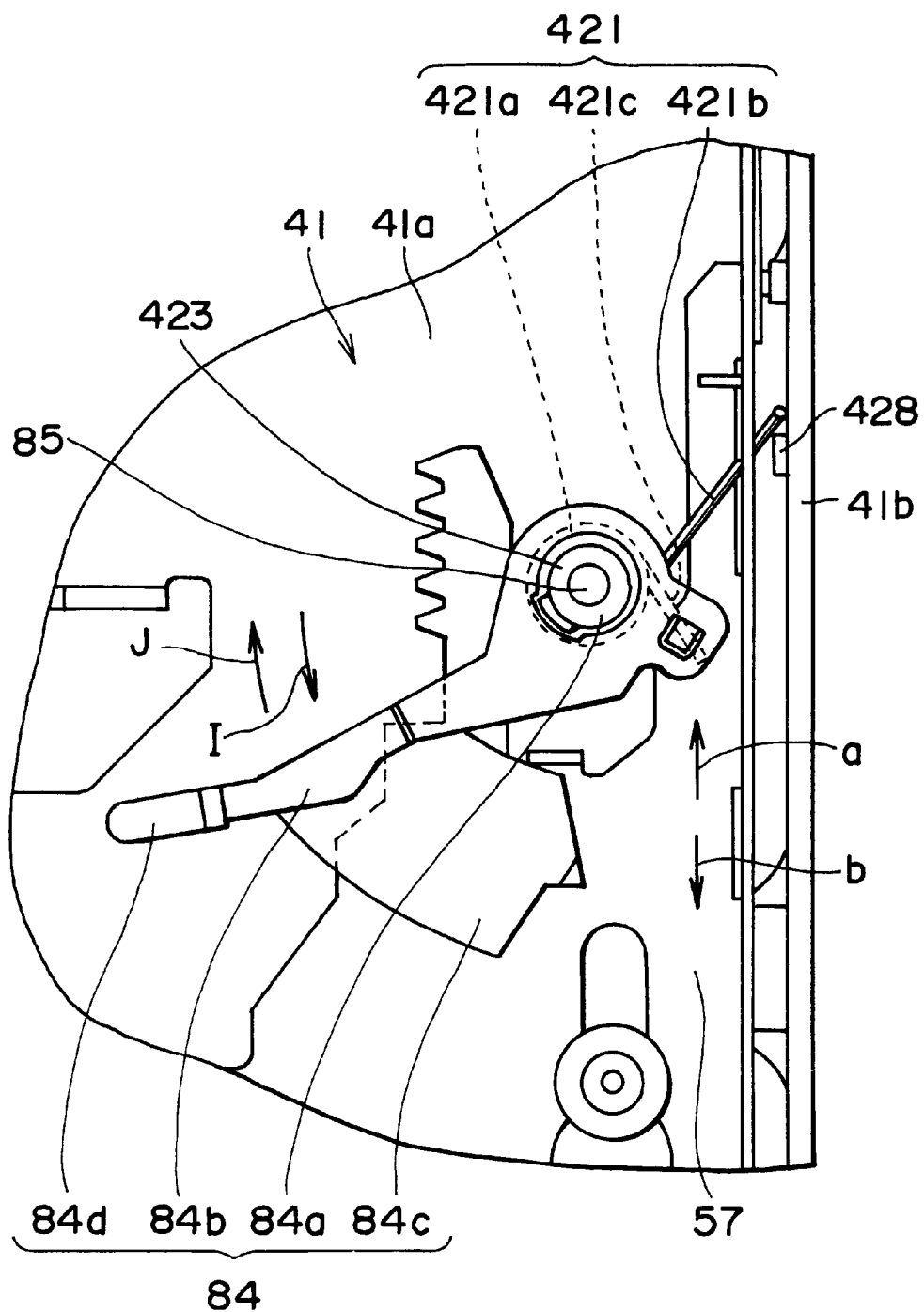
FIG. 38 is a plan view of the essential parts of FIG. 37.

Next, the flowchart shown in FIG. 36 shows the case where the head loading state of the head raising and lowering mechanism 331 is released immediately when a command is sent from the host computer without performing patrol seek for three minutes after data recording and/or playback. This mode is still more useful for suppressing wear of the floppy disk 1 and the pair of upper and lower magnetic heads 101, 102. In some cases, however, access may be delayed depending on the timing with which data recording and/or playback are performed again.

Next, in the flowchart shown in FIG. 36, when data recording and/or playback are performed again in the disk-in state when the pair of upper and lower magnetic heads 101, 102 have been head unloaded after data recording and/or playback, a data recording and/or playback command is sent, the eject motor 80 rotates backwards in the direction of the arrow P, and the eject drive pin 81 returns to its initial position PP as shown in FIG. 20. The eject motor 80 then rotates forwards, the head raising and lowering mechanism 331 performs a head loading operation by the eject drive pin 81, and this state is maintained by the latch mechanism 281.

(12) Description of Trigger Lever

Next, a trigger lever 84 will be described referring to FIGS. 37 to 45. The trigger lever 84 is formed from molded parts, as shown in FIGS. 37 to 42. A cylindrical boss 84a is formed in one piece with the base of the trigger lever 84, an arc-shaped lock piece 84c centered on this boss 84a is formed in one piece with one of the lateral faces of the middle part of the arm 84b, and a tip 84d of the arm 84b performs an opening and closing operation of the shutter of the disk cartridge.

Figure 45:
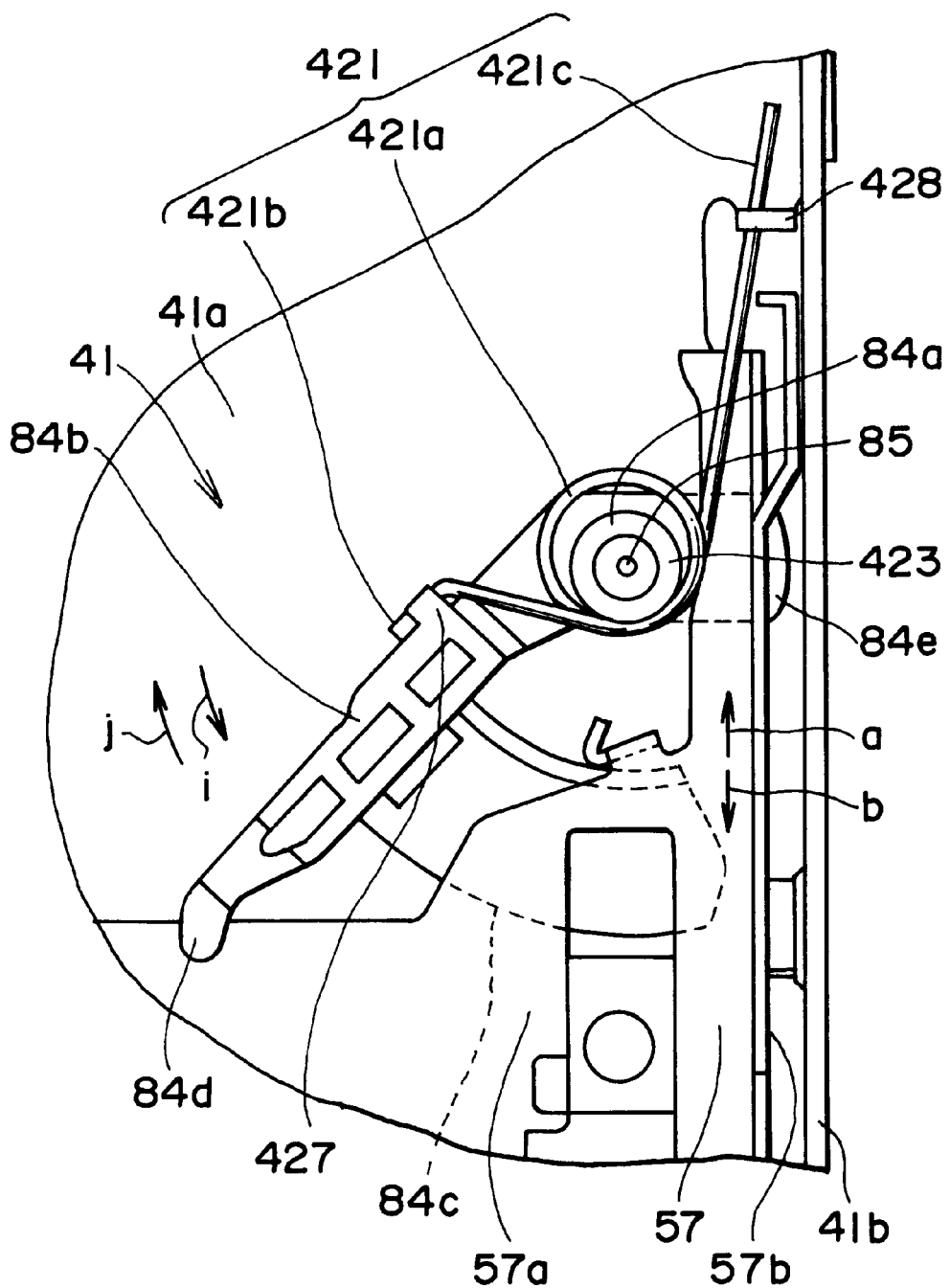
FIG. 45 is a plan view describing a present trigger lever.

In the prior art trigger lever 84, a coil part 421a of a trigger lever return spring 421 comprising a grip coil spring was inserted in the outer circumference of the boss 84a, the boss 84a was inserted and assembled in the pivot pin (pivot shaft) 85 on the chassis 41 together with the cartridge insertion detecting return lever spring 421 with one end 421b engaged with a spring stop 422 formed in one piece with the arm 84b, a stop washer 423 was attached to the upper end of the pivot pin 85, and the other end 421b of the trigger lever return spring 421 was engaged with a spring stop 424 of the chassis 41, as shown in FIG. 45. However, according to this construction, the trigger lever return spring 421 easily fell out when the trigger lever 84 was assembled on the chassis 41, the assembly procedure was not easy to perform, and productivity declined.

Therefore, in this high capacity floppy disk drive HFDD, the outer dimensions of the cylindrical boss 84a are made larger than in the prior art, a coil engaging part 425 comprising a ring-shaped groove is formed concentrically on the inner circumference of the boss 84a, a spring pushing part 426 is formed in one piece with part of this coil engaging part 425, and a pair of spring engaging parts 427, 428 are formed in one piece at two positions on the outer circumference of the coil engaging part 425, thereby forming a temporary stop engaging part 429 of the trigger lever return spring 421 as shown in FIGS. 40 to 44.

Figure 42:
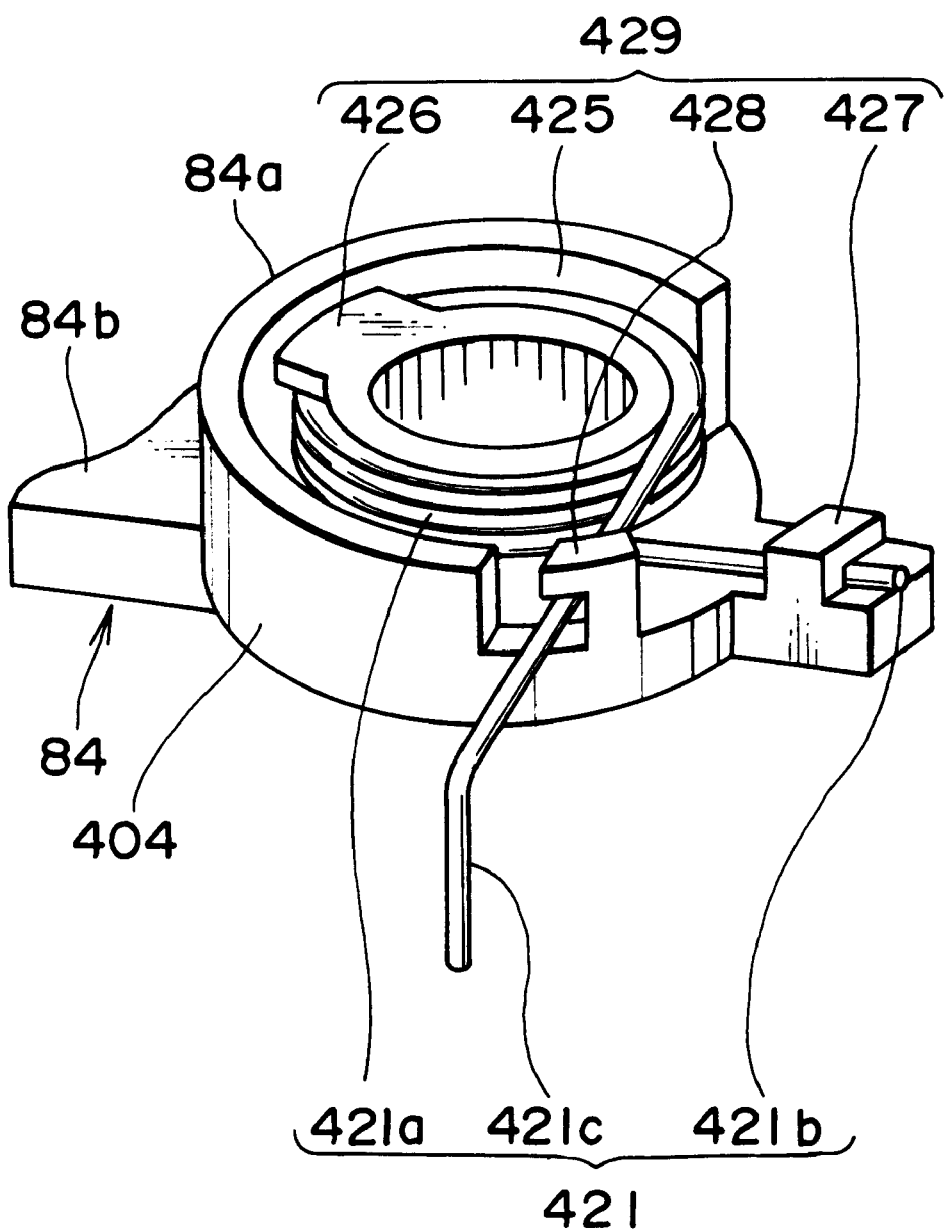
FIG. 42 is a perspective view describing a temporary stop engaging part of a trigger lever return spring of this trigger lever.
Figure 43:
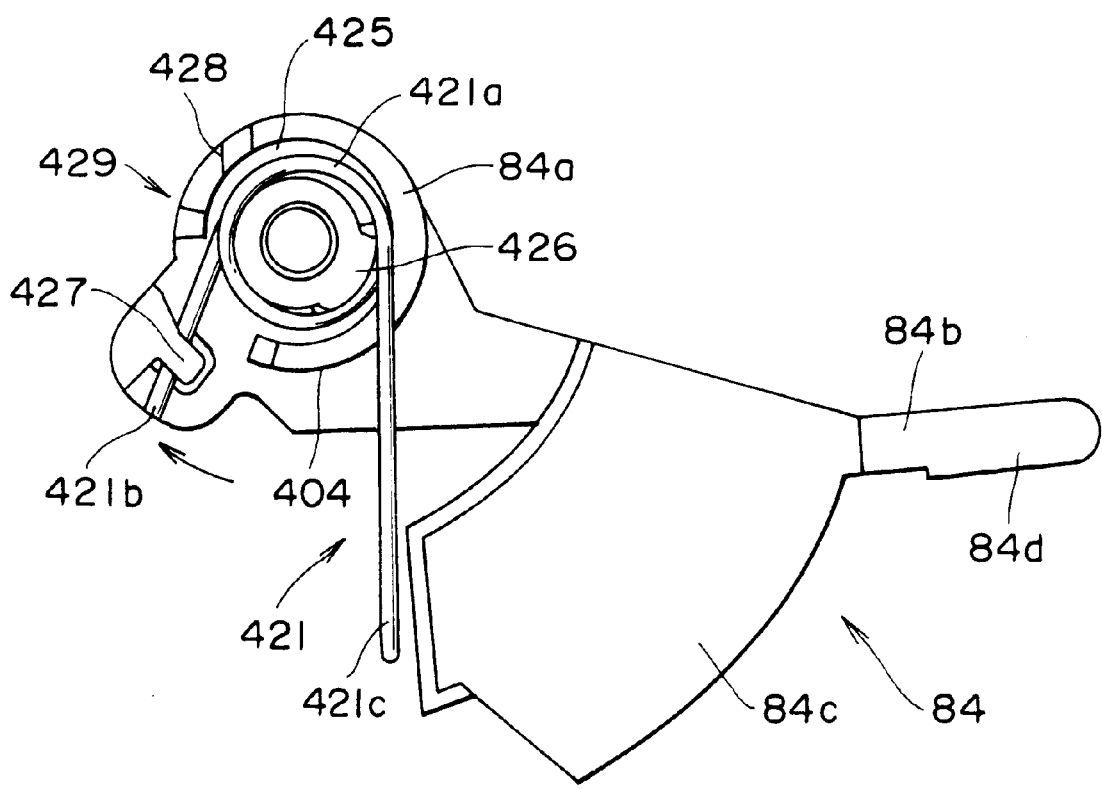
FIG. 43 is a plan view describing the initialization of a temporary stop of the spring in this temporary stop engaging part.
Figure 44:
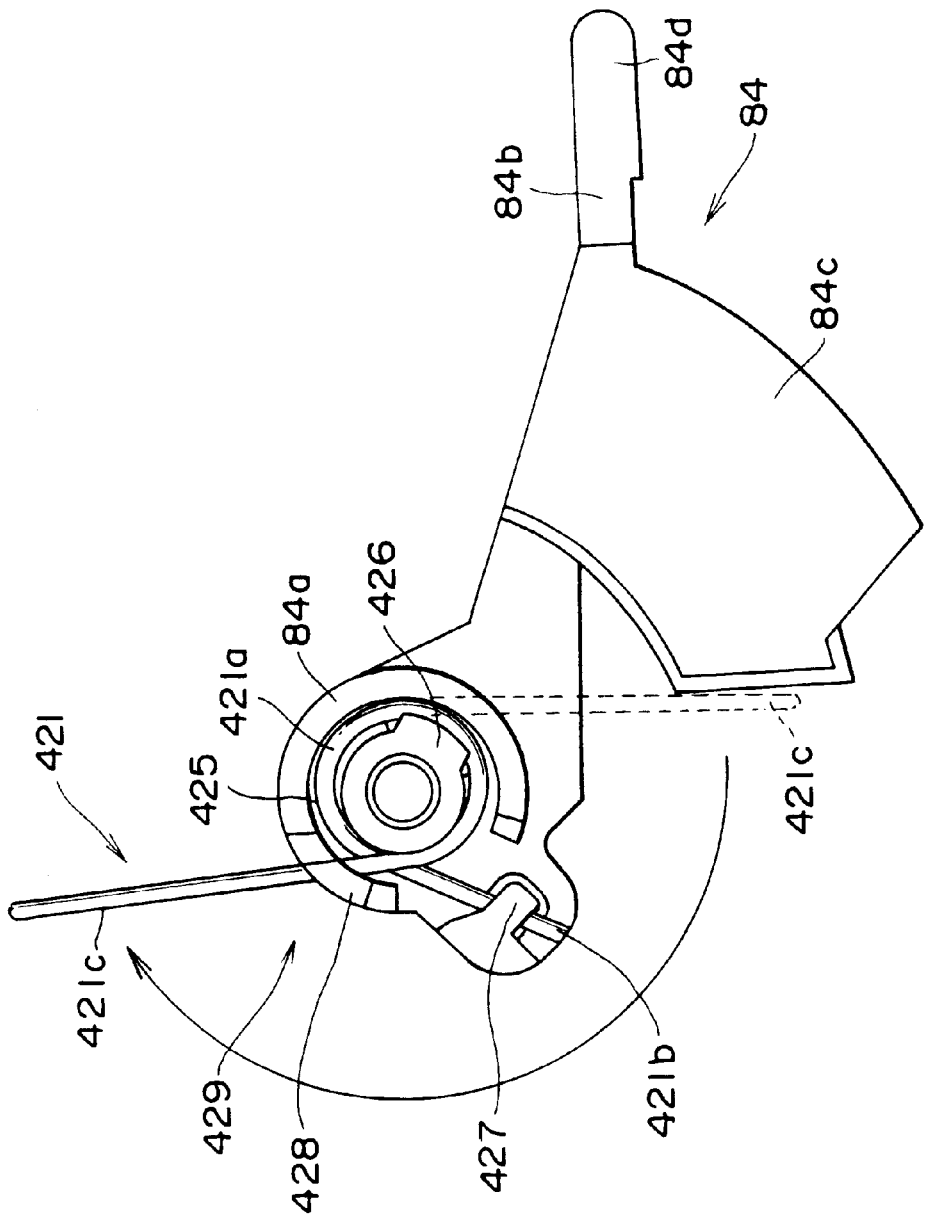
FIG. 44 is a plan view describing a temporary stop completion of this spring.

When the trigger lever 84 is assembled on the chassis 41, a coil 421a of the trigger lever return spring 421 engages with the coil engaging part 425 and is pushed in by the spring pushing part 426, and the trigger lever return spring 421 is stably held temporarily in the trigger lever 84 by engaging the two ends 421b, 421c of the trigger lever return spring 421 with the pair of spring engaging parts 427, 428, as shown in FIGS. 42 to 44. The assembly may be performed simply and easily by inserting the trigger lever 84 together with this trigger lever return spring 421, attaching the stop washer 423 to the upper end of the pivot pin 85, removing the other end 421c of the trigger lever return spring 421 from one of the spring engaging parts 428 and engaging it with the spring engaging part 424 of the chassis 41. This therefore makes it much easier to assemble and disassemble the trigger lever 84 and trigger lever return spring 421 in the chassis 41, and improves productivity. The outer circumference of the boss 84a is formed in the cylindrical member engaging part 404, and the cylindrical part 405a of the plate spring 405 described earlier is engaged with a cylindrical member engaging part 430, as shown in FIGS. 30 and 31.

Figure 39:
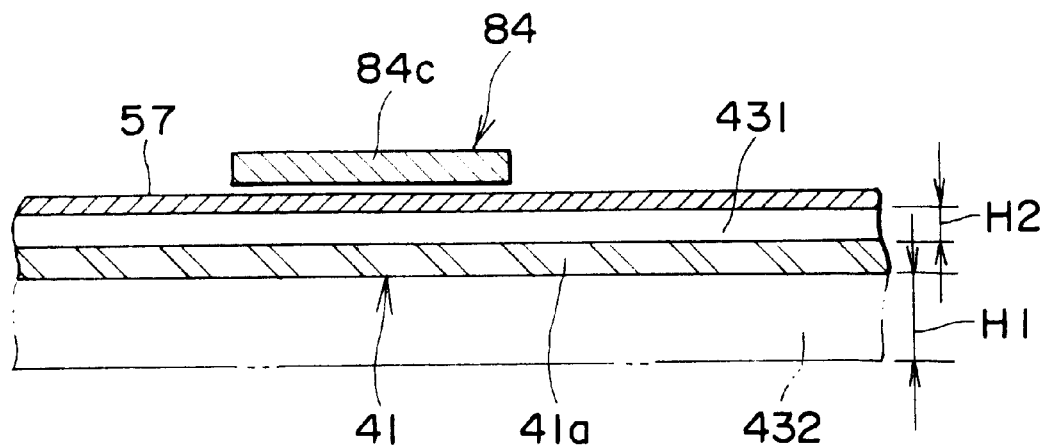
FIG. 39 is a sectional side view describing the disposition of a lock piece of a trigger lever of this high capacity floppy disk drive.
Figure 40:
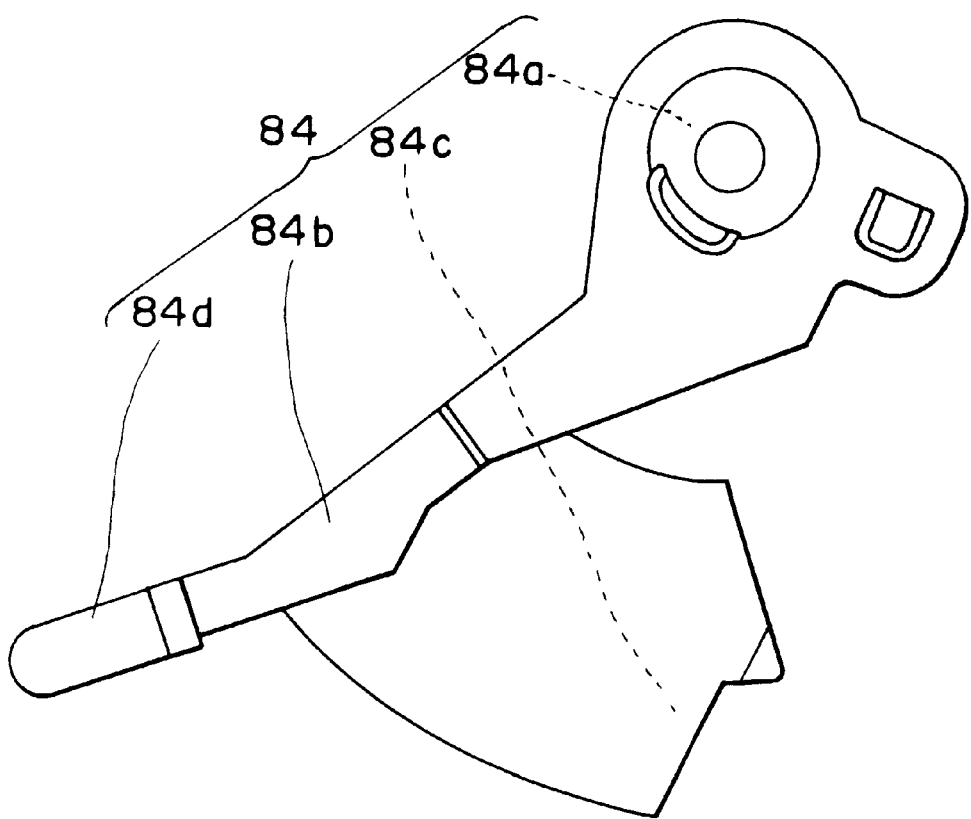
FIG. 40 is a plan view of this trigger lever.
Figure 41:
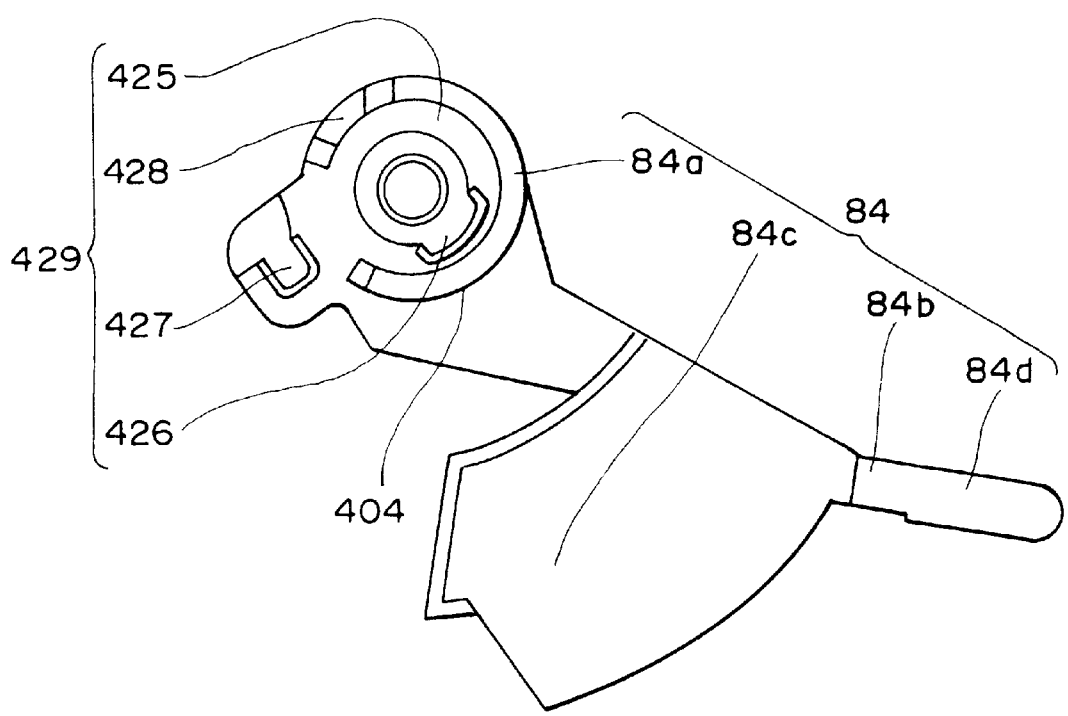
FIG. 41 is a base plan view of this trigger lever.
Figure 46:
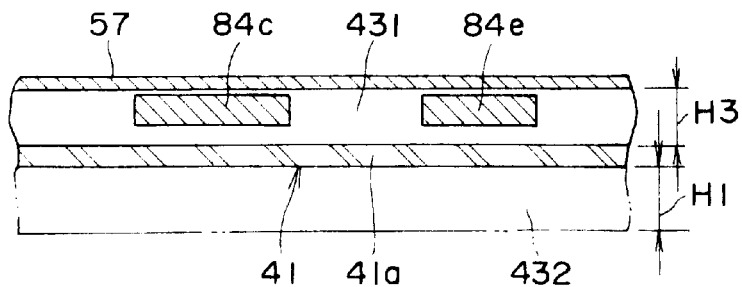
FIG. 46 is a sectional lateral view describing the disposition of a lock piece of the present trigger lever.
Figure 47:
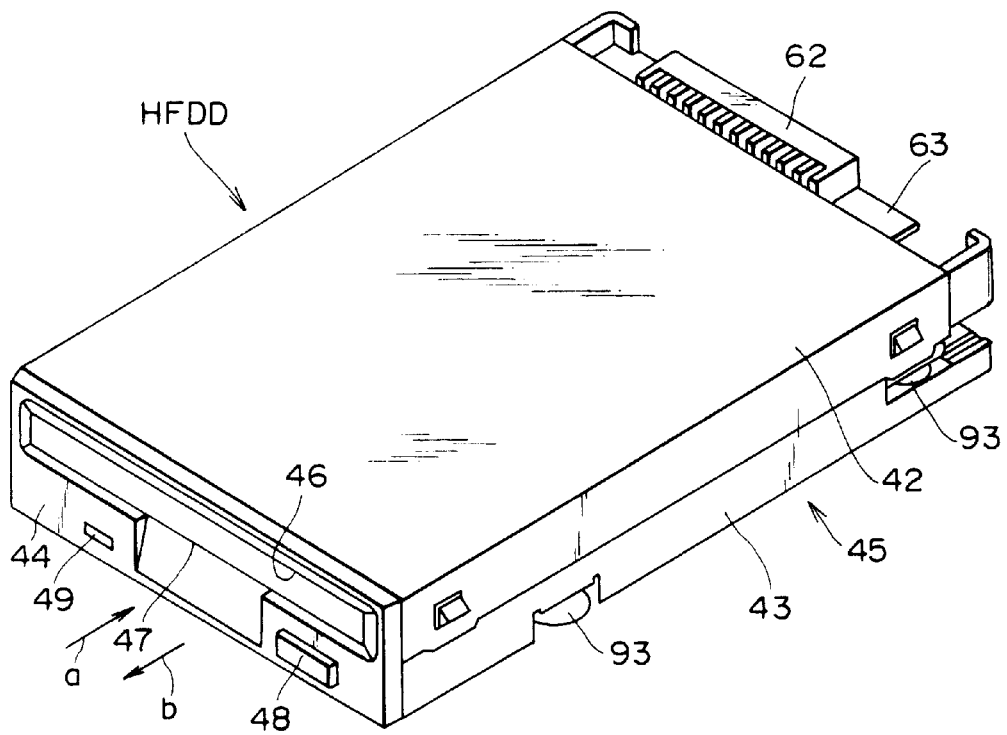
FIG. 47 is an external view in perspective of the high capacity floppy disk drive applying this invention.
Figure 48:
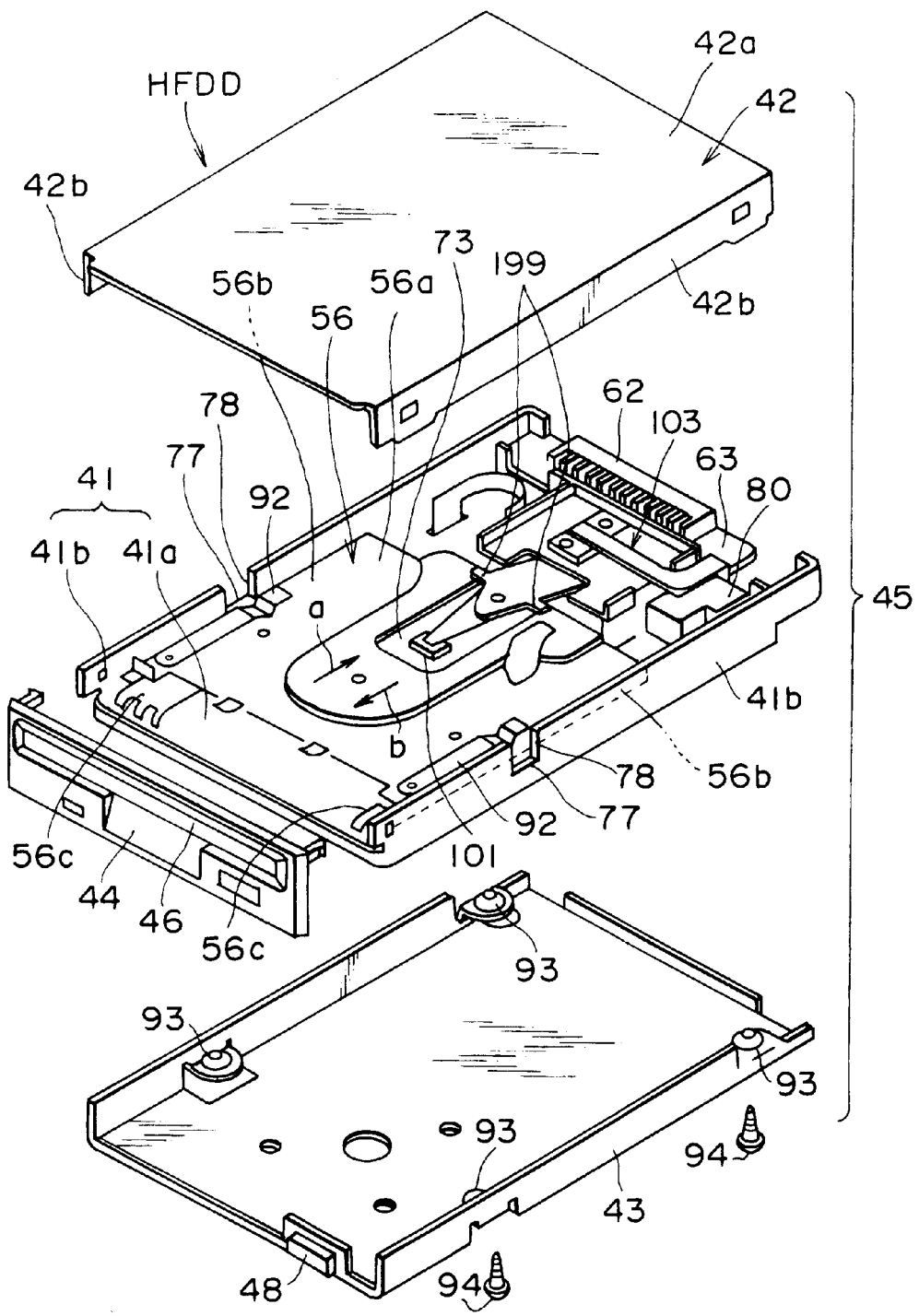
FIG. 48 is a perspective view of a state wherein an upper and lower cover and front panel of this drive have been dismantled.

According to the prior art, the lock piece 84c of the trigger lever 84 was built into a space 431 between the chassis 41 and the first slide plate 57, as shown in FIG. 46. In the high capacity floppy disk drive HFDD, due to the increase of recording capacity, the circuit density and thickness of the substrate of the circuit board built into the circuit housing space formed underneath the chassis 41 is necessarily greater than in present devices, as shown in FIG. 39. Therefore, in a high capacity floppy disk drive HFDD, the thickness $H_1$ of the housing space 432 of the circuit substrate underneath the chassis 41 is necessarily greater than the thickness $H_2$ of the housing space 432 of a present floppy disk drive. When the lock piece 84c of the trigger lever 84 was disposed in the space 431 between the chassis 41 and first slide plate 57 as in the case of present floppy disk drives, the thickness of the drive body increased by an amount by which the thickness $H_1$ of the housing space 432 of the circuit board underneath the chassis 41 increased ($H_1-H_2=X$), and it was no longer possible to make the height of the drive body 1 inch. It was also troublesome to assemble the lock piece 84c of the trigger lever 84 in the space 431 between the chassis 41 and the first slide plate 57.

However, in this high capacity floppy disk drive HFDD, the lock piece 84c of the trigger lever 84 is disposed on the upper part of the first slide plate 57 and parallel to it, as shown in FIG. 39. By employing such a construction, in the high capacity floppy disk drive HFDD, the space 431 between the chassis 41 and the first slide plate 57 can be eliminated or drastically reduced even if the thickness of the substrate housing space 432 underneath the chassis 41 increases, so increase in the thickness of the drive body is prevented and a height of 1 inch can be achieved. Moreover, as the lock piece 84c of the trigger lever 84 is disposed in the upper part of the first slide plate 57, assembly and disassembly of the trigger lever 84 is easy, and low cost is realized due to enhancement of productivity.

Hereabove, specific embodiments of this invention have been described, but the invention is not limited to the above embodiments, various modifications being possible based on the technical concept presented therein. For example, the invention is not limited to floppy disk cartridges and floppy disk drives, and may be applied to various types of disk drive wherein recording and/or playback are performed on various disk-shaped recording media.

What is claimed is:

1. A disk drive apparatus having a head raising and lowering mechanism for raising and lowering a head supported via a suspension in a carriage between a head loading position, in which data recording and playback on a disk-shaped recording medium are possible, and a head unloading position, in which data recording and play back are not possible, the disk drive apparatus comprising:

a head raising and lowering arm disposed at right angles to a longitudinal direction of said suspension;

a slide plate to which a first end of said head raising and lowering arm is attached for free rotation via a pivot axis; and a fixed guide shaft disposed parallel to the longitudinal direction of said suspension for engaging a cam groove formed at a second end of said head raising and lowering arm, wherein said head raising and lowering arm is inserted into said suspension from a direction intersecting with the longitudinal direction of said suspension and is ejected from said suspension by sliding said cam groove relative to said guide shaft by a sliding action of said slide plate, and wherein said head is raised and lowered between said head loading position and said head unloading position by said head raising and lowering arm by rotating said head raising and lowering arm around said pivot axis as a center by said cam groove.

2. The disk drive apparatus as claimed in claim 1, wherein said fixed guide shaft comprises a guide mainshaft of said carriage.

3. The disk drive apparatus as claimed in claim 1, wherein said slide plate comprises a first slide plate and further comprising a second slide plate for insertion thereinto of said head raising and lowering arm on a slant relative to the longitudinal direction of said suspension, so that said head raising and lowering arm approaches said head when said head raising and lowering arm is inserted in said suspension, and said head raising and lowering arm is moved away from said head when said head raising and lowering arm is ejected from said suspension.

4. A disk drive apparatus including head raising and lowering mechanisms for raising and lowering first and second heads supported respectively via first and second suspensions in carriages between a head loading position, in which data recording and playback on a disk-shaped recording medium are possible, and a head unloading position, in which data recording and playback are not possible, the disk drive apparatus comprising:

carrying means for carrying said carriages in a radial direction of the disk-shaped recording medium;

first and second head raising and lowering arms disposed essentially at right angles to the longitudinal direction of said first and second suspensions;

slide plates to which first ends of said first and second head raising and lowering arms are attached for free rotation via a pivot axis; and fixed guide shafts disposed parallel to the longitudinal direction of said suspensions for engaging first and second cam grooves formed at second ends of said first and second head raising and lowering arms, wherein said head raising and lowering arms are inserted into said suspensions from a direction intersecting with the longitudinal direction of said suspensions and are ejected from said suspensions by sliding said first and second cam grooves relative to said guide shafts by sliding actions of said slide plates, and wherein said first and second heads are raised and lowered between said head loading position and head unloading position by the first and second head raising and lowering arms by rotating the first and second head raising and lowering arms around said pivot axis as a center by said first and second cam grooves.

5. The disk drive apparatus as claimed in claim 4, wherein said fixed guide shafts comprise guide mainshafts of said carriage.

6. The disk drive apparatus as claimed in claim 4, wherein slide plates include means for inserting and ejecting said first and second head raising and lowering arms on a slant relative to the longitudinal direction of said suspensions, so that at least one of the first and second head raising and lowering arms approaches said head when said first and second head raising and lowering arms are inserted in said suspensions, and at least one of the first and second head raising and lowering arms is moved away from said head when said first and second head raising and lowering arms are ejected from said suspensions.

7. A disk drive apparatus comprising head raising and lowering mechanisms for raising and lowering first and second heads supported via first and second suspensions in carriages, respectively, between a head loading position, in which data recording and playback on a disk-shaped recording medium are possible, and a head unloading position, in which data recording and playback are not possible, the disk drive apparatus comprising:

first and second head raising and lowering arms disposed between said first and second suspensions at right angles to a longitudinal direction of said first and second suspensions;

a pivot axis whereby said first and second head raising and lowering arms are rotatably arranged; and axis members disposed parallel to the longitudinal direction of said suspensions for engaging first and second cam grooves formed respectively at ends of said first and second head raising and lowering arms, wherein said first and second head raising and lowering arms and said axis members move relatively toward a direction with the longitudinal direction of said suspensions, whereby said axis members displace said first and second cam grooves to rotate said first and second head raising and lowering arms around said pivot axis and to raise and lower said first and second heads between the head loading position and the head unloading position.

8. The disk drive apparatus as claimed in claim 7, wherein the cam grooves formed in said first and second head raising and lowering arms are formed at first ends of the first and second head raising and lowering arms extending toward a direction intersecting with the longitudinal direction of said suspensions.

* * * * *